(12) United States Patent
Gaeta et al.

(10) Patent No.: US 9,440,332 B2
(45) Date of Patent: Sep. 13, 2016

(54) ABRASIVE PARTICLES HAVING PARTICULAR SHAPES AND METHODS OF FORMING SUCH PARTICLES

(71) Applicants: Saint-Gobain Abrasives, Inc., Worcester, MA (US); Saint-Gobain Abrasifs, Conflans-Sainte-Honorine (FR)

(72) Inventors: Anthony C. Gaeta, Lockport, NY (US); Anuj Seth, Northborough, MA (US); Christopher Arcona, Northborough, MA (US); Doruk O. Yener, Wilmington, MA (US); Jennifer H. Czerepinski, Framingham, MA (US); Sujatha Iyengar, Northborough, MA (US); Frank J. Csillag, Hopkinton, MA (US); William C. Rice, Medway, MA (US); Satyalakshmi K. Ramesh, Shrewsbury, MA (US); Gregory Lafond, Boylston, MA (US); Sidath S. Wijesooriya, Worcester, MA (US); Adam D. Lior, Brookline, MA (US); Alan J. Brandes, Rutland, MA (US); Anil Parmar, Worcester, MA (US); Paul Braun, Providence, RI (US); Darrel K. Everts, Hudson Falls, NY (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 0 days.

(21) Appl. No.: 14/054,568

(22) Filed: Oct. 15, 2013

(65) Prior Publication Data

US 2014/0106126 A1   Apr. 17, 2014

Related U.S. Application Data

(60) Provisional application No. 61/714,028, filed on Oct. 15, 2012, provisional application No. 61/747,535, filed on Dec. 31, 2012.

(51) Int. Cl.
*B24D 11/00* (2006.01)
*B24D 11/04* (2006.01)
*B24D 18/00* (2006.01)

(52) U.S. Cl.
CPC ............. *B24D 11/04* (2013.01); *B24D 18/00* (2013.01); *B24D 18/0072* (2013.01); *Y10T 428/24* (2015.01); *Y10T 428/24372* (2015.01); *Y10T 428/24893* (2015.01); *Y10T 428/25* (2015.01)

(58) Field of Classification Search
CPC .. B24D 11/04; B24D 18/00; B24D 18/0072; Y10T 428/24372; Y10T 428/24; Y10T 428/24893; Y10T 428/25; Y10T 428/252; Y10T 428/24355; Y10T 428/24356; Y10T 428/24357
USPC .............. 428/98, 141–150, 195.1, 206, 210, 428/323–340; 51/295, 297, 307
See application file for complete search history.

(56) References Cited

U.S. PATENT DOCUMENTS

| 345,604 A | 7/1886 | Semper |
|---|---|---|
| 1,910,444 A | 5/1933 | Nicholson |

(Continued)

FOREIGN PATENT DOCUMENTS

| CA | 743715 A | 10/1966 |
|---|---|---|
| CA | 2423788 A1 | 7/2002 |

(Continued)

OTHER PUBLICATIONS

"Investigation of Shaped Abrasive Particles vol. 1: Review of U.S. Pat. No. 6,054,093 Apr. 25, 2000" © Apr. 2011, 5 pages.

(Continued)

*Primary Examiner* — Nathan Van Sell
(74) *Attorney, Agent, or Firm* — Abel Law Group, LLP; Joseph P Sullivan

(57) ABSTRACT

An abrasive article comprising a first group including a plurality of shaped abrasive particles overlying a backing, wherein the plurality of shaped abrasive particles of the first group define a first non-shadowing distribution relative to each other.

20 Claims, 31 Drawing Sheets

(56) References Cited

U.S. PATENT DOCUMENTS

| | | |
|---|---|---|
| 2,049,874 A | 8/1936 | Sherk |
| 2,148,400 A | 2/1939 | Crompton, Jr. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Willkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |

(56) References Cited

U.S. PATENT DOCUMENTS

| | | |
|---|---|---|
| 5,312,789 A | 5/1994 | Wood |
| 5,312,791 A | 5/1994 | Coblenz et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,496,386 A | 3/1996 | Broberg et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E * | 7/1997 | Rowenhorst et al. .......... 51/293 |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani et al. |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 * | 8/2001 | Stubbs ................... B24D 11/04 51/293 |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |

(56) References Cited

U.S. PATENT DOCUMENTS

| | | |
|---|---|---|
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,783,589 B2 | 7/2014 | Hart et al. |
| 8,852,643 B2 | 10/2014 | Gonzales et al. |
| 9,017,439 B2 | 4/2015 | Yener et al. |
| 2001/0027623 A1 | 10/2001 | Rosenflanz |
| 2002/0026752 A1 | 3/2002 | Culler et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0009949 A1* | 1/2003 | Prichard ............ B24D 3/002 51/297 |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0010780 A1 | 1/2006 | Hall et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0011951 A1* | 1/2007 | Gaeta et al. .................... 51/297 |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0216413 A1 | 9/2008 | Woo et al. |
| 2008/0230951 A1 | 9/2008 | Dannoux et al. |
| 2008/0262577 A1 | 10/2008 | Altshuler et al. |
| 2008/0271384 A1* | 11/2008 | Puthanangady et al. ....... 51/309 |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017276 A1* | 1/2009 | Hoglund et al. .............. 428/206 |
| 2009/0017736 A1 | 1/2009 | Block et al. |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0255254 A1 | 10/2010 | Culler et al. |
| 2010/0292428 A1 | 11/2010 | Meador et al. |
| 2010/0307067 A1 | 12/2010 | Sigalas et al. |
| 2010/0319269 A1 | 12/2010 | Erickson |
| 2010/0330886 A1* | 12/2010 | Wu et al. ...................... 451/56 |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |

(56) References Cited

U.S. PATENT DOCUMENTS

| | | | |
|---|---|---|---|
| 2012/0167481 | A1 | 7/2012 | Yener et al. |
| 2012/0168979 | A1 | 7/2012 | Bauer et al. |
| 2012/0227333 | A1 | 9/2012 | Adefris et al. |
| 2012/0231711 | A1 | 9/2012 | Keipert et al. |
| 2013/0000212 | A1 | 1/2013 | Wang et al. |
| 2013/0000216 | A1 | 1/2013 | Wang et al. |
| 2013/0009484 | A1 | 1/2013 | Yu |
| 2013/0036402 | A1 | 2/2013 | Mutisya et al. |
| 2013/0045251 | A1 | 2/2013 | Cen et al. |
| 2013/0067669 | A1 | 3/2013 | Gonzales et al. |
| 2013/0072417 | A1 | 3/2013 | Perez-Prat et al. |
| 2013/0074418 | A1 | 3/2013 | Panzarella et al. |
| 2013/0125477 | A1 | 5/2013 | Adefris |
| 2013/0180180 | A1 | 7/2013 | Yener et al. |
| 2013/0186005 | A1 | 7/2013 | Kavanaugh |
| 2013/0186006 | A1 | 7/2013 | Kavanaugh et al. |
| 2013/0199105 | A1 | 8/2013 | Braun et al. |
| 2013/0236725 | A1 | 9/2013 | Yener et al. |
| 2013/0255162 | A1 | 10/2013 | Welygan et al. |
| 2013/0267150 | A1 | 10/2013 | Seider et al. |
| 2013/0283705 | A1 | 10/2013 | Fischer et al. |
| 2013/0305614 | A1 | 11/2013 | Gaeta et al. |
| 2013/0312337 | A1* | 11/2013 | Moren .................. B24D 18/00 51/309 |
| 2013/0337262 | A1 | 12/2013 | Bauer et al. |
| 2013/0337725 | A1 | 12/2013 | Monroe |
| 2014/0000176 | A1 | 1/2014 | Moren et al. |
| 2014/0007518 | A1 | 1/2014 | Yener et al. |
| 2014/0080393 | A1 | 3/2014 | Ludwig |
| 2014/0106126 | A1 | 4/2014 | Gaeta et al. |
| 2014/0182216 | A1 | 7/2014 | Panzarella et al. |
| 2014/0182217 | A1 | 7/2014 | Yener et al. |
| 2014/0186585 | A1 | 7/2014 | Field, III et al. |
| 2014/0250797 | A1 | 9/2014 | Yener et al. |
| 2014/0290147 | A1 | 10/2014 | Seth et al. |
| 2014/0352721 | A1 | 12/2014 | Gonzales et al. |
| 2014/0352722 | A1 | 12/2014 | Gonzales et al. |
| 2014/0357544 | A1 | 12/2014 | Gonzales et al. |
| 2014/0378036 | A1 | 12/2014 | Cichowlas et al. |
| 2015/0000209 | A1 | 1/2015 | Louapre et al. |
| 2015/0000210 | A1 | 1/2015 | Breder et al. |
| 2015/0007399 | A1 | 1/2015 | Gonzales et al. |
| 2015/0007400 | A1 | 1/2015 | Gonzales et al. |
| 2015/0126098 | A1 | 5/2015 | Eilers et al. |
| 2015/0128505 | A1 | 5/2015 | Wang et al. |
| 2015/0183089 | A1 | 7/2015 | Iyengar et al. |
| 2015/0218430 | A1 | 8/2015 | Yener et al. |
| 2015/0232727 | A1 | 8/2015 | Erickson |
| 2015/0291865 | A1 | 10/2015 | Breder et al. |
| 2015/0291866 | A1 | 10/2015 | Arcona et al. |
| 2015/0291867 | A1 | 10/2015 | Breder et al. |

FOREIGN PATENT DOCUMENTS

| | | |
|---|---|---|
| CH | 685051 A5 | 3/1995 |
| CN | 1867428 A | 11/2006 |
| CN | 101925441 A | 12/2010 |
| CN | 102123837 B | 7/2014 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B1 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| FR | 2354373 A1 | 1/1978 |
| GB | 986847 A | 3/1965 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 B | 12/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2002-038131 A | 2/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008194761 A | 8/2008 |
| JP | 5238725 B2 | 7/2013 |
| JP | 5238726 B2 | 7/2013 |
| NL | 171464 B | 11/1982 |
| WO | 9402559 A1 | 2/1994 |
| WO | 95/03370 | 2/1995 |
| WO | 95/18192 A1 | 7/1995 |

(56) References Cited

FOREIGN PATENT DOCUMENTS

| | | |
|---|---|---|
| WO | 9520469 A1 | 8/1995 |
| WO | 96/27189 A1 | 9/1996 |
| WO | 97/11484 A1 | 3/1997 |
| WO | 9714536 A1 | 4/1997 |
| WO | 9906500 A1 | 2/1999 |
| WO | 99/38817 A1 | 8/1999 |
| WO | 9938817 A1 | 8/1999 |
| WO | 9954424 A1 | 10/1999 |
| WO | 01/14494 A1 | 3/2001 |
| WO | 02097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/070294 A1 | 6/2010 |
| WO | 2010/077509 A1 | 7/2010 |
| WO | 2010085587 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013/049239 A1 | 4/2013 |
| WO | 2013070576 A2 | 5/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/149209 A1 | 10/2013 |
| WO | 2013/151745 A1 | 10/2013 |
| WO | 2013/177446 A1 | 11/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/130487 A1 | 9/2015 |
| WO | 2015/158009 A1 | 10/2015 |
| WO | 2015/164211 A1 | 10/2015 |
| WO | 2015/167910 A1 | 11/2015 |
| WO | 2015/179335 A1 | 11/2015 |
| WO | 2015/180005 A1 | 12/2015 |

OTHER PUBLICATIONS

Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.
Wu, J. et al., Friction and Wear Properties of Kevlar Pulp Reinforced Epoxy.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, Winter diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
PCT/US2013/065085 International Search Report mailed Jan. 24, 2014, 1 page.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
DOW Machine Tool Accessories, Grinding & Surface Finishing, www.1mta.com, Nov. 2014, 72 pages.
Extended European Search Report, dated Jun. 15, 2016, 1 page.

* cited by examiner

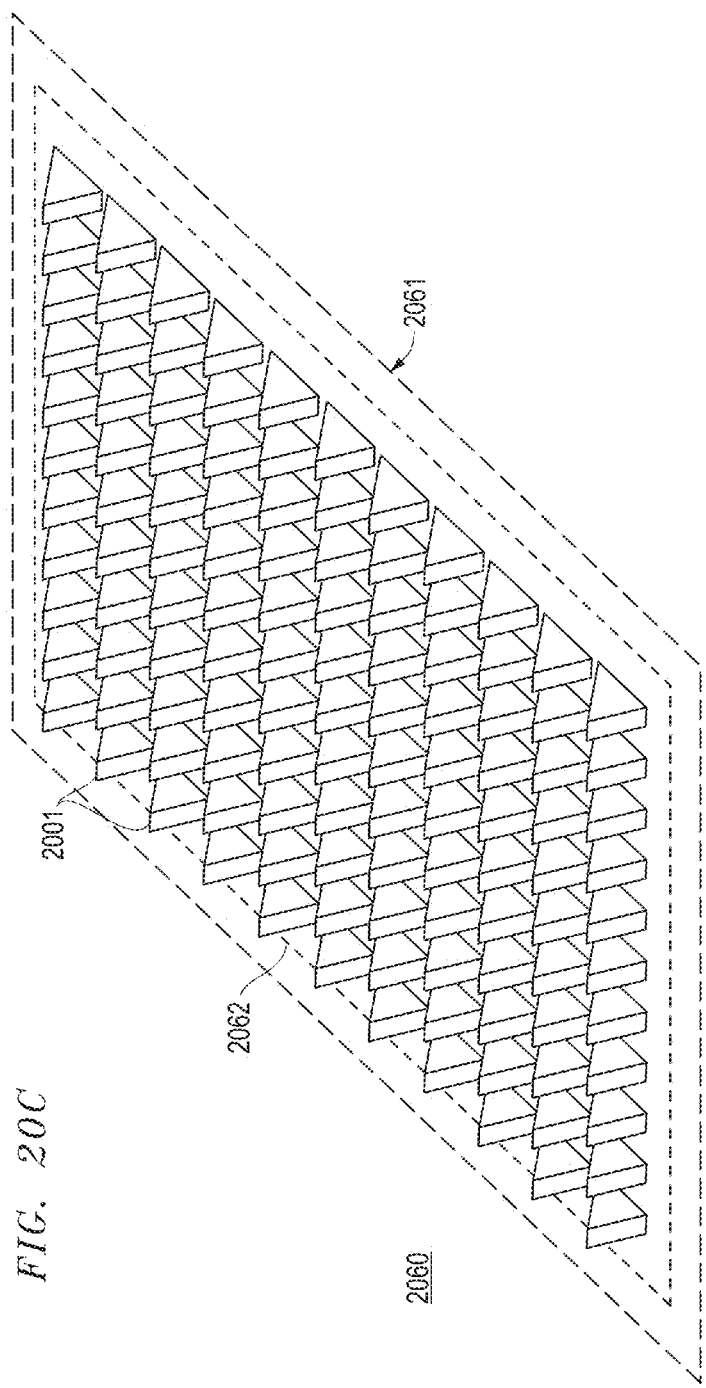

ABRASIVE PARTICLES HAVING PARTICULAR SHAPES AND METHODS OF FORMING SUCH PARTICLES

This application claims priority to and the benefit of US Provisional Patent Application(s) 61/714,028, filed on Oct. 15, 2012 and 61/747,535, filed on Dec. 31, 2012, and are incorporated herein by reference in their entirety.

BACKGROUND

1. Field of the Disclosure

The following is directed to abrasive articles, and particularly, methods of forming abrasive articles.

2. Description of the Related Art

Abrasive particles and abrasive articles made from abrasive particles are useful for various material removal operations including grinding, finishing, and polishing. Depending upon the type of abrasive material, such abrasive particles can be useful in shaping or grinding a wide variety of materials and surfaces in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Some basic technologies that have been employed to produce abrasive particles having a specified shape are (1) fusion, (2) sintering, and (3) chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660, disclosing a process comprising the steps of flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor.

In the sintering process, abrasive particles can be formed from refractory powders having a particle size of 45 micrometers or less in diameter. Binders can be added to the powders along with a lubricant and a suitable solvent, e.g., water. The resulting mixtures, or slurries can be shaped into platelets or rods of various lengths and diameters. See, for example, U.S. Pat. No. 3,079,242, which discloses a method of making abrasive particles from calcined bauxite material comprising the steps of (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive grains are produced directly to size.

Chemical ceramic technology involves converting a colloidal dispersion or hydrosol (sometimes called a sol), optionally in a mixture, with solutions of other metal oxide precursors, to a gel drying, and firing to obtain a ceramic material. See, for example, U.S. Pat. Nos. 4,744,802 and 4,848,041.

Still, there remains a need in the industry for improving performance, life, and efficacy of abrasive particles, and the abrasive articles that employ abrasive particles.

SUMMARY

According to a first aspect, an abrasive article includes a backing, an adhesive layer overlying the backing, a first shaped abrasive particle coupled to the backing in a first position, a second shaped abrasive particle coupled to the backing in a second position, and wherein the first shaped abrasive particle and second shaped abrasive particle are arranged in a non-shadowing arrangement relative to each other, the non-shadowing arrangement comprising at least two of a predetermined rotational orientation, a predetermined lateral orientation, and a predetermined longitudinal orientation.

In yet another aspect, an abrasive article includes a backing, an adhesive layer overlying the backing, a first group comprising a plurality of shaped abrasive particles coupled to the backing, wherein each of the plurality of shaped abrasive particles of the first group share at least one of a predetermined rotational orientation, a predetermined lateral orientation, and a predetermined longitudinal orientation, and a second group comprising a plurality of shaped abrasive particles distinct from the first group and coupled to the backing, wherein each of the plurality of shaped abrasive particles of the second group share at least one of a predetermined rotational orientation, a predetermined lateral orientation, and a predetermined longitudinal orientation.

For another aspect, an abrasive article includes a backing, and a first group comprising a plurality of shaped abrasive particles coupled to the backing in a discontinuous layer, the plurality of shaped abrasive particles arranged in a non-shadowing arrangement with respect to each other and defining a same rotational orientation, a same lateral orientation, a same lateral orientation space, a same longitudinal orientation, and a same longitudinal orientation space.

According to one aspect, an abrasive article includes a first group including a plurality of shaped abrasive particles overlying a backing, wherein the plurality of shaped abrasive particles of the first group defined a first pattern relative to each other.

For still another aspect, an abrasive article includes a backing and a first group having a plurality of shaped abrasive particles coupled to the backing in a discontinuous layer, the plurality of shaped abrasive particles of the first group defined by a combination of at least two of a same predetermined rotational orientation, a same predetermined lateral orientation, a same predetermined longitudinal orientation, a same predetermined vertical height, and a same predetermined tip height.

According to one aspect, an abrasive article includes a plurality of shaped abrasive particles of a first group overlying a backing, wherein the plurality of shaped abrasive particles of the first group define a non-shadowing arrangement relative to each other, and wherein at least about 80% of a total content of the shaped abrasive particles are arranged in a side orientation relative to the backing.

In a certain aspect, a method of forming an abrasive article includes providing a backing, placing a first shaped abrasive particle on the backing in a first position defined by at least two of a predetermined rotational orientation, a predetermined lateral orientation, and a predetermined longitudinal orientation, and placing a second shaped abrasive particle on the backing in a second positioned defined by at least two of a predetermined rotational orientation, a predetermined lateral orientation, and a predetermined longitudinal orientation.

BRIEF DESCRIPTION OF THE DRAWINGS

The present disclosure may be better understood, and its numerous features and advantages made apparent to those skilled in the art by referencing the accompanying drawings.

FIG. 20C includes an image of a portion of an abrasive article according to an embodiment.

DETAILED DESCRIPTION

Figure 1A:
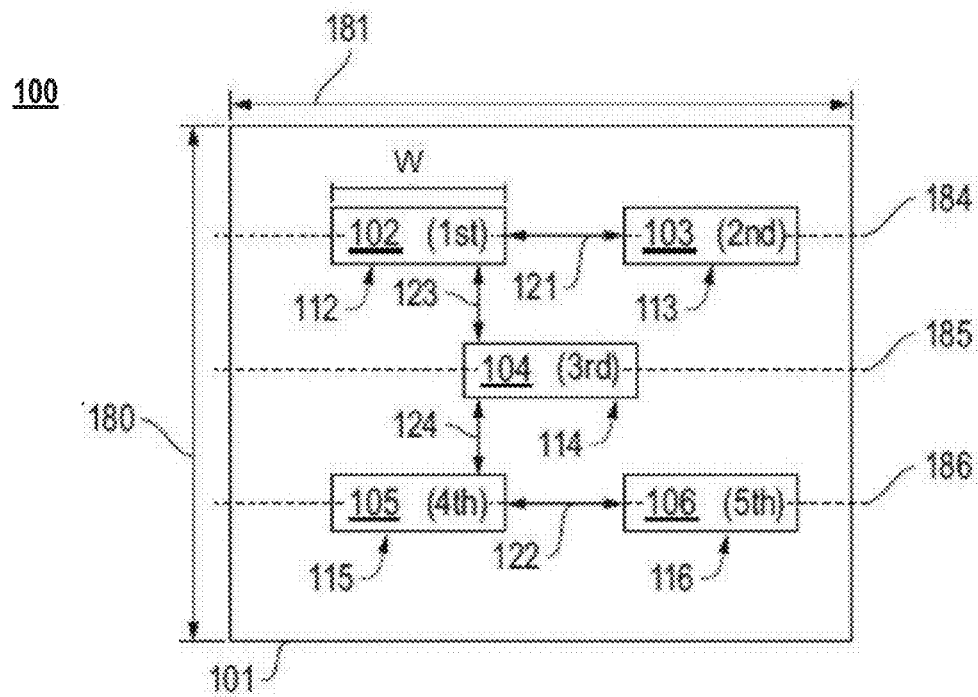
FIG. 1A includes a top view illustration of a portion of an abrasive article according to an embodiment.

The following is directed to methods of forming shaped abrasive particles, features of shaped abrasive particles, methods of forming abrasive articles using shaped abrasive article, and features of abrasive articles. The shaped abrasive particles may be used in various abrasive articles, including for example bonded abrasive articles, coated abrasive articles, and the like. In particular instances, the abrasive articles of embodiments herein can be coated abrasive articles defined by a single layer of abrasive grains, and more particularly a discontinuous, single layer of shaped abrasive particles, which may be bonded or coupled to a backing and used to remove material from workpieces. Notably, the shaped abrasive particles can be placed in a controlled manner such that the shaped abrasive particles define a predetermined distribution relative to each other.

Methods of Forming Shaped Abrasive Particles

Various methods may be employed to form shaped abrasive particles. For example, the shaped abrasive particles may be formed using techniques such as extrusion, molding, screen printing, rolling, melting, pressing, casting, segmenting, sectioning, and a combination thereof. In certain instances, the shaped abrasive particles may be formed from a mixture, which may include a ceramic material and a liquid. In particular instances, the mixture may be a gel formed of a ceramic powder material and a liquid, wherein the gel can be characterized as a shape-stable material having the ability to substantially hold a given shape even in the green (i.e., unfired) state. In accordance with an embodiment, the gel can be formed of the ceramic powder material as an integrated network of discrete particles.

The mixture may contain a certain content of solid material, liquid material, and additives such that it has suitable rheological characteristics for forming the shaped abrasive particles. That is, in certain instances, the mixture can have a certain viscosity, and more particularly, suitable rheological characteristics that facilitate formation a dimensionally stable phase of material. A dimensionally stable phase of material is a material that can be formed to have a particular shape and substantially maintain the shape such that the shape is present in the finally-formed object.

According to a particular embodiment, the mixture can be formed to have a particular content of solid material, such as the ceramic powder material. For example, in one embodiment, the mixture can have a solids content of at least about 25 wt %, such as at least about 35 wt %, or even at least about 38 wt % for the total weight of the mixture. Still, in at least one non-limiting embodiment, the solid content of the mixture can be not greater than about 75 wt % such as not greater than about 70 wt %, not greater than about 65 wt %, not greater than about 55 wt %, not greater than about 45 wt %, or not greater than about 42 wt %. It will be appreciated that the content of the solids materials in the mixture can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being $Al_2O_3 \cdot H_2O$ and having a water content on the order of 15%, as well as psuedoboehmite, having a water content higher than 15%, such as 20-38% by weight. It is noted that boehmite (including psuedoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

Furthermore, the mixture can be formed to have a particular content of liquid material. Some suitable liquids may include water. In accordance with one embodiment, the mixture can be formed to have a liquid content less than the solids content of the mixture. In more particular instances, the mixture can have a liquid content of at least about 25 wt %, such as at least about 35 wt %, at least about 45 wt %, at least about 50 wt %, or even at least about 58 wt % for the total weight of the mixture. Still, in at least one non-limiting embodiment, the liquid content of the mixture can be not greater than about 75 wt %, such as not greater than about 70 wt %, not greater than about 65 wt %, not greater than about 62 wt %, or even not greater than about 60 wt %. It will be appreciated that the content of the liquid in the mixture can be within a range between any of the minimum and maximum percentages noted above.

Furthermore, for certain processes, the mixture may have a particular storage modulus. For example, the mixture can have a storage modulus of at least about $1 \times 10^4$ Pa, such as at least about $4 \times 10^4$ Pa, or even at least about $5 \times 10^4$ Pa. However, in at least one non-limiting embodiment, the mixture may have a storage modulus of not greater than about $1 \times 10^7$ Pa, such as not greater than about $2 \times 10^6$ Pa. It will be appreciated that the storage modulus of the mixture 101 can be within a range between any of the minimum and maximum values noted above.

The storage modulus can be measured via a parallel plate system using ARES or AR-G2 rotational rheometers, with Peltier plate temperature control systems. For testing, the mixture can be extruded within a gap between two plates that are set to be approximately 8 mm apart from each other. After extruding the gel into the gap, the distance between the two plates defining the gap is reduced to 2 mm until the mixture completely fills the gap between the plates. After wiping away excess mixture, the gap is decreased by 0.1 mm and the test is initiated. The test is an oscillation strain sweep test conducted with instrument settings of a strain range between 01% to 100%, at 6.28 rad/s (1 Hz), using 25-mm parallel plate and recording 10 points per decade. Within 1 hour after the test completes, lower the gap again by 0.1 mm and repeat the test. The test can be repeated at least 6 times. The first test may differ from the second and third tests. Only the results from the second and third tests for each specimen should be reported.

Furthermore, to facilitate processing and forming shaped abrasive particles according to embodiments herein, the mixture can have a particular viscosity. For example, the mixture can have a viscosity of at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, at least about $65 \times 10^3$ Pa s. In at least one non-limiting embodiment, the mixture may have a viscosity of not greater than about $100 \times 10^3$ Pa s, not greater than about $95 \times 10^3$ Pa s, not greater than about $90 \times 10^3$ Pa s, or even not greater than about $85 \times 10^3$ Pa s. It will be appreciated that the viscosity of the mixture can be within a range between any of the minimum and maximum values noted above. The viscosity can be measured in the same manner as the storage modulus as described above.

Moreover, the mixture can be formed to have a particular content of organic materials, including for example, organic additives that can be distinct from the liquid, to facilitate processing and formation of shaped abrasive particles according to the embodiments herein. Some suitable organic additives can include stabilizers, binders, such as fructose, sucrose, lactose, glucose, UV curable resins, and the like.

Notably, the embodiments herein may utilize a mixture that can be distinct from slurries used in conventional forming operations. For example, the content of organic materials, within the mixture, particularly, any of the organic additives noted above, may be a minor amount as compared to other components within the mixture. In at least one embodiment, the mixture can be formed to have not greater than about 30 wt % organic material for the total weight of the mixture. In other instances, the amount of organic materials may be less, such as not greater than about 15 wt %, not greater than about 10 wt %, or even not greater than about 5 wt %. Still, in at least one non-limiting embodiment, the amount of organic materials within the mixture can be at least about 0.01 wt %, such as at least about 0.5 wt % for the total weight of the mixture. It will be appreciated that the amount of organic materials in the mixture can be within a range between any of the minimum and maximum values noted above.

Moreover, the mixture can be formed to have a particular content of acid or base distinct from the liquid, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, ammonium citrate. According to one particular embodiment, the mixture can have a pH of less than about 5, and more particularly, within a range between about 2 and about 4, using a nitric acid additive.

According to one particular method of forming, the mixture can be used to form shaped abrasive particles via a screen printing process. Generally, a screen printing process may include extrusion of the mixture from a die into openings of a screen in an application zone. A substrate combination including a screen having openings and a belt underlying the screen can be translated under the die and the mixture can be delivered into the openings of the screen. The mixture contained in the openings can be later extracted from the openings of the screen and contained on the belt. The resulting shaped portions of mixture can be precursor shaped abrasive particles.

In accordance with an embodiment, the screen can have one or more openings having a predetermined two-dimensional shape, which may facilitate formation of shaped abrasive particles having substantially the same two-dimensional shape. It will be appreciated that there may be features of the shaped abrasive particles that may not be replicated from the shape of the opening. According to one embodiment, the opening can have various shapes, for example, a polygon, an ellipsoid, a numeral, a Greek alphabet letter, a Latin alphabet letter, a Russian alphabet character, a Kanji character, a complex shape including a combination of polygonal shapes, and a combination thereof. In particular instances, the openings may have two-dimensional polygonal shape such as, a triangle, a rectangle, a quadrilateral, a pentagon, a hexagon, a heptagon, an octagon, a nonagon, a decagon, and a combination thereof.

Notably, the mixture can be forced through the screen in rapid fashion, such that the average residence time of the mixture within the openings can be less than about 2 minutes, less than about 1 minute, less than about 40 seconds, or even less than about 20 seconds. In particular non-limiting embodiments, the mixture may be substantially unaltered during printing as it travels through the screen openings, thus experiencing no change in the amount of components from the original mixture, and may experience no appreciable drying in the openings of the screen.

The belt and/or the screen may be translated at a particular rate to facilitate processing. For example, the belt and/or the screen may be translated at a rate of at least about 3 cm/s. In other embodiments, the rate of translation of the belt and/or the screen may be greater, such as at least about 4 cm/s, at least about 6 cm/s, at least about 8 cm/s, or even at least about 10 cm/s. For certain processes according to embodiments herein, the rate of translation of the belt as compared to the rate of extrusion of the mixture may be controlled to facilitate proper processing.

Certain processing parameters may be controlled to facilitate features of the precursor shaped abrasive particles (i.e., the particles resulting from the shaping process) and the finally-formed shaped abrasive particles described herein. Some exemplary process parameters can include a release distance defining a point of separation between the screen and the belt relative to a point within the application zone, a viscosity of the mixture, a storage modulus of the mixture, mechanical properties of components within the application zone, thickness of the screen, rigidity of the screen, a solid content of the mixture, a carrier content of the mixture, a release angle between the belt and screen, a translation speed, a temperature, a content of release agent on the belt or on the surfaces of the openings of the screen, a pressure exerted on the mixture to facilitate extrusion, a speed of the belt, and a combination thereof.

After completing the shaping process, the resultant precursor shaped abrasive particles may be translated through a series of zones, wherein additional treatments can occur. Some suitable exemplary additional treatments can include drying, heating, curing, reacting, radiating, mixing, stirring, agitating, planarizing, calcining, sintering, comminuting, sieving, doping, and a combination thereof. According to one embodiment, the precursory shaped abrasive particles may be translated through an optional shaping zone, wherein at least one exterior surface of the particles may be further shaped. Additionally or alternatively, the precursor shaped abrasive particles may be translated through an application zone wherein a dopant material can be applied to at least one exterior surface of the precursor shaped abrasive particles. A dopant material may be applied utilizing various methods including for example, spraying, dipping, depositing, impregnating, transferring, punching, cutting, pressing, crushing, and any combination thereof. In particular instances, the application zone may utilize a spray nozzle, or a combination of spray nozzles to spray dopant material onto the precursor shaped abrasive particles.

In accordance with an embodiment, applying a dopant material can include the application of a particular material, such as a precursor. Some exemplary precursor materials can include a dopant material to be incorporated into the finally-formed shaped abrasive particles. For example, the metal salt can include an element or compound that is the precursor to the dopant material (e.g., a metal element). It will be appreciated that the salt may be in liquid form, such as in a mixture or solution comprising the salt and liquid carrier. The salt may include nitrogen, and more particularly, can include a nitrate. In other embodiments, the salt can be a chloride, sulfate, phosphate, and a combination thereof. In one embodiment, the salt can include a metal nitrate, and more particularly, consist essentially of a metal nitrate.

In one embodiment, the dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

In particular instances, the process of applying a dopant material can include select placement of the dopant material on an exterior surface of a precursor shaped abrasive particle. For example, the process of applying a dopant material can include the application of a dopant material to an upper surface or a bottom surface of the precursor shaped abrasive particles. In still another embodiment, one or more side surfaces of the precursor shaped abrasive particles can be treated such that a dopant material is applied thereto. It will be appreciated that various methods may be used to apply the dopant material to various exterior surfaces of the precursor shaped abrasive particles. For example, a spraying process may be used to apply a dopant material to an upper surface or side surface of the precursor shaped abrasive particles. Still, in an alternative embodiment, a dopant material may be applied to the bottom surface of the precursor shaped abrasive particles through a process such as dipping, depositing, impregnating, or a combination thereof. It will be appreciated that a surface of the belt may be treated with dopant material to facilitate a transfer of the dopant material to a bottom surface of precursor shaped abrasive particles.

And further, the precursor shaped abrasive particles may be translated on the belt through a post-forming zone, wherein a variety of processes, including for example, drying, may be conducted on the precursor shaped abrasive particles as described in embodiments herein. Various processes may be conducted in the post-forming zone, including treating of the precursor shaped abrasive particles. In one embodiment, the post-forming zone can include a heating process, wherein the precursor shaped abrasive particles may be dried. Drying may include removal of a particular content of material, including volatiles, such as water. In accordance with an embodiment, the drying process can be conducted at a drying temperature of not greater than about 300° C., such as not greater than about 280° C., or even not greater than about 250° C. Still, in one non-limiting embodiment, the drying process may be conducted at a drying temperature of at least about 50° C. It will be appreciated that the drying temperature may be within a range between any of the minimum and maximum temperatures noted above. Furthermore, the precursor shaped abrasive particles may be translated through the post-forming zone at a particular rate, such as at least about 0.2 feet/min (0.06 m/min) and not greater than about 8 feet/min (2.4 m/min).

In accordance with an embodiment, the process of forming shaped abrasive particles may further comprise a sintering process. For certain processes of embodiments herein, sintering can be conducted after collecting the precursor shaped abrasive particles from the belt. Alternatively, the sintering may be a process that is conducted while the precursor shaped abrasive particles are on the belt. Sintering of the precursor shaped abrasive particles may be utilized to densify the particles, which are generally in a green state. In a particular instance, the sintering process can facilitate the formation of a high-temperature phase of the ceramic material. For example, in one embodiment, the precursor shaped abrasive particles may be sintered such that a high-temperature phase of alumina, such as alpha alumina is formed. In one instance, a shaped abrasive particle can comprise at least about 90 wt % alpha alumina for the total weight of the particle. In other instances, the content of alpha alumina may be greater, such that the shaped abrasive particle may consist essentially of alpha alumina.

Shaped Abrasive Particles

The shaped abrasive particles can be formed to have various shapes. In general, the shaped abrasive particles may be formed to have a shape approximating shaping components used in the forming process. For example, a shaped abrasive particle may have a predetermined two-dimensional shape as viewed in any two dimensions of the three dimension shape, and particularly in a dimension defined by the length and width of the particle. Some exemplary two-dimensional shapes can include a polygon, an ellipsoid, a numeral, a Greek alphabet letter, a Latin alphabet letter, a Russian alphabet character, a Kanji character, a complex shape including a combination of polygonal shapes, and a combination thereof. In particular instances, the shaped abrasive particle may have two-dimensional polygonal shape such as, a triangle, a rectangle, a quadrilateral, a pentagon, a hexagon, a heptagon, an octagon, a nonagon, a decagon, and a combination thereof.

Figure 8A:
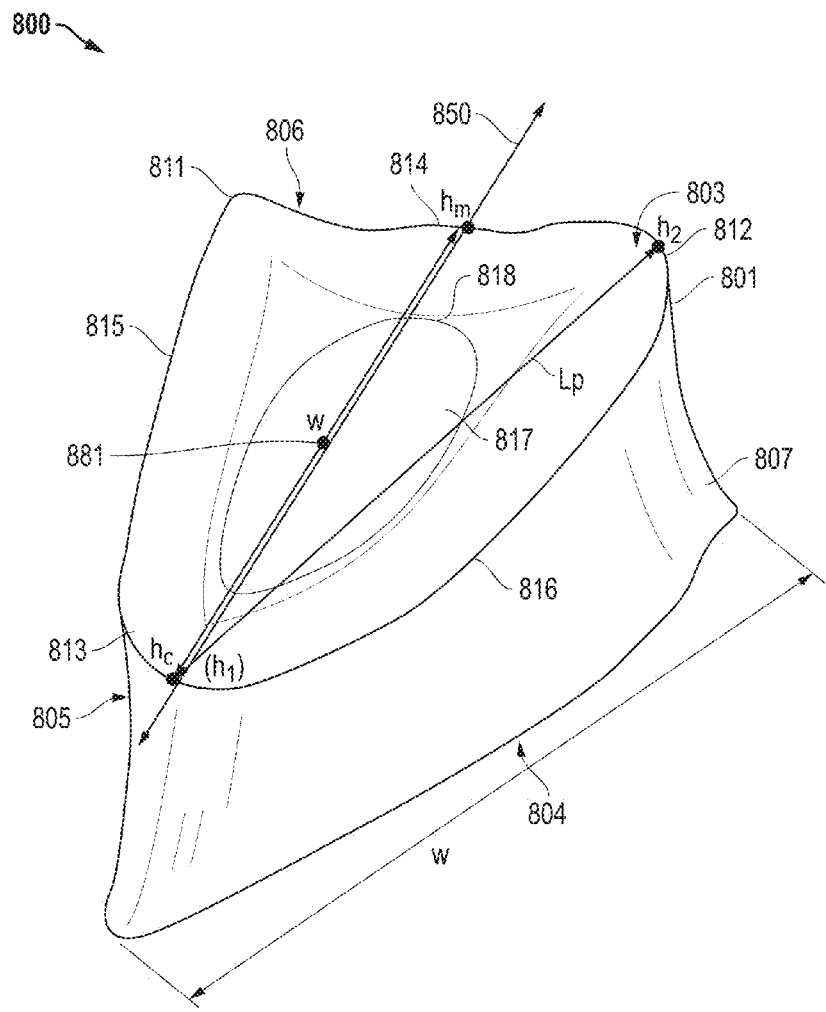
FIG. 8A includes a perspective view illustration of a shaped abrasive particle in accordance with an embodiment.
Figure 8B:
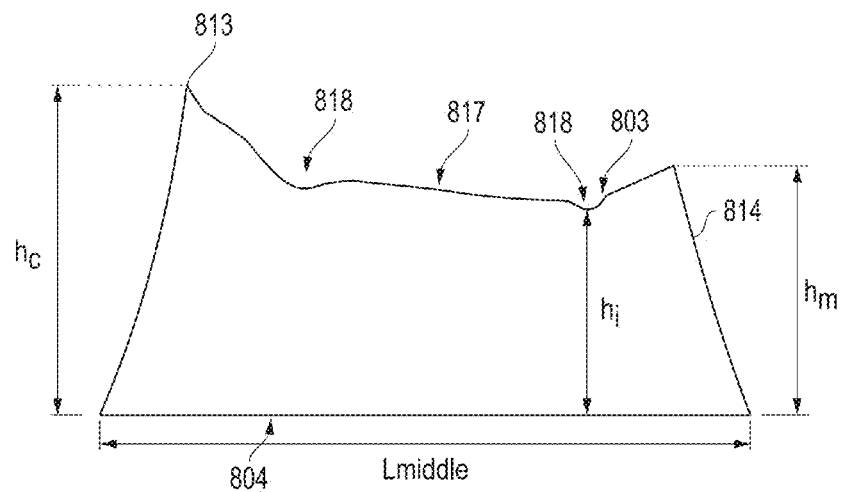
FIG. 8B includes a cross-sectional illustration of the shaped abrasive particle of FIG. 8A.

In one particular aspect, the shaped abrasive particles may be formed to have a shape as illustrated in FIG. 8A. FIG. 8A includes a perspective view illustration of a shaped abrasive particle in accordance with an embodiment. Additionally, FIG. 8B includes a cross-sectional illustration of the shaped abrasive particle of FIG. 8A. The body 801 includes an upper surface 803 a bottom surface 804 opposite the upper surface 803. The upper surface 803 and the bottom surface 804 can be separated from each other by side surfaces 805, 806, and 807. As illustrated, the body 801 of the shaped abrasive particle 800 can have a generally triangular shape as viewed in a plane defined by the upper surface 803. In particular, the body 801 can have a length (Lmiddle) as shown in FIG. 8B, which may be measured at the bottom surface 804 of the body 801 and extending from a corner at the bottom surface corresponding to corner 813 at the top surface through a midpoint 881 of the body 801 to a midpoint at the opposite edge of the body corresponding to the edge 814 at the upper surface of the body. Alternatively, the body can be defined by a second length or profile length (Lp), which is the measure of the dimension of the body from a side view at the upper surface 803 from a first corner 813 to an adjacent corner 812. Notably, the dimension of Lmiddle can be a length defining a distance between a height at a corner (hc) and a height at a midpoint edge (hm) opposite the corner. The dimension Lp can be a profile length along a side of the particle defining the distance between h1 and h2 (as explained herein). Reference herein to the length can be reference to either Lmiddle or Lp.

The body 801 can further include a width (w) that is the longest dimension of the body and extending along a side. The shaped abrasive particle can further include a height (h), which may be a dimension of the shaped abrasive particle extending in a direction perpendicular to the length and width in a direction defined by a side surface of the body 801. Notably, as will be described in more detail herein, the body 801 can be defined by various heights depending upon the location on the body. In specific instances, the width can be greater than or equal to the length, the length can be greater than or equal to the height, and the width can be greater than or equal to the height.

Moreover, reference herein to any dimensional characteristic (e.g., h1, h2, hi, w, Lmiddle, Lp, and the like) can be reference to a dimension of a single particle of a batch. Alternatively, any reference to any of the dimensional characteristics can refer to a median value or an average value derived from analysis of a suitable sampling of particles from a batch. Unless stated explicitly, reference herein to a dimensional characteristic can be considered reference to a median value that is a based on a statistically significant value derived from a sample size of suitable number of particles of a batch. Notably, for certain embodiments herein, the sample size can include at least 40 randomly selected particles from a batch of particles. A batch of particles may be a group of particles that are collected from a single process run, and more particularly, may include an amount of shaped abrasive particles suitable for forming a commercial grade abrasive product, such as at least about 20 lbs. of particles.

In accordance with an embodiment, the body 801 of the shaped abrasive particle can have a first corner height (hc) at a first region of the body defined by a corner 813. Notably, the corner 813 may represent the point of greatest height on the body 801, however, the height at the corner 813 does not necessarily represent the point of greatest height on the body 801. The corner 813 can be defined as a point or region on the body 301 defined by the joining of the upper surface 803, and two side surfaces 805 and 807. The body 801 may further include other corners, spaced apart from each other, including for example, corner 811 and corner 812. As further illustrated, the body 801 can include edges 814, 815, and 816 that can separated from each other by the corners 811, 812, and 813. The edge 814 can be defined by an intersection of the upper surface 803 with the side surface 806. The edge 815 can be defined by an intersection of the upper surface 803 and side surface 805 between corners 811 and 813. The edge 816 can be defined by an intersection of the upper surface 803 and side surface 807 between corners 812 and 813.

As further illustrated, the body 801 can include a second midpoint height (hm) at a second end of the body 801, which can be defined by a region at the midpoint of the edge 814, which can be opposite the first end defined by the corner 813. The axis 850 can extend between the two ends of the body 801. FIG. 8B is a cross-sectional illustration of the body 801 along the axis 850, which can extend through a midpoint 881 of the body 801 along the dimension of length (Lmiddle) between the corner 813 and the midpoint of the edge 814.

In accordance with an embodiment, the shaped abrasive particles of the embodiments herein, including for example, the particle of FIGS. 8A and 8B can have an average difference in height, which is a measure of the difference between hc and hm. For convention herein, average difference in height will be generally identified as hc-hm, however it is defined an absolute value of the difference and it will be appreciated that average difference in height may be calculated as hm-hc when the height of the body 801 at the midpoint of the edge 814 is greater than the height at the corner 813. More particularly, the average difference in height can be calculated based upon a plurality of shaped abrasive particles from a suitable sample size, such as at least 40 particles from a batch as defined herein. The heights hc and hm of the particles can be measured using a STIL (Sciences et Techniques Industrielles de la Lumiere—France) Micro Measure 3D Surface Profilometer (white light (LED) chromatic aberration technique) and the average difference in height can be calculated based on the average values of hc and hm from the sample.

As illustrated in FIG. 8B, in one particular embodiment, the body 801 of the shaped abrasive particle may have an average difference in height at different locations at the body. The body can have an average difference in height, which can be the absolute value of [hc–hm] between the first corner height (hc) and the second midpoint height (hm) is at least about 20 microns. It will be appreciated that average difference in height may be calculated as hm-hc when the height of the body 801 at a midpoint of the edge is greater than the height at an opposite corner. In other instances, the average difference in height [hc–hm], can be at least about 25 microns, at least about 30 microns, at least about 36 microns, at least about 40 microns, at least about 60 microns, such as at least about 65 microns, at least about 70 microns, at least about 75 microns, at least about 80 microns, at least about 90 microns, or even at least about 100 microns. In one non-limiting embodiment, the average difference in height can be not greater than about 300 microns, such as not greater than about 250 microns, not greater than about 220 microns, or even not greater than about 180 microns. It will be appreciated that the average difference in height can be within a range between any of the minimum and maximum values noted above.

Moreover, it will be appreciated that the average difference in height can be based upon an average value of hc. For example, the average height of the body at the corners (Ahc) can be calculated by measuring the height of the body at all corners and averaging the values, and may be distinct from a single value of height at one corner (hc). Accordingly, the average difference in height may be given by the absolute value of the equation [Ahc–hi], wherein hi is the interior height which can be the smallest dimension of height of the body as measured along a dimension between any corner and opposite midpoint edge on the body. Furthermore, it will be appreciated that the average difference in height can be calculated using a median interior height (Mhi) calculated from a suitable sample size of a batch of shaped abrasive particles and an average height at the corners for all particles in the sample size. Accordingly, the average difference in height may be given by the absolute value of the equation [Ahc–Mhi].

In particular instances, the body 801 can be formed to have a primary aspect ratio, which is a ratio expressed as width:length, wherein the length may be Lmidddle, having a value of at least 1:1. In other instances, the body can be formed such that the primary aspect ratio (w:l) is at least about 1.5:1, such as at least about 2:1, at least about 4:1, or even at least about 5:1. Still, in other instances, the abrasive particle can be formed such that the body has a primary aspect ratio that is not greater than about 10:1, such as not greater than 9:1, not greater than about 8:1, or even not greater than about 5:1. It will be appreciated that the body 801 can have a primary aspect ratio within a range between any of the ratios noted above. Furthermore, it will be appreciated that reference herein to a height is the maximum height measurable of the abrasive particle. It will be described later that the abrasive particle may have different heights at different positions within the body 801.

In addition to the primary aspect ratio, the abrasive particle can be formed such that the body 801 comprises a secondary aspect ratio, which can be defined as a ratio of length:height, wherein the length may be Lmiddle and the height is an interior height (hi). In certain instances, the secondary aspect ratio can be within a range between about 5:1 and about 1:3, such as between about 4:1 and about 1:2, or even between about 3:1 and about 1:2. It will be appreciated that the same ratio may be measured using median values (e.g., median length and interior median height) for a batch of particles.

In accordance with another embodiment, the abrasive particle can be formed such that the body 801 comprises a tertiary aspect ratio, defined by the ratio width:height, wherein the height is an interior height (hi). The tertiary aspect ratio of the body 801 can be within a range between about 10:1 and about 1.5:1, such as between 8:1 and about 1.5:1, such as between about 6:1 and about 1.5:1, or even between about 4:1 and about 1.5:1. It will be appreciated that the same ratio may be measured using median values (e.g., median length, median middle length, and/or interior median height) for a batch of particles.

According to one embodiment, the body 801 of the shaped abrasive particle can have particular dimensions, which may facilitate improved performance. For example, in one instance, the body can have an interior height (hi), which can be the smallest dimension of height of the body as measured along a dimension between any corner and opposite midpoint edge on the body. In particular instances, wherein the body is a generally triangular two-dimensional shape, the interior height (hi) may be the smallest dimension of height (i.e., measure between the bottom surface 804 and the upper surface 805) of the body for three measurements taken between each of the three corners and the opposite midpoint edges. The interior height (hi) of the body of a shaped abrasive particle is illustrated in FIG. 8B. According to one embodiment, the interior height (hi) can be at least about 28% of the width (w). The height (hi) of any particle may be measured by sectioning or mounting and grinding the shaped abrasive particle and viewing in a manner sufficient (e.g., light microscope or SEM) to determine the smallest height (hi) within the interior of the body 801. In one particular embodiment, the height (hi) can be at least about 29% of the width, such as at least about 30%, or even at least about 33% of the width of the body. For one non-limiting embodiment, the height (hi) of the body can be not greater than about 80% of the width, such as not greater than about 76%, not greater than about 73%, not greater than about 70%, not greater than about 68% of the width, not greater than about 56% of the width, not greater than about 48% of the width, or even not greater than about 40% of the width. It will be appreciated that the height (hi) of the body can be within a range between any of the above noted minimum and maximum percentages.

A batch of shaped abrasive particles can be fabricated, wherein the median interior height value (Mhi) can be controlled, which may facilitate improved performance. In particular, the median internal height (hi) of a batch can be related to a median width of the shaped abrasive particles of the batch in the same manner as described above. Notably, the median interior height (Mhi) can be at least about 28%, such as at least about 29%, at least about 30%, or even at least about 33% of the median width of the shaped abrasive particles of the batch. For one non-limiting embodiment, the median interior height (Mhi) of the body can be not greater than about 80%, such as not greater than about 76%, not greater than about 73%, not greater than about 70%, not greater than about 68% of the width, not greater than about 56% of the width, not greater than about 48% of the width, or even not greater than about 40% of the median width. It will be appreciated that the median interior height (Mhi) of the body can be within a range between any of the above noted minimum and maximum percentages.

Furthermore, the batch of shaped abrasive particles may exhibit improved dimensional uniformity as measured by the standard deviation of a dimensional characteristic from a suitable sample size. According to one embodiment, the shaped abrasive particles can have an interior height variation (Vhi), which can be calculated as the standard deviation of interior height (hi) for a suitable sample size of particles from a batch. According to one embodiment, the interior height variation can be not greater than about 60 microns, such as not greater than about 58 microns, not greater than about 56 microns, or even not greater than about 54 microns. In one non-limiting embodiment, the interior height variation (Vhi) can be at least about 2 microns. It will be appreciated that the interior height variation of the body can be within a range between any of the above noted minimum and maximum values.

For another embodiment, the body of the shaped abrasive particle can have an interior height (hi) of at least about 400 microns. More particularly, the height may be at least about 450 microns, such as at least about 475 microns, or even at least about 500 microns. In still one non-limiting embodiment, the height of the body can be not greater than about 3 mm, such as not greater than about 2 mm, not greater than about 1.5 mm, not greater than about 1 mm, not greater than about 800 microns. It will be appreciated that the height of the body can be within a range between any of the above noted minimum and maximum values. Moreover, it will be appreciated that the above range of values can be representative of a median interior height (Mhi) value for a batch of shaped abrasive particles.

For certain embodiments herein, the body of the shaped abrasive particle can have particular dimensions, including for example, a width>length, a length>height, and a width>height. More particularly, the body 801 of the shaped abrasive particle can have a width (w) of at least about 600 microns, such as at least about 700 microns, at least about 800 microns, or even at least about 900 microns. In one non-limiting instance, the body can have a width of not greater than about 4 mm, such as not greater than about 3 mm, not greater than about 2.5 mm, or even not greater than about 2 mm. It will be appreciated that the width of the body can be within a range between any of the above noted minimum and maximum values. Moreover, it will be appreciated that the above range of values can be representative of a median width (Mw) for a batch of shaped abrasive particles.

The body 801 of the shaped abrasive particle can have particular dimensions, including for example, a length (L middle or Lp) of at least about 0.4 mm, such as at least about 0.6 mm, at least about 0.8 mm, or even at least about 0.9 mm. Still, for at least one non-limiting embodiment, the body 801 can have a length of not greater than about 4 mm, such as not greater than about 3 mm, not greater than about 2.5 mm, or even not greater than about 2 mm. It will be appreciated that the length of the body 801 can be within a range between any of the above noted minimum and maximum values. Moreover, it will be appreciated that the above range of values can be representative of a median length (Ml), which may be more particularly, a median middle length (MLmiddle) or median profile length (MLp) for a batch of shaped abrasive particles.

The shaped abrasive particle can have a body 801 having a particular amount of dishing, wherein the dishing value (d) can be defined as a ratio between an average height of the body 801 at the corners (Ahc) as compared to smallest dimension of height of the body at the interior (hi). The average height of the body 801 at the corners (Ahc) can be calculated by measuring the height of the body at all corners and averaging the values, and may be distinct from a single value of height at one corner (hc). The average height of the body 801 at the corners or at the interior can be measured using a STIL (Sciences et Techniques Industrielles de la Lumiere—France) Micro Measure 3D Surface Profilometer (white light (LED) chromatic aberration technique). Alternatively, the dishing may be based upon a median height of the particles at the corner (Mhc) calculated from a suitable sampling of particles from a batch. Likewise, the interior height (hi) can be a median interior height (Mhi) derived from a suitable sampling of shaped abrasive particles from a batch. According to one embodiment, the dishing value (d) can be not greater than about 2, such as not greater than about 1.9, not greater than about 1.8, not greater than about 1.7, not greater than about 1.6, or even not greater than about 1.5. Still, in at least one non-limiting embodiment, the dishing value (d) can be at least about 0.9, such as at least about 1.0. It will be appreciated that the dishing ratio can be within a range between any of the minimum and maximum values noted above. Moreover, it will be appreciated that the above dishing values can be representative of a median dishing value (Md) for a batch of shaped abrasive particles.

The shaped abrasive particles of the embodiments herein, including for example, the body 801 of the particle of FIG. 8A can have a bottom surface 804 defining a bottom area ($A_b$). In particular instances the bottom surface 304 can be the largest surface of the body 801. The bottom surface can have a surface area defined as the bottom area ($A_b$) that is greater than the surface area of the upper surface 803.

Additionally, the body 801 can have a cross-sectional midpoint area ($A_m$) defining an area of a plane perpendicular to the bottom area and extending through a midpoint 881 (a between the top and bottom surfaces) of the particle. In certain instances, the body 801 can have an area ratio of bottom area to midpoint area ($A_b/A_m$) of not greater than about 6. In more particular instances, the area ratio can be not greater than about 5.5, such as not greater than about 5, not greater than about 4.5, not greater than about 4, not greater than about 3.5, or even not greater than about 3. Still, in one non-limiting embodiment, the area ratio may be at least about 1.1, such as at least about 1.3, or even at least about 1.8. It will be appreciated that the area ratio can be within a range between any of the minimum and maximum values noted above. Moreover, it will be appreciated that the above area ratios can be representative of a median area ratio for a batch of shaped abrasive particles.

Furthermore the shaped abrasive particles of the embodiments herein, including for example, the particle of FIG. 8B can have a normalized height difference of at least about 0.3. The normalized height difference can be defined by the absolute value of the equation $[(hc-hm)/(hi)]$. In other embodiments, the normalized height difference can be not greater than about 0.26, such as not greater than about 0.22, or even not greater than about 0.19. Still, in one particular embodiment, the normalized height difference can be at least about 0.04, such as at least about 0.05, at least about 0.06. It will be appreciated that the normalized height difference can be within a range between any of the minimum and maximum values noted above. Moreover, it will be appreciated that the above normalized height values can be representative of a median normalized height value for a batch of shaped abrasive particles.

In another instance, the body 801 can have a profile ratio of at least about 0.04, wherein the profile ratio is defined as a ratio of the average difference in height [hc–hm] to the length (Lmiddle) of the shaped abrasive particle, defined as the absolute value of $[(hc-hm)/(Lmiddle)]$. It will be appreciated that the length (Lmiddle) of the body can be the distance across the body 801 as illustrated in FIG. 8B. Moreover, the length may be an average or median length calculated from a suitable sampling of particles from a batch of shaped abrasive particles as defined herein. According to a particular embodiment, the profile ratio can be at least about 0.05, at least about 0.06, at least about 0.07, at least about 0.08, or even at least about 0.09. Still, in one non-limiting embodiment, the profile ratio can be not greater than about 0.3, such as not greater than about 0.2, not greater than about 0.18, not greater than about 0.16, or even not greater than about 0.14. It will be appreciated that the profile ratio can be within a range between any of the minimum and maximum values noted above. Moreover, it will be appreciated that the above profile ratio can be representative of a median profile ratio for a batch of shaped abrasive particles.

According to another embodiment, the body 801 can have a particular rake angle, which may be defined as an angle between the bottom surface 804 and a side surface 805, 806 or 807 of the body. For example, the rake angle may be within a range between about 1° and about 80°. For other particles herein, the rake angle can be within a range between about 5° and 55°, such as between about 10° and about 50°, between about 15° and 50°, or even between about 20° and 50°. Formation of an abrasive particle having such a rake angle can improve the abrading capabilities of the abrasive particle. Notably, the rake angle can be within a range between any two rake angles noted above.

According to another embodiment, the shaped abrasive particles herein, including for example the particles of FIGS. 8A and 8B can have an ellipsoidal region 817 in the upper surface 803 of the body 801. The ellipsoidal region 817 can be defined by a trench region 818 that can extend around the upper surface 803 and define the ellipsoidal region 817. The ellipsoidal region 817 can encompass the midpoint 881. Moreover, it is thought that the ellipsoidal region 817 defined in the upper surface can be an artifact of the forming process, and may be formed as a result of the stresses imposed on the mixture during formation of the shaped abrasive particles according to the methods described herein.

The shaped abrasive particle can be formed such that the body includes a crystalline material, and more particularly, a polycrystalline material. Notably, the polycrystalline material can include abrasive grains. In one embodiment, the body can be essentially free of an organic material, including for example, a binder. More particularly, the body can consist essentially of a polycrystalline material.

In one aspect, the body of the shaped abrasive particle can be an agglomerate including a plurality of abrasive particles, grit, and/or grains bonded to each other to form the body 801 of the abrasive particle 800. Suitable abrasive grains can include nitrides, oxides, carbides, borides, oxynitrides, oxyborides, diamond, superabrasives (e.g., cBN) and a combination thereof. In particular instances, the abrasive grains can include an oxide compound or complex, such as aluminum oxide, zirconium oxide, titanium oxide, yttrium oxide, chromium oxide, strontium oxide, silicon oxide, and a combination thereof. In one particular instance, the abrasive particle 800 is formed such that the abrasive grains forming the body 800 include alumina, and more particularly, may consist essentially of alumina. In an alternative embodiment, the shaped abrasive particles can include geosets, including for example, polycrystalline compacts of abrasive or superabrasive materials including a binder phase, which may include a metal, metal alloy, super alloy, cermet, and a combination thereof. Some exemplary binder materials can include cobalt, tungsten, and a combination thereof.

The abrasive grains (i.e., crystallites) contained within the body may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, or even not greater than about 1 micron. Still, the average grain size of the abrasive grains contained within the body can be at least about 0.01 microns, such as at least about 0.05 microns, such as at least about 0.08 microns, at least about 0.1 microns, or even at least about 1 micron. It will be appreciated that the abrasive grains can have an average grain size within a range between any of the minimum and maximum values noted above.

In accordance with certain embodiments, the abrasive particle can be a composite article including at least two different types of abrasive grains within the body. It will be appreciated that different types of abrasive grains are abrasive grains having different compositions with regard to each other. For example, the body can be formed such that is includes at least two different types of abrasive grains, wherein the two different types of abrasive grains can be nitrides, oxides, carbides, borides, oxynitrides, oxyborides, diamond, and a combination thereof.

In accordance with an embodiment, the abrasive particle 800 can have an average particle size, as measured by the largest dimension measurable on the body 801, of at least about 100 microns. In fact, the abrasive particle 800 can have an average particle size of at least about 150 microns, such as at least about 200 microns, at least about 300 microns, at least about 400 microns, at least about 500 microns, at least about 600 microns, at least about 700 microns, at least about 800 microns, or even at least about 900 microns. Still, the abrasive particle 800 can have an average particle size that is not greater than about 5 mm, such as not greater than about 3 mm, not greater than about 2 mm, or even not greater than about 1.5 mm. It will be appreciated that the abrasive particle 100 can have an average particle size within a range between any of the minimum and maximum values noted above.

Figure 8C:
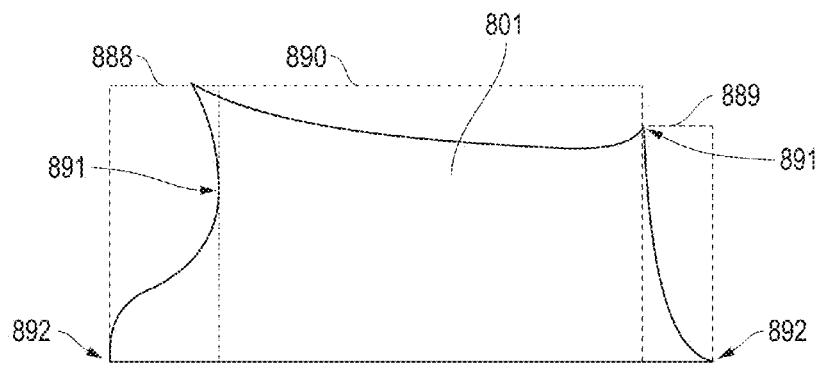
FIG. 8C includes a side-view illustration of a shaped abrasive particle according to an embodiment.

The shaped abrasive particles of the embodiments herein can have a percent flashing that may facilitate improved performance. Notably, the flashing defines an area of the particle as viewed along one side, such as illustrated in FIG. 8C, wherein the flashing extends from a side surface of the body within the boxes 888 and 889. The flashing can represent tapered regions proximate to the upper surface and bottom surface of the body. The flashing can be measured as the percentage of area of the body along the side surface contained within a box extending between an innermost point of the side surface (e.g., 891) and an outermost point (e.g., 892) on the side surface of the body. In one particular instance, the body can have a particular content of flashing, which can be the percentage of area of the body contained within the boxes 888 and 889 compared to the total area of the body contained within boxes 888, 889, and 890. According to one embodiment, the percent flashing (f) of the body can be at least about 10%. In another embodiment, the percent flashing can be greater, such as at least about 12%, such as at least about 14%, at least about 16%, at least about 18%, or even at least about 20%. Still, in a non-limiting embodiment, the percent flashing of the body can be controlled and may be not greater than about 45%, such as not greater than about 40%, or even not greater than about 36%. It will be appreciated that the percent flashing of the body can be within a range between any of the above minimum and maximum percentages. Moreover, it will be appreciated that the above flashing percentages can be representative of an average flashing percentage or a median flashing percentage for a batch of shaped abrasive particles.

The percent flashing can be measured by mounting the shaped abrasive particle on its side and viewing the body at the side to generate a black and white image, such as illustrated in FIG. 8C. A suitable program for creating and analyzing images including the calculation of the flashing can be ImageJ software. The percentage flashing can be calculated by determining the area of the body 801 in the boxes 888 and 889 compared to the total area of the body as viewed at the side (total shaded area), including the area in the center 890 and within the boxes 888 and 889. Such a procedure can be completed for a suitable sampling of particles to generate average, median, and/or and standard deviation values.

A batch of shaped abrasive particles according to embodiments herein may exhibit improved dimensional uniformity as measured by the standard deviation of a dimensional characteristic from a suitable sample size. According to one embodiment, the shaped abrasive particles can have a flashing variation (Vf), which can be calculated as the standard deviation of flashing percentage (f) for a suitable sample size of particles from a batch. According to one embodiment, the flashing variation can be not greater than about 5.5%, such as not greater than about 5.3%, not greater than about 5%, or not greater than about 4.8%, not greater than about 4.6%, or even not greater than about 4.4%. In one non-limiting embodiment, the flashing variation (Vf) can be at least about 0.1%. It will be appreciated that the flashing variation can be within a range between any of the minimum and maximum percentages noted above.

The shaped abrasive particles of the embodiments herein can have a height (hi) and flashing multiplier value (hiF) of at least 4000, wherein hiF=(hi)(f), an "hi" represents a minimum interior height of the body as described above and "f" represents the percent flashing. In one particular instance, the height and flashing multiplier value (hiF) of the body can be greater, such as at least about 4500 micron %, at least about 5000 micron %, at least about 6000 micron %, at least about 7000 micron %, or even at least about 8000 micron %. Still, in one non-limiting embodiment, the height and flashing multiplier value can be not greater than about 45000 micron %, such as not greater than about 30000 micron %, not greater than about 25000 micron %, not greater than about 20000 micron %, or even not greater than about 18000 micron %. It will be appreciated that the height and flashing multiplier value of the body can be within a range between any of the above minimum and maximum values. Moreover, it will be appreciated that the above multiplier value can be representative of a median multiplier value (MhiF) for a batch of shaped abrasive particles.

The shaped abrasive particles of the embodiments herein can have a dishing (d) and flashing (F) multiplier value (dF) as calculated by the equation dF=(d)(F), wherein dF is not greater than about 90%, "d" represents the dishing value, and "f" represents the percentage flashing of the body. In one particular instance, the dishing (d) and flashing (F) multiplier value (dF) of the body can be not greater than about 70%, such as not greater than about 60%, not greater than about 55%, not greater than about 48%, not greater than about 46%. Still, in one non-limiting embodiment, the dishing (d) and flashing (F) multiplier value (dF) can be at least about 10%, such as at least about 15%, at least about 20%, at least about 22%, at least about 24%, or even at least about 26%. It will be appreciated that the dishing (d) and flashing (F) multiplier value (dF) of the body can be within a range between any of the above minimum and maximum values. Moreover, it will be appreciated that the above multiplier value can be representative of a median multiplier value (MdF) for a batch of shaped abrasive particles.

The shaped abrasive particles of the embodiments herein can have a height and dishing ratio (hi/d) as calculated by the equation hi/d=(hi)/(d), wherein hi/d is not greater than about 1000, "hi" represents a minimum interior height as described above, and "d" represents the dishing of the body. In one particular instance, the ratio (hi/d) of the body can be not greater than about 900 microns, not greater than about 800 microns, not greater than about 700 microns, or even not greater than about 650 microns. Still, in one non-limiting embodiment, the ratio (hi/d), can be at least about 10 microns, such as at least about 50 microns, at least about 100 microns, at least about 150 microns, at least about 200 microns, at least about 250 microns, or even at least about 275 microns. It will be appreciated that the ratio (hi/d) of the body can be within a range between any of the above minimum and maximum values. Moreover, it will be appreciated that the above height and dishing ratio can be representative of a median height and dishing ratio (Mhi/d) for a batch of shaped abrasive particles.

Abrasive Articles

FIG. 1A includes a top view illustration of a portion of an abrasive article according to an embodiment. As illustrated, the abrasive article 100 can include a backing 101. The backing 101 can include an organic material, inorganic material, and a combination thereof. In certain instances, the backing 101 can include a woven material. However, the backing 101 may be made of a non-woven material. Particularly suitable backing materials can include organic materials, including polymers, and particularly, polyester, polyurethane, polypropylene, polyimides such as KAPTON from DuPont, and paper. Some suitable inorganic materials can include metals, metal alloys, and particularly, foils of copper, aluminum, steel, and a combination thereof. It will be appreciated that the abrasive article 100 can include other components, including for example adhesive layers (e.g. make coat, size coat, front fill, etc.), which will be discussed in more detail herein.

As further illustrated, the abrasive article 100 can include a shaped abrasive particle 102 overlying the backing 101, and more particularly, coupled to the backing 101. Notably, the shaped abrasive particle 102 can be placed at a first, predetermined position 112 on the backing 101. As further illustrated, the abrasive article 100 can further include a shaped abrasive particle 103 that may be overlying the backing 101, and more particularly, coupled to the backing 101 in a second, predetermined position 113. The abrasive article 100 can further include a shaped abrasive particle 104 overlying the backing 101, and more particularly, coupled to the backing 101 in a third, predetermined position 114. As further illustrated in FIG. 1A, the abrasive article 100 can further include a shaped abrasive particle 105 overlying the backing 101, and more particularly, coupled to the backing 101 in a fourth, predetermined position 115. As further illustrated, the abrasive article 100 can include a shaped abrasive particle overlying the backing 101, and more particularly, coupled to the backing 101 in a fifth, predetermined position 116. It will be appreciated that any of the shaped abrasive particles described herein may be coupled to the backing 101 via one or more adhesive layers as described herein.

In accordance with an embodiment, the shaped abrasive particle 102 can have a first composition. For example, the first composition can include a crystalline material. In one particular embodiment, the first composition can include a ceramic material, such as an oxide, carbide, nitride, boride, oxynitride, oxycarbide, and a combination thereof. More particularly, the first composition may consist essentially of a ceramic, such that it may consist essentially of an oxide, carbide, nitride, boride, oxynitride, oxycarbide, and a combination thereof. Still, in an alternative embodiment, the first composition can include a superabrasive material. Still in other embodiments, the first composition can include a single phase material, and more particularly may consist essentially of a single phase material. Notably, the first composition may be a single phase polycrystalline material. In specific instances, the first composition may have limited binder content, such that the first composition may have not greater than about 1% binder material. Some suitable exemplary binders materials can include organic materials, and more particularly, polymer containing compounds. More notably, the first composition may be essentially free of binder material and may be essentially free of an organic material. In accordance with one embodiment, the first composition can include alumina, and more particularly, may consist essentially of alumina, such as alpha alumina.

Still, in yet another aspect, the shaped abrasive particle 102 can have a first composition that can be a composite including at least two different types of abrasive grains within the body. It will be appreciated that different types of abrasive grains are abrasive grains having different compositions with regard to each other. For example, the body can be formed such that is includes at least two different types of abrasive grains, wherein the two different types of abrasive grains can be nitrides, oxides, carbides, borides, oxynitrides, oxyborides, diamond, and a combination thereof.

In one embodiment, the first composition may include a dopant material, wherein the dopant material is present in a minor amount. Some suitable exemplary dopant materials can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

The second shaped abrasive particle 103 may have a second composition. In certain instances, the second composition of the second shaped abrasive particle 103 may be substantially the same as the first composition of the first shaped abrasive particle 102. More particularly, the second composition may be essentially the same as the first composition. Still, in an alternative embodiment, the second composition of the second shaped abrasive particle 103 may be significantly different that the first composition of the first shaped abrasive particle 102. It will be appreciated that the second composition can include any of the materials, elements, and compounds described in accordance with the first composition.

In accordance with an embodiment, and as further illustrated in FIG. 1A, the first shaped abrasive particle 102 and second shaped abrasive particle 103 may be arranged in a predetermined distribution relative to each other.

A predetermined distribution can be defined by a combination of predetermined positions on a backing that are purposefully selected. A predetermined distribution can include a pattern, such that the predetermined positions can define a two-dimensional array. An array can include have short range order defined by a unit of shaped abrasive particles. An array may also be a pattern, having long range order including regular and repetitive units linked together, such that the arrangement may be symmetrical and/or predictable. An array may have an order that can be predicted by a mathematical formula. It will be appreciated that two-dimensional arrays can be formed in the shape of polygons, ellipsis, ornamental indicia, product indicia, or other designs.

A predetermined distribution can also include a non-shadowing arrangement. A non-shadowing arrangement may include a controlled, non-uniform distribution, a controlled uniform distribution, and a combination thereof. In particular instances, a non-shadowing arrangement may include a radial pattern, a spiral pattern, a phyllotactic pattern, an asymmetric pattern, a self-avoiding random distribution, a self-avoiding random distribution and a combination thereof. Non-shadowing arrangements include a particular arrangement of abrasive particles (i.e., shaped abrasive particles and/or diluent particles) relative to each other, wherein the degree of overlap of the abrasive particles during an initial phase of a material removal operation is not greater than about 25%, such as not greater than about 20%, not greater than about 15%, not greater than about 10%, or even not greater than about 5%. In particular instances, a non-shadowing arrangement may include a distribution of abrasive particles, wherein upon engagement with a workpiece during an initial stage of a material removal operation, a portion (e.g., a minority of all shaped abrasive particles on the backing, a majority of all shaped abrasive particles on the backing, or even essentially all) of the abrasive particles engage a different region of the surface of the workpiece. A non-shadowing arrangement may utilize a particular distribution of shaped abrasive particles relative to each other and relative to a grinding direction as described in embodiments herein. Utilization of an abrasive article employing a non-shadowing arrangement of abrasive particles can facilitate improved grinding performance over other abrasive articles using conventional patterned arrangements (i.e., shadowed arrangement) and may limit other undesirable effects, such as steering of the abrasive article during operation.

The predetermined distribution can be partially, substantially, or fully asymmetric. The predetermined distribution can overlie the entire abrasive article, can cover substantially the entire abrasive article (i.e. greater than 50% but less than 100%), overlie multiple portions of the abrasive article, or overlie a fraction of the abrasive article (i.e., less than 50% of the surface area of the article). As used herein, "a phyllotactic pattern" means a pattern related to phyllotaxis. Phyllotaxis is the arrangement of lateral organs such as leaves, flowers, scales, florets, and seeds in many kinds of plants. Many phyllotactic patterns are marked by the naturally occurring phenomenon of conspicuous patterns having arcs, spirals, and whorls. The pattern of seeds in the head of a sunflower is an example of this phenomenon.

Furthermore, according to one embodiment, a non-shadowing arrangement can include a microunit, which may be defined as a smallest arrangement of shaped abrasive particles relative to each other. The microunit may repeat a plurality of times across at least a portion of the surface of the abrasive article. A non-shadowing arrangement may further include a macrounit, which can include a plurality of microunits. In particular instances, the macrounit may have a plurality of microunits arranged in a predetermined distribution relative to each other and repeating a plurality of times with the non-shadowing arrangement. Abrasive articles of the embodiments herein can include one or more microunits. Furthermore, it will be appreciated that the abrasive articles of the embodiments herein can include one or more macrounits. In certain embodiments, the macrounits may be arranged in a uniform distribution having a predictable order. Still, in other instances, the macrounits may be arranged in a non-uniform distribution, which may include a random distribution, having no predictable long range or short range order.

Figure 25:
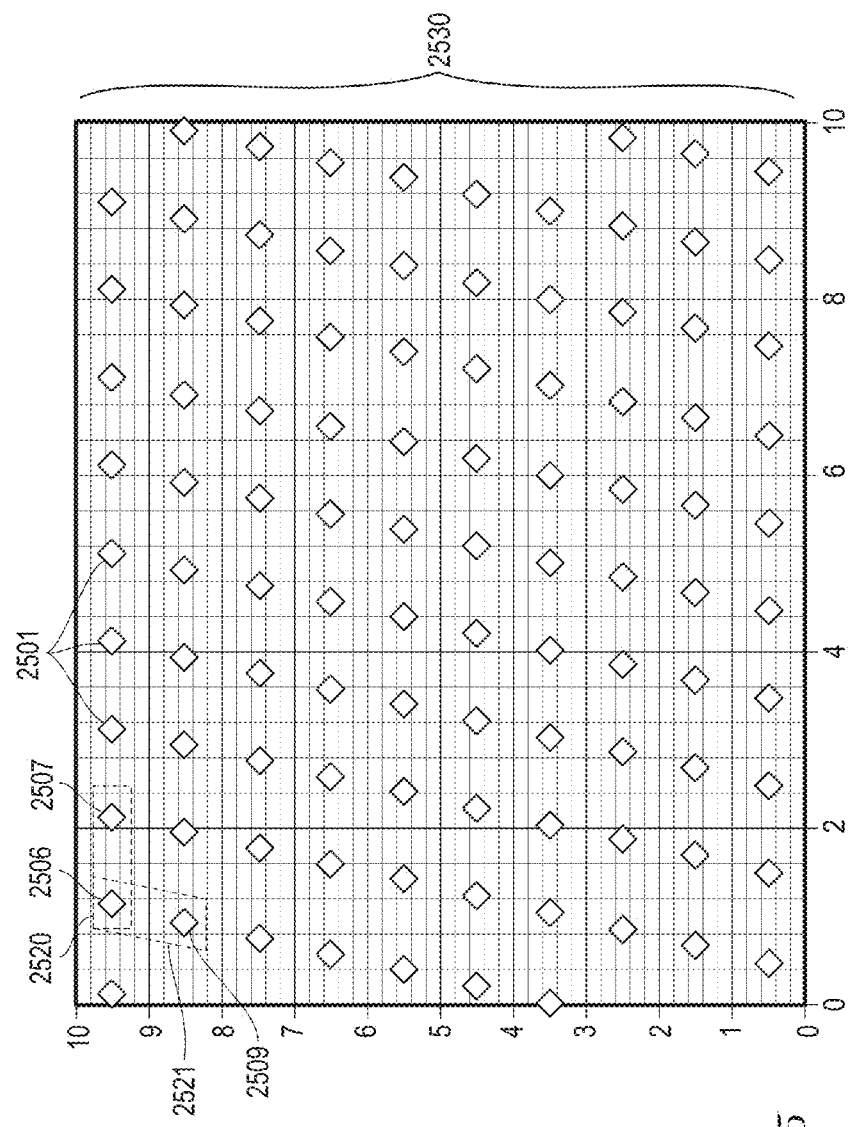
FIGS. 25-27 include illustrations of plots of locations of shaped abrasive particles on a backing to form non-shadowing arrangements according to embodiments.
Figure 26:
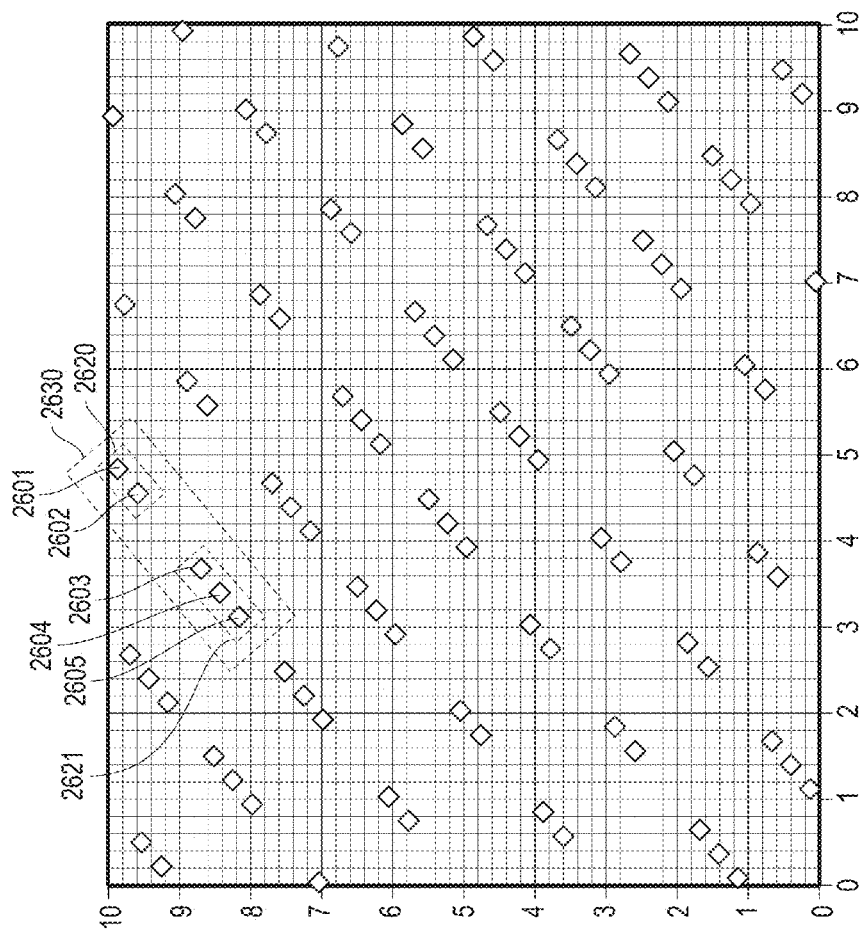
Figure 27:
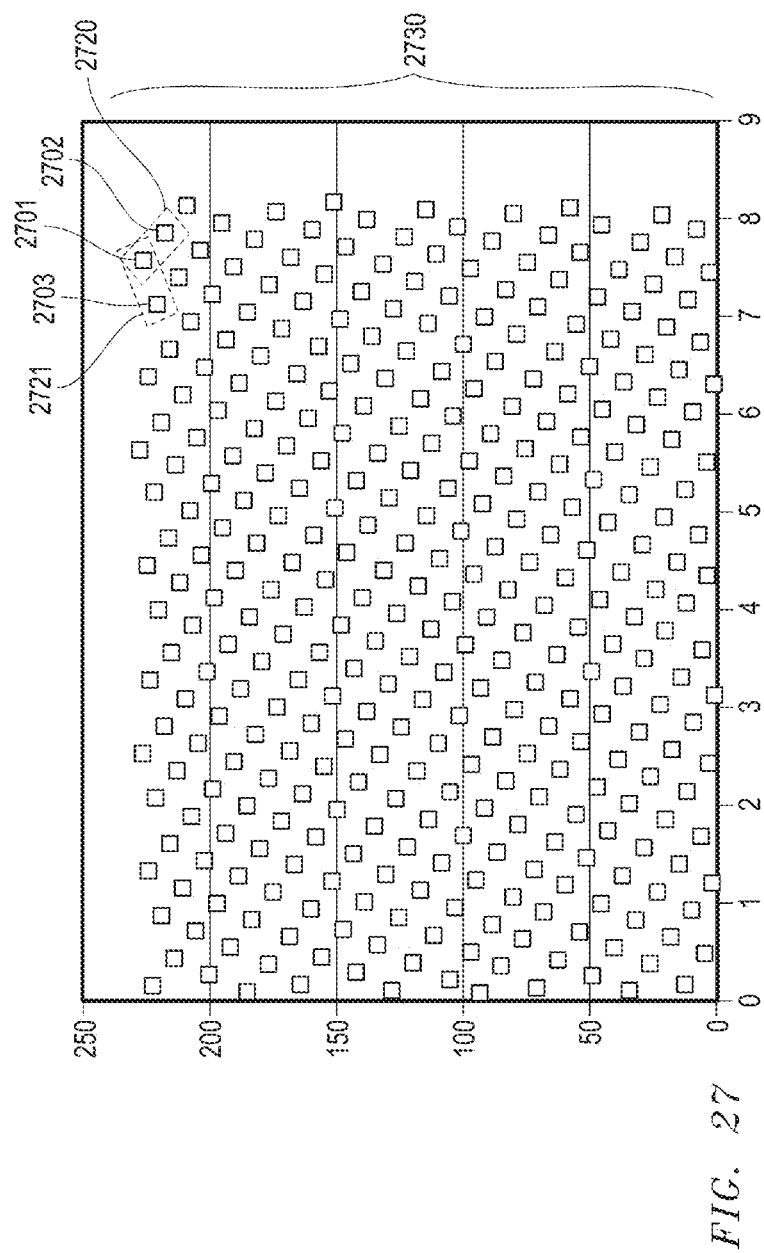

Referring briefly to FIGS. 25-27, different non-shadowing arrangements are illustrated. In particular, FIG. 25 includes an illustration of a non-shadowing arrangement, wherein the locations 2501 represent predetermined positions to be occupied by one or more shaped abrasive particles, diluent particles, and a combination thereof. The locations 2501 may be defined as positions on X and Y axes as illustrated. Moreover, the locations 2506 and 2507 can define a microunit 2520. Furthermore, 2506 and 2509 may define a microunit 2521. As further illustrated, the microunits may be repeated across the surface of at least a portion of the article and define a macrounit 2530. In one particular instance, the locations 2501 representing the positions of shaped abrasive particles are arranged in a non-shadowing arrangement relative to a grinding direction that is parallel to the Y-axis.

FIG. 26 includes an illustration of a non-shadowing arrangement, wherein the locations (shown as dots on the X and Y axes) represent predetermined positions to be occupied by one or more shaped abrasive particles, diluent particles, and a combination thereof. In one embodiment, the locations 2601 and 2602 can define a microunit 2620. Furthermore, locations 2603, 2604, and 2605 can define a microunit 2621. As further illustrated, the microunits may be repeated across the surface of at least a portion of the article and define at least one macrounit 2630. It will be appreciated, as illustrated, other macrounits may exist. In one particular instance, the locations 2601 representing the positions of shaped abrasive particles are arranged in a non-shadowing arrangement relative to a grinding direction that is parallel to the Y-axis or X-axis.

FIG. 27 includes an illustration of a non-shadowing arrangement, wherein the locations (shown as dots on the X and Y axes) represent predetermined positions to be occupied by one or more shaped abrasive particles, diluent particles, and a combination thereof. In one embodiment, the locations 2701 and 2702 can define a microunit 2720. Furthermore, locations 2701 and 2703 can define a microunit 2721. As further illustrated, the microunits may be repeated across the surface of at least a portion of the article and define at least one macrounit 2730. In one particular instance, all of the locations that represent positions of shaped abrasive particles are arranged in a non-shadowing arrangement relative to a grinding direction that is parallel to the Y-axis or X-axis.

A predetermined distribution between shaped abrasive particles can also be defined by at least one of a predetermined orientation characteristic of each of the shaped abrasive particles. Exemplary predetermined orientation characteristics can include a predetermined rotational orientation, a predetermined lateral orientation, a predetermined longitudinal orientation, a predetermined vertical orientation, a predetermined tip height, and a combination thereof. The backing 101 can be defined by a longitudinal axis 180 that extends along and defines a length of the backing 101 and a lateral axis 181 that extends along and defines a width of a backing 101.

In accordance with an embodiment, the shaped abrasive particle 102 can be located in a first, predetermined position 112 defined by a particular first lateral position relative to the lateral axis of 181 of the backing 101. Furthermore, the shaped abrasive particle 103 may have a second, predetermined position defined by a second lateral position relative to the lateral axis 181 of the backing 101. Notably, the shaped abrasive particles 102 and 103 may be spaced apart from each other by a lateral space 121, defined as a smallest distance between the two adjacent shaped abrasive particles 102 and 103 as measured along a lateral plane 184 parallel to the lateral axis 181 of the backing 101. In accordance with an embodiment, the lateral space 121 can be greater than 0, such that some distance exists between the shaped abrasive particles 102 and 103. However, while not illustrated, it will be appreciated that the lateral space 121 can be 0, allowing for contact and even overlap between portions of adjacent shaped abrasive particle.

In other embodiments, the lateral space 121 can be at least about 0.1 (w), wherein w represents the width of the shaped abrasive particle 102. According to an embodiment, the width of the shaped abrasive particle is the longest dimension of the body extending along a side. In another embodiment, the lateral space 121 can be at least about 0.2(w), such as at least about 0.5(w), at least about 1(w), at least about 2(w), or even greater. Still, in at least one non-limiting embodiment, the lateral space 121 can be not greater than about 100(w), not greater than about 50(w), or even not greater than about 20(w). It will be appreciated that the lateral space 121 can be within a range between any of the minimum and maximum values noted above. Control of the lateral space between adjacent shaped abrasive particles may facilitate improved grinding performance of the abrasive article.

In accordance with an embodiment, the shaped abrasive particle 102 can be in a first, predetermined position 112 defined by a first longitudinal position relative to a longitudinal axis 180 of the backing 101. Furthermore, the shaped abrasive particle 104 may be located at a third, predetermined position 114 defined by a second longitudinal position relative to the longitudinal axis 180 of the backing 101. Further, as illustrated, a longitudinal space 123 may exist between the shaped abrasive particles 102 and 104, which can be defined as a smallest distance between the two adjacent shaped abrasive particles 102 and 104 as measured in a direction parallel to the longitudinal axis 180. In accordance with an embodiment, the longitudinal space 123 can be greater than 0. Still, while not illustrated, it will be appreciated that the longitudinal space 123 can be 0, such that the adjacent shaped abrasive particles are touching, or even overlapping each other.

In other instances, the longitudinal space 123 can be at least about 0.1(w), wherein w is the width of the shaped abrasive particle as described herein. In other more particular instances, the longitudinal space can be at least about 0.2(w), at least about 0.5(w), at least about 1(w), or even at least about 2(w). Still, the longitudinal space 123 may be not greater than about 100(w), such as not greater than about 50(w), or even not greater than about 20(w). It will be appreciated that the longitudinal space 123 can be within a range between any of the above minimum and maximum values. Control of the longitudinal space between adjacent shaped abrasive particles may facilitate improved grinding performance of the abrasive article.

In accordance with an embodiment, the shaped abrasive particles may be placed in a predetermined distribution, wherein a particular relationship exists between the lateral space 121 and longitudinal space 123. For example, in one embodiment the lateral space 121 can be greater than the longitudinal space 123. Still, in another non-limiting embodiment, the longitudinal space 123 may be greater than the lateral space 121. Still, in yet another embodiment, the shaped abrasive particles may be placed on the backing such that the lateral space 121 and longitudinal space 123 are essentially the same relative to each other. Control of the relative relationship between the longitudinal space and lateral space may facilitate improved grinding performance.

As further illustrated, a longitudinal space 124 may exist between the shaped abrasive particles 104 and 105. Moreover, the predetermined distribution may be formed such that a particular relationship can exist between the longitudinal space 123 and longitudinal space 124. For example, the longitudinal space 123 can be different than the longitudinal space 124. Alternatively, the longitudinal space 123 can be essentially the same at the longitudinal space 124. Control of the relative difference between longitudinal spaces of different abrasive particles may facilitate improved grinding performance of the abrasive article.

Furthermore, the predetermined distribution of shaped abrasive particles on the abrasive article 100 can be such that the lateral space 121 can have a particular relationship relative to the lateral space 122. For example, in one embodiment the lateral space 121 can be essentially the same as the lateral space 122. Alternatively, the predetermined distribution of shaped abrasive particles on the abrasive article 100 can be controlled such that the lateral space 121 is different than the lateral space 122. Control of the relative difference between lateral spaces of different abrasive particles may facilitate improved grinding performance of the abrasive article.

Figure 1B:
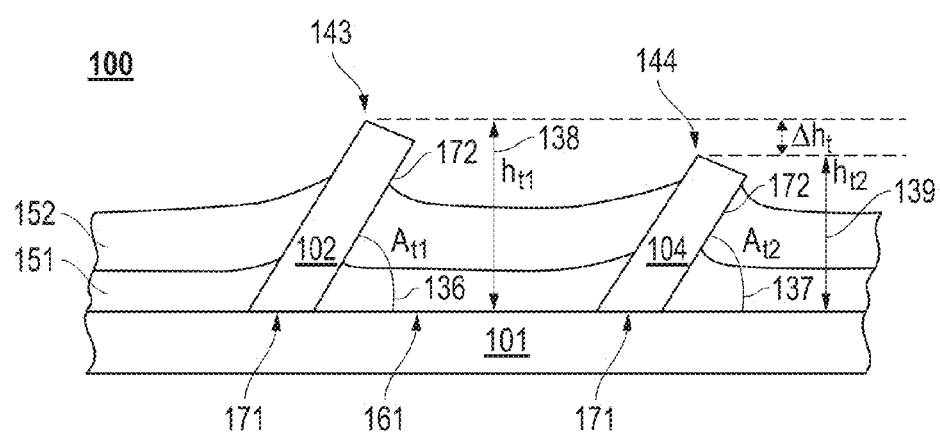
FIG. 1B includes a cross-sectional illustration of a portion of an abrasive article in accordance with an embodiment.

FIG. 1B includes a side view illustration of a portion of an abrasive article in accordance with an embodiment. As illustrated, the abrasive article 100 can include a shaped abrasive particle 102 overlying the backing 101 and a shaped abrasive particle 104 spaced apart from the shaped abrasive particle 102 overlying the backing 101. In accordance with an embodiment, the shaped abrasive particle 102 can be coupled to the backing 101 via the adhesive layer 151. Furthermore or alternatively, the shaped abrasive particle 102 can be coupled to the backing 101 via the adhesive layer 152. It will be appreciated that any of the shaped abrasive particles described herein may be coupled to the backing 101 via one or more adhesive layers as described herein.

In accordance with an embodiment, the abrasive article 100 can include an adhesive layer 151 overlying the backing. In accordance with one embodiment, the adhesive layer 151 can include a make coat. The make coat can be overlying the surface of the backing 101 and surrounding at least a portion of the shaped abrasive particles 102 and 104. Abrasive articles of the embodiments herein can further include an adhesive layer 152 overlying the adhesive layer 151 and the backing 101 and surrounding at least a portion of the shaped abrasive particles 102 and 104. The adhesive layer 152 may be a size coat in particular instances.

A polymer formulation may be used to form any of a variety of the adhesive layers 151 or 152 of the abrasive article, which can include but not limited to, a frontfill, a pre-size coat, a make coat, a size coat, and/or a supersize coat. When used to form the frontfill, the polymer formulation generally includes a polymer resin, fibrillated fibers (preferably in the form of pulp), filler material, and other optional additives. Suitable formulations for some frontfill embodiments can include material such as a phenolic resin, wollastonite filler, defoamer, surfactant, a fibrillated fiber, and a balance of water. Suitable polymeric resin materials include curable resins selected from thermally curable resins including phenolic resins, urea/formaldehyde resins, phenolic/latex resins, as well as combinations of such resins. Other suitable polymeric resin materials may also include radiation curable resins, such as those resins curable using electron beam, UV radiation, or visible light, such as epoxy resins, acrylated oligomers of acrylated epoxy resins, polyester resins, acrylated urethanes and polyester acrylates and acrylated monomers including monoacrylated, multiacrylated monomers. The formulation can also comprise a nonreactive thermoplastic resin binder which can enhance the self-sharpening characteristics of the deposited abrasive composites by enhancing the erodability. Examples of such thermoplastic resin include polypropylene glycol, polyethylene glycol, and polyoxypropylene-polyoxyethene block copolymer, etc. Use of a frontfill on the backing can improve the uniformity of the surface, for suitable application of the make coat and improved application and orientation of shaped abrasive particles in a predetermined orientation.

Either of the adhesive layers 151 and 152 can be applied to the surface of the backing 101 in a single process, or alternatively, the shaped abrasive particles 102 and 104 can be combined with a material of one of the adhesive layers 151 or 152 and applied as a mixture to the surface of the backing 101. Suitable materials of the adhesive layer 151 for use as a make coat can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the adhesive layer 151 can include a polyester resin. The coated backing 101 can then be heated in order to cure the resin and the abrasive particulate material to the substrate. In general, the coated backing 101 can be heated to a temperature of between about 100° C. to less than about 250° C. during this curing process.

The adhesive layer 152 may be formed on the abrasive article, which may be in the form of a size coat. In accordance with a particular embodiment, the adhesive layer 152 can be a size coat formed to overlie and bond the shaped abrasive particles 102 and 104 in place relative to the backing 101. The adhesive layer 152 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

It will be appreciated, that while not illustrated, the abrasive article can include diluent abrasive particles different than the shaped abrasive particles 104 and 105. For example, the diluent particles can differ from the shaped abrasive particles 102 and 104 in composition, two-dimensional shape, three-dimensional shape, size, and a combination thereof. For example, the abrasive particles 507 can represent conventional, crushed abrasive grit having random shapes. The abrasive particles 507 may have a median particle size less than the median particle size of the shaped abrasive particles 505.

As further illustrated, the shaped abrasive particle 102 can be oriented in a side orientation relative to the backing 101, wherein a side surface 171 of the shaped abrasive particle 102 can be in direct contact with the backing 101 or at least a surface of the shaped abrasive particle 102 closest to the upper surface of the backing 101. In accordance with an embodiment, the shaped abrasive particle 102 can have a vertical orientation defined by a tilt angle ($A_{T1}$) 136 between a major surface 172 of the shaped abrasive particle 102 and a major surface 161 of the backing 101. The tilt angle 136 can be defined as the smallest angle or acute angle between the surface 172 of the shaped abrasive particle 102 and the upper surface 161 of the backing 101. In accordance with an embodiment, the shaped abrasive particle 102 can be placed in a position having a predetermined vertical orientation. In accordance with an embodiment, the tilt angle 136 can be at least about 2°, such as at least about 5°, at least about 10°, at least about 15°, at least about 20°, at least about 25°, at least about 30°, at least about 35°, at least about 40°, at least about 45°, at least about 50°, at least about 55°, at least about 60°, at least about 70°, at least about 80°, or even at least about 85°. Still, the tilt angle 136 may be not greater than about 90°, such as not greater than about 85°, not greater than about 80°, not greater than about 75°, not greater than about 70°, not greater than about 65°, not greater than about 60°, such as not greater than about 55°, not greater than about 50°, not greater than about 45°, not greater than about 40°, not greater than about 35°, not greater than about 30°, not greater than about 25°, not greater than about 20°, such as not greater than about 15°, not greater than about 10°, or even not greater than about 5°. It will be appreciated that the tilt angle 136 can be within a range between any of the above minimum and maximum degrees.

As further illustrated, the abrasive article 100 can include a shaped abrasive particle 104 in a side orientation, wherein a side surface 171 of the shaped abrasive particle 104 is in direct contact with or closest to an upper surface 161 of the backing 101. In accordance with an embodiment, the shaped abrasive particle 104 can be in a position having a predetermined vertical orientation defined by a second tilt angle ($A_{T2}$) 137 defining an angle between a major surface 172 of the shaped abrasive particle 104 and the upper surface 161 of the backing 101. The tilt angle 137 may be defined as the smallest angle between a major surface 172 of the shaped abrasive particle 104 and an upper surface 161 of the backing 101. Moreover, the tilt angle 137 can have a value of at least about 2°, such as at least about 5°, at least about 10°, at least about 15°, at least about 20°, at least about 25°, at least about 30°, at least about 35°, at least about 40°, at least about 45°, at least about 50°, at least about 55°, at least about 60°, at least about 70°, at least about 80°, or even at least about 85°. Still, the tilt angle 136 may be not greater than about 90°, such as not greater than about 85°, not greater than about 80°, not greater than about 75°, not greater than about 70°, not greater than about 65°, not greater than about 60°, such as not greater than about 55°, not greater than about 50°, not greater than about 45°, not greater than about 40°, not greater than about 35°, not greater than about 30°, not greater than about 25°, not greater than about 20°, such as not greater than about 15°, not greater than about 10°, or even not greater than about 5°. It will be appreciated that the tilt angle 136 can be within a range between any of the above minimum and maximum degrees.

In accordance with an embodiment, the shaped abrasive particle 102 can have a predetermined vertical orientation that is the same as the predetermined vertical orientation of the shaped abrasive particle 104. Alternatively, the abrasive article 100 may be formed such that the predetermined vertical orientation of the shaped abrasive particle 102 can be different than the predetermined vertical orientation of the shaped abrasive particle 104.

In accordance with an embodiment, the shaped abrasive particles 102 and 104 may be placed on the backing such that they have different predetermined vertical orientations defined by a vertical orientation difference. The vertical orientation difference can be the absolute value of the difference between the tilt angle 136 and the tilt angle 137. In accordance with an embodiment, the vertical orientation difference can be at least about 2°, such as at least about 5°, at least about 10°, at least about 15°, at least about 20°, at least about 25°, at least about 30°, at least about 35°, at least about 40°, at least about 45°, at least about 50°, at least about 55°, at least about 60°, at least about 70°, at least about 80°, or even at least about 85°. Still, the vertical orientation difference may be not greater than about 90°, such as not greater than about 85°, not greater than about 80°, not greater than about 75°, not greater than about 70°, not greater than about 65°, not greater than about 60°, such as not greater than about 55°, not greater than about 50°, not greater than about 45°, not greater than about 40°, not greater than about 35°, not greater than about 30°, not greater than about 25°, not greater than about 20°, such as not greater than about 15°, not greater than about 10°, or even not greater than about 5°. It will be appreciated that the vertical orientation difference can be within a range between any of the above minimum and maximum degrees. Control of the vertical orientation difference between shaped abrasive particles of the abrasive article 100 may facilitate improved grinding performance.

As further illustrated, the shaped abrasive particles can be placed on the backing to have a predetermined tip height. For example, the predetermined tip height ($h_{T1}$) 138 of the shaped abrasive particle 102 can be the greatest distance between an upper surface of the backing 161 and an uppermost surface 143 of the shaped abrasive particle 102. In particular, the predetermined tip height 138 of the shaped abrasive particle 102 can define the greatest distance above the upper surface of the backing 161 that the shaped abrasive particle 102 extends. As further illustrated, the shaped abrasive particle 104 can have a predetermined tip height ($h_{T2}$) 139 defined as the distance between the upper surface 161 of the backing 101 and an uppermost surface 144 of the shaped abrasive particle 104. Measurements may be evaluated via X-ray, confocal microscopy CT, micromeasure, white-light interferometry, and a combination thereof.

In accordance with an embodiment, the shaped abrasive particle 102 can be placed on the backing 101 to have a predetermined tip height 138 that can be different that than predetermined tip height 139 of the shaped abrasive particle 104. Notably, the difference in the predetermined tip height ($\Delta h_T$) can be defined as the difference between the average tip height 138 and average tip height 139. In accordance with an embodiment, the difference in the predetermined tip height can be at least about 0.01(w), wherein (w) is the width of the shaped abrasive particle as described herein. In other instances, the tip height difference can be at least about 0.05(w), at least about 0.1(w), at least about 0.2(w), at least about 0.4(w), at least about 0.5(w), at least about 0.6(w), at least about 0.7(w), or even at least about 0.8(w). Still, in one non-limiting embodiment, the tip height difference can be not greater than about 2(w). It will be appreciated that the difference in tip height can be in a range between any of the minimum and maximum values noted above. Control of the average tip height and more particularly the difference in average tip height, between shaped abrasive particles of the abrasive article 100 can facilitate improved grinding performance.

While reference herein is made to shaped abrasive particles having a difference in average tip height, it will be appreciated that the shaped abrasive particles of the abrasive articles may have a same average tip height such that there is essentially no difference between the average tip height between the shaped abrasive particles. For example, as described herein, shaped abrasive particles of a group may be positioned on the abrasive article such that the vertical tip height of each of the shaped abrasive particles of the group is substantially the same.

Figure 1C:
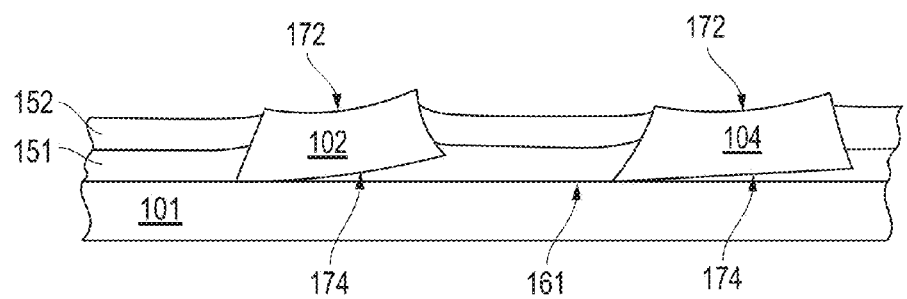
FIG. 1C includes a cross-sectional illustration of a portion of an abrasive article in accordance with an embodiment.

FIG. 1C includes a cross-sectional illustration of a portion of an abrasive article in accordance with an embodiment. As illustrated, the shaped abrasive particles 102 and 104 can be oriented in a flat orientation relative to the backing 101, wherein at least a portion of a major surface 174, and particular the major surface having the largest surface area (i.e., the bottom surface 174 opposite the upper major surface 172), of the shaped abrasive particles 102 and 104 can be in direct contact with the backing 101. Alternatively, in a flat orientation, a portion of the major surface 174 may not be in direct contact with the backing 101, but may be the surface of the shaped abrasive particle closest to the upper surface 161 of the backing 101.

Figure 1D:
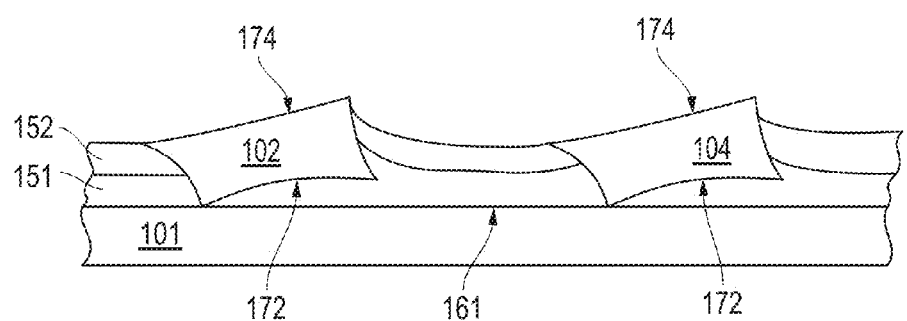
FIG. 1D includes a cross-sectional illustration of a portion of an abrasive article in accordance with an embodiment.

FIG. 1D includes a cross-sectional illustration of a portion of an abrasive article in accordance with an embodiment. As illustrated, the shaped abrasive particles 102 and 104 can be oriented in an inverted orientation relative to the backing 101, wherein at least a portion of a major surface 172 (i.e., the upper major surface 172) of the shaped abrasive particles 102 and 104 can be in direct contact with the backing 101. Alternatively, in an inverted orientation, a portion of the major surface 172 may not be in direct contact with the backing 101, but may be the surface of the shaped abrasive particle closest to the upper surface 161 of the backing 101.

Figure 2A:
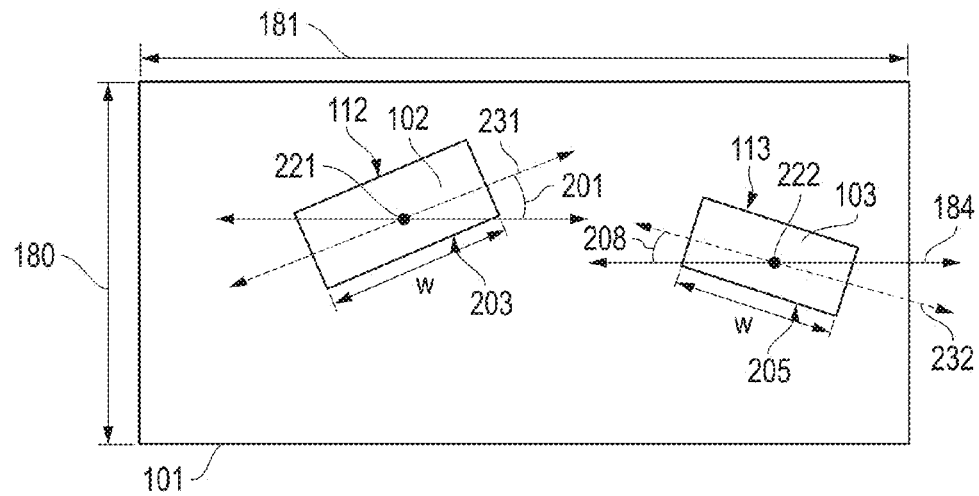
FIG. 2A includes a top view illustration of a portion of an abrasive article including shaped abrasive particles in accordance with an embodiment.

FIG. 2A includes a top view illustration of a portion of an abrasive article including shaped abrasive particles in accordance with an embodiment. As illustrated, the abrasive article can include a shaped abrasive particle 102 overlying the backing 101 in a first position having a first rotational orientation relative to a lateral axis 181 defining the width of the backing 101 and perpendicular to a longitudinal axis 181. In particular, the shaped abrasive particle 102 can have a predetermined rotational orientation defined by a first rotational angle between a lateral plane 184 parallel to the lateral axis 181 and a dimension of the shaped abrasive particle 102. Notably, reference herein to a dimension can be reference to a bisecting axis 231 of the shaped abrasive particle extending through a center point 221 of the shaped abrasive particle 102 along a surface (e.g., a side or an edge) connected to (directly of indirectly) the backing 101. Accordingly, in the context of a shaped abrasive particle positioned in a side orientation, (see, FIG. 1B), the bisecting axis 231 extends through a center point 221 and in the direction of the width (w) of a side 171 closest to the surface 181 of the backing 101. Moreover, the predetermined rotational orientation can be defined as the smallest angle 201 with the lateral plane 184 extending through the center point 221. As illustrated in FIG. 2A, the shaped abrasive particle 102 can have a predetermined rotational angle defined as the smallest angle between a bisecting axis 231 and the lateral plane 184. In accordance with an embodiment, the rotational angle 201 can be 0°. In other embodiments, the rotational angle can be greater, such as at least about 2°, at least about 5°, at least about 10°, at least about 15°, at least about 20°, at least about 25°, at least about 30°, at least about 35°, at least about 40°, at least about 45°, at least about 50°, at least about 55°, at least about 60°, at least about 70°, at least about 80°, or even at least about 85°. Still, the predetermined rotational orientation as defined by the rotational angle 201 may be not greater than about 90°, such as not greater than about 85°, not greater than about 80°, not greater than about 75°, not greater than about 70°, not greater than about 65°, not greater than about 60°, such as not greater than about 55°, not greater than about 50°, not greater than about 45°, not greater than about 40°, not greater than about 35°, not greater than about 30°, not greater than about 25°, not greater than about 20°, such as not greater than about 15°, not greater than about 10°, or even not greater than about 5°. It will be appreciated that the predetermined rotational orientation can be within a range between any of the above minimum and maximum degrees.

As further illustrated in FIG. 2A, the shaped abrasive particle 103 can be at a position 113 overlying the backing 101 and having a predetermined rotational orientation. Notably, the predetermined rotational orientation of the shaped abrasive particle 103 can characterized as the smallest angle between the lateral plane 184 parallel to the lateral axis 181 and a dimension defined by a bisecting axis 232 of the shaped abrasive particle 103 extending through a center point 222 of the shaped abrasive particle 102 in the direction of the width (w) of a side closest to the surface 181 of the backing 101. In accordance with an embodiment, the rotational angle 208 can be 0°. In other embodiments, the rotational angle 208 can be greater, such as at least about 2°, at least about 5°, at least about 10°, at least about 15°, at least about 20°, at least about 25°, at least about 30°, at least about 35°, at least about 40°, at least about 45°, at least about 50°, at least about 55°, at least about 60°, at least about 70°, at least about 80°, or even at least about 85°. Still, the predetermined rotational orientation as defined by the rotational angle 208 may be not greater than about 90°, such as not greater than about 85°, not greater than about 80°, not greater than about 75°, not greater than about 70°, not greater than about 65°, not greater than about 60°, such as not greater than about 55°, not greater than about 50°, not greater than about 45°, not greater than about 40°, not greater than about 35°, not greater than about 30°, not greater than about 25°, not greater than about 20°, such as not greater than about 15°, not greater than about 10°, or even not greater than about 5°. It will be appreciated that the predetermined rotational orientation can be within a range between any of the above minimum and maximum degrees.

In accordance with an embodiment, the shaped abrasive particle 102 can have a predetermined rotational orientation as defined by the rotational angle 201 that is different that the predetermined rotational orientation of the shaped abrasive particle 103 as defined by the rotational angle 208. In particular, the difference between the rotational angle 201 and rotational angle 208 between the shaped abrasive particles 102 and 103 can define a predetermined rotational orientation difference. In particular instances, the predetermined rotational orientation difference can be 0°. In other instances, the predetermined rotation orientation difference between any two shaped abrasive particles can be greater, such as at least about 1°, at least about 3°, at least about 5°, at least about 10°, at least about 15°, at least about 20°, at least about 25°, at least about 30°, at least about 35°, at least about 40°, at least about 45°, at least about 50°, at least about 55°, at least about 60°, at least about 70°, at least about 80°, or even at least about 85°. Still, the predetermined rotational orientation difference between any two shaped abrasive particles may be not greater than about 90°, such as not greater than about 85°, not greater than about 80°, not greater than about 75°, not greater than about 70°, not greater than about 65°, not greater than about 60°, such as not greater than about 55°, not greater than about 50°, not greater than about 45°, not greater than about 40°, not greater than about 35°, not greater than about 30°, not greater than about 25°, not greater than about 20°, such as not greater than about 15°, not greater than about 10°, or even not greater than about 5°. It will be appreciated that the predetermined rotational orientation difference can be within a range between any of the above minimum and maximum values.

Figure 2B:
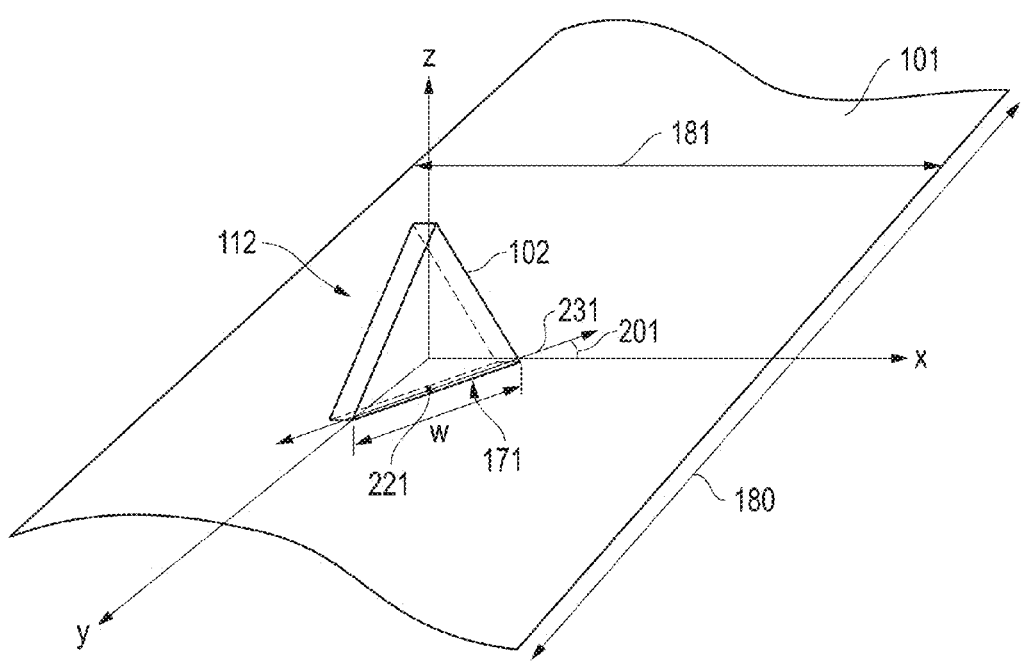
FIG. 2B includes a perspective view of a shaped abrasive particle on an abrasive article in accordance with an embodiment.

FIG. 2B includes a perspective view illustration of a portion of an abrasive article including a shaped abrasive particle in accordance with an embodiment. As illustrated, the abrasive article can include a shaped abrasive particle 102 overlying the backing 101 in a first position 112 having a first rotational orientation relative to a lateral axis 181 defining the width of the backing 101. Certain aspects of a shaped abrasive particles predetermined orientation characteristics may be described by relation to a x, y, z three-dimensional axis as illustrated. For example, the predetermined longitudinal orientation of the shaped abrasive particle 102 may be defined by the position of the shaped abrasive particle on the y-axis, which extends parallel to the longitudinal axis 180 of the backing 101. Moreover, the predetermined lateral orientation of the shaped abrasive particle 102 may be defined by the position of the shaped abrasive particle on the x-axis, which extends parallel to the lateral axis 181 of the backing 101. Furthermore, the predetermined rotational orientation of the shaped abrasive particle 102 may be defined as the rotational angle 102 between the x-axis, which corresponds to an axis or plane parallel to the lateral axis 181 and the bisecting axis 231 of the shaped abrasive particle 102 extending through the center point 221 of the side 171 shaped abrasive particle 102 connected to (directly of indirectly) the backing 101. As generally illustrated, the shaped abrasive particle 102 can further have a predetermined vertical orientation and predetermined tip height as described herein. Notably, the controlled placement of a plurality of shaped abrasive particles that facilitates control of the predetermined orientation characteristics described herein is a highly involved process, which has not previously been contemplated or deployed in the industry.

For simplicity of explanation, the embodiments herein reference certain features relative to a plane defined by X, Y, and Z directions. However, it is appreciated and contemplated that abrasive articles can have other shapes (e.g., coated abrasive belts defining an ellipsoidal or looped geometry or even coated abrasive sanding disks having an annular-shaped backing). The description of the features herein is not limited to planar configurations of abrasive articles and the features described herein are applicable to abrasive articles of any geometry. In such instances wherein the backing has a circular geometry, the longitudinal axis and lateral axis can be two diameters extending through the center point of the backing and having an orthogonal relationship relative to each other.

Figure 3A:
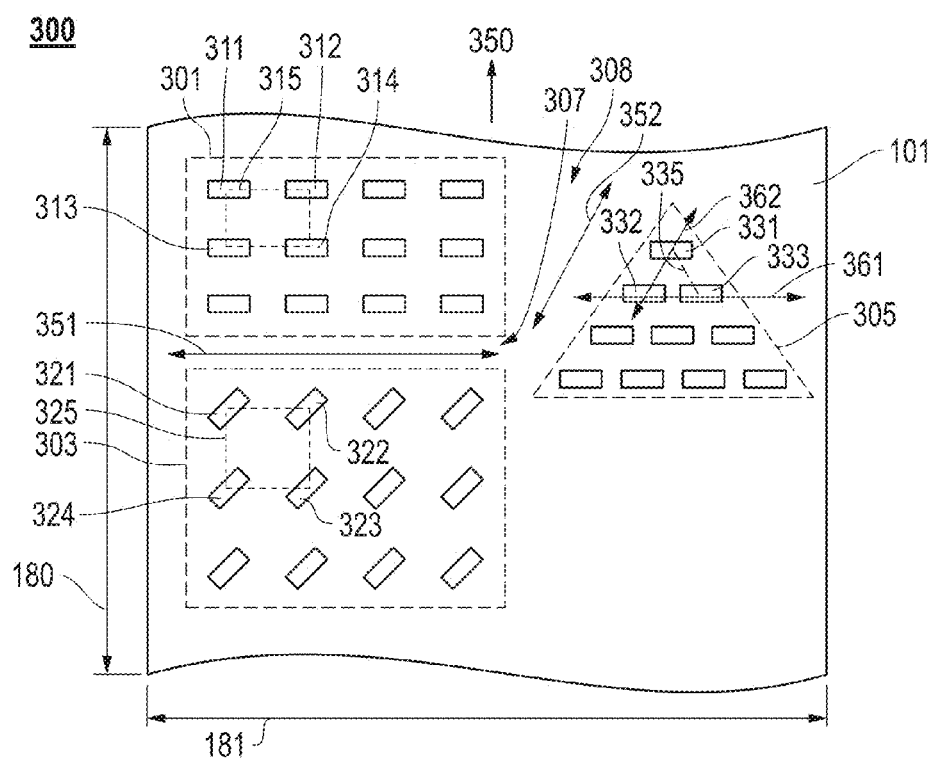
FIG. 3A includes a top view illustration of a portion of an abrasive article in accordance with an embodiment.

FIG. 3A includes a top view illustration of a portion of an abrasive article 300 in accordance with an embodiment. As illustrated, the abrasive article 300 can include a first group 301 of shaped abrasive particles, including shaped abrasive particles 311, 312, 313, and 314 (311-314). As used herein, a group can refer to a plurality of shaped abrasive particles have at least one (or a combination of) predetermined orientation characteristic that is the same for each of the shaped abrasive particles. Exemplary predetermined orientation characteristics can include a predetermined rotational orientation, a predetermined lateral orientation, a predetermined longitudinal orientation, a predetermined vertical orientation, and a predetermined tip height. For example, the first group 301 of shaped abrasive particles includes a plurality of shaped abrasive particles having substantially the same predetermined rotational orientation with respect to each other. As further illustrated, the abrasive article 300 can include another group 303 including a plurality of shaped abrasive particles, including for example shaped abrasive particles 321, 322, 323, and 324 (321-324). As illustrated, the group 303 can include a plurality of shaped abrasive particles having a same predetermined rotational orientation. Furthermore, at least a portion of the shaped abrasive particles of the group 303 can have a same predetermined lateral orientation with respect to each other (e.g., shaped abrasive particles 321 and 322 and shaped abrasive particles 323 and 324). Moreover, at least a portion of the shaped abrasive particles of the group 303 can have a same predetermined longitudinal orientation with respect to each other (e.g., shaped abrasive particles 321 and 324 and shaped abrasive particles 322 and 323).

As further illustrated, the abrasive article can include a group 305. The group 305 can include a plurality of shaped abrasive particles, including shaped abrasive particles 331, 332, and 333 (331-333) having at least one common predetermined orientation characteristic. As illustrated in the embodiment of FIG. 3A, the plurality of shaped abrasive particles within the group 305 can have a same predetermined rotational orientation with respect to each other.

Furthermore, at least a portion of the plurality of shaped abrasive particles of the group 305 can have a same predetermined lateral orientation with respect to each other (e.g., shaped abrasive particles 332 and 333). In addition, at least a portion of the plurality of shaped abrasive particles of the group 305 can have a same predetermined longitudinal orientation with respect to each other. Utilization of groups of shaped abrasive particles, and particularly, a combination of groups of shaped abrasive particles having the features described herein may facilitate improved performance of the abrasive article.

As further illustrated, the abrasive article 300 can include groups 301, 303, and 305, which may be separated by channel regions 307 and 308 extending between the groups 301, 303, 305. In particular instances, the channel regions can be regions on the abrasive article that can be substantially free of shaped abrasive particles. Moreover, the channel regions 307 and 308 may be configured to move liquid between the groups 301, 303, and 305, which may improve swarf removal and grinding performance of the abrasive article. The channel regions 307 and 308 can be predetermined regions on the surface of the shaped abrasive article. The channel regions 307 and 308 may define dedicated regions between groups 301, 303, and 305 that are different, and more particularly, greater in width and/or length, than the longitudinal space or lateral space between adjacent shaped abrasive particles in the groups 301, 303, and 305.

The channel regions 307 and 308 can extend along a direction that is parallel or perpendicular to the longitudinal axis 180 or parallel or perpendicular to the lateral axis 181 of the backing 101. In particular instances, the channel regions 307 and 308 can have axes, 351 and 352 respectively, extending along a center of the channel regions 307 and 308 and along a longitudinal dimension of the channel regions 307 and 308 can have a predetermined angle relative to the longitudinal axis 380 of the backing 101. Moreover, the axes 351 and 352 of the channel regions 307 and 308 may form a predetermined angle relative to the lateral axis 181 of the backing 101. Controlled orientation of the channel regions may facilitate improved performance of the abrasive article.

Furthermore, the channel regions 307 and 308 may be formed such that they have a predetermined orientation relative to the direction of grinding 350. For example, the channel regions 307 and 308 can extend along a direction that is parallel or perpendicular to the direction of grinding 350. In particular instances, the channel regions 307 and 308 can have axes, 351 and 352 respectively, extending along a center of the channel regions 307 and 308 and along a longitudinal dimension of the channel regions 307 and 308 can have a predetermined angle relative to the direction of grinding 350. Controlled orientation of the channel regions may facilitate improved performance of the abrasive article.

For at least one embodiment, as illustrated the group 301 can include a plurality of shaped abrasive particles, wherein at least a portion of the plurality of shaped abrasive particles in the group 301 can define a pattern 315. As illustrated, the plurality of shaped abrasive particles 311-314 can be arranged with respect to each other in a predetermined distribution that further defines a two-dimensional array, such as in the form of a quadrilateral, as viewed top-down. An array is a pattern having short range order defined by a unit arrangement of shaped abrasive particles and further having long range order including regular and repetitive units linked together. It will be appreciated that other two-dimensional arrays can be formed, including other polygonal shapes, ellipsis, ornamental indicia, product indicia, or other designs. As further illustrated, the group 303 can include the plurality of shaped abrasive particles 321-324 that can also be arranged in a pattern 325 defining a quadrilateral two-dimensional array. Furthermore, the group 305 can include a plurality of shaped abrasive particles 331-334 which can be arranged with respect to each other to define a predetermined distribution in the form of a triangular pattern 335.

In accordance with an embodiment, the plurality of shaped abrasive particles of a group 301 may define a pattern that is different than the shaped abrasive particles of another group (e.g., group 303 or 305). For example, the shaped abrasive particles of the group 301 may define a pattern 315 that is different than the pattern 335 of the group 305 with respect to the orientation on the backing 101. Moreover, the shaped abrasive particles of the group 301 may define a pattern 315 that has a first orientation relative to the direction of grinding 350 as compared to the orientation of the pattern of a second group (e.g., 303 or 305) relative to the direction of grinding 350.

Notably, any one of the groups (301, 303, or 305) of the shaped abrasive particles can have a pattern defining one or more vectors (e.g., 361 or 362 of group 305) that can have a particular orientation relative to the direction of grinding. In particular, the shaped abrasive particles of a group can have a predetermined orientation characteristic that define a pattern of the group, which may further define one or more vectors of the pattern. In an exemplary embodiment, the vectors 361 and 362 of the pattern 335 can be controlled to form a predetermined angle relative to the grinding direction 350. The vectors 361 and 362 may have various orientations including for example, a parallel orientation, perpendicular orientation, or even a non-orthogonal or non-parallel orientation (i.e., angled to define an acute angle or obtuse angle) relative to the grinding direction 350.

In accordance with an embodiment, the plurality of shaped abrasive particles of the first group 301 can have at least one predetermined orientation characteristic that is different than the plurality of shaped abrasive particles in another group (e.g. 303 or 305). For example, at least a portion of the shaped abrasive particles of the group 301 can have a predetermined rotational orientation that is different than the predetermined rotational orientation of at least a portion of the shaped abrasive particles of the group 303. Still, in one particular aspect, all of the shaped abrasive particles of the group 301 can have a predetermined rotational orientation that is different than the predetermined rotational orientation of all of the shaped abrasive particles of the group 303.

In accordance with another embodiment, at least a portion of the shaped abrasive particles of the group 301 can have a predetermined lateral orientation that is different than the predetermined lateral orientation of at least a portion of the shaped abrasive particles of the group 303. For yet another embodiment, all of the shaped abrasive particles of the group 301 can have a predetermined lateral orientation that is different than the predetermined lateral orientation of all of the shaped abrasive particles of the group 303.

Moreover, in another embodiment, at least a portion of the shaped abrasive particles of the group 301 can have a predetermined longitudinal orientation that may be different than the predetermined longitudinal orientation of at least a portion of the shaped abrasive particles of the group 303. For another embodiment, all of the shaped abrasive particles of the group 301 can have a predetermined longitudinal orientation that may be different than the predetermined longitudinal orientation of all of the shaped abrasive particles of the group 303.

Furthermore, at least a portion of the shaped abrasive particles of the group 301 can have a predetermined vertical orientation that is different than the predetermined vertical orientation of at least a portion of the shaped abrasive particles of the group 303. Still, for one aspect, all of the shaped abrasive particles of the group 301 can have a predetermined vertical orientation that is different than the predetermined vertical orientation of all of the shaped abrasive particles of the group 303

Moreover, in one embodiment, at least a portion of the shaped abrasive particles of the group 301 may have a predetermined tip height that is different than the predetermined tip height of at least a portion of the shaped abrasive particles of the group 303. In yet another particular embodiment, all of the shaped abrasive particles of the group 301 may have a predetermined tip height that is different than the predetermined tip height of all of the shaped abrasive particles of the group 303.

It will be appreciated that any number of groups may be included in the abrasive article creating various regions on the abrasive article having predetermined orientation characteristics. Moreover, each of the groups can be different from each other as described in the foregoing for the groups 301 and 303.

As described in one or more embodiments herein, the shaped abrasive particles can be arranged in a predetermined distribution defined by predetermined positions on the backing. More notably, the predetermined distribution can define a non-shadowing arrangement between two or more shaped abrasive particles. For example, in one particular embodiment, the abrasive article can include a first shaped abrasive particle in a first predetermined position and a second shaped abrasive particle in a second predetermined position, such that the first and second shaped abrasive particle define a non-shadowing arrangement relative to each other. A non-shadowing arrangement can be defined by an arrangement of the shaped abrasive particles such that they are configured to make initial contact with the workpiece at separate locations on the workpiece and limiting or avoiding an initial overlap in the location of initial material removal on the workpiece. A non-shadowing arrangement can facilitate improved grinding performance. In one particular embodiment, the first shaped abrasive particle can be part of a group defined by a plurality of shaped abrasive particles, and the second shaped abrasive particle can be part of a second group defined by a plurality of shaped abrasive particles. The first group can define a first row on the backing and the second group can define a second row on the backing, and each of the shaped abrasive particles of the second group can be staggered relative to each of the shaped abrasive particles of the first group, thus defining a particular non-shadowing arrangement.

Figure 3B:
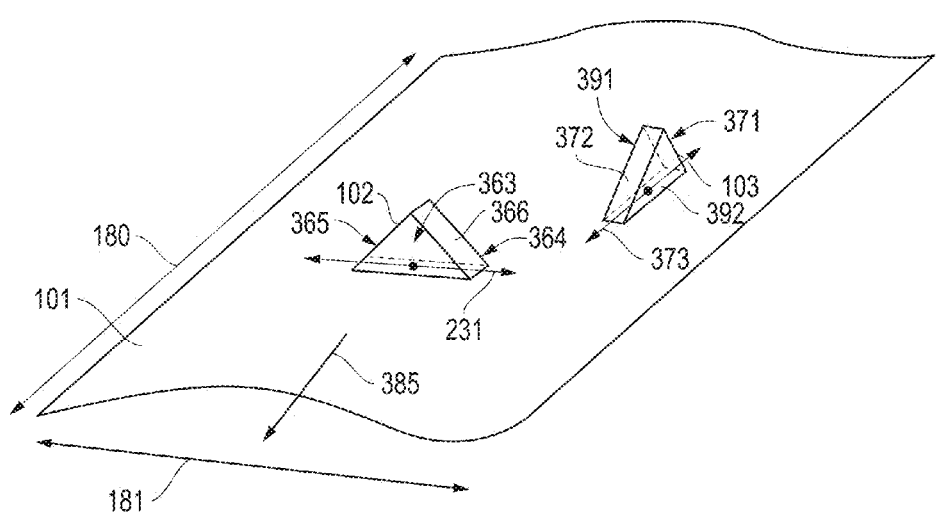
FIG. 3B includes a perspective view illustration of a portion of an abrasive article including shaped abrasive particles having predetermined orientation characteristics relative to a grinding direction in accordance with an embodiment.

FIG. 3B includes a perspective view illustration of a portion of an abrasive article including shaped abrasive particles having predetermined orientation characteristics relative to a grinding direction in accordance with an embodiment. In one embodiment, the abrasive article can include a shaped abrasive particle 102 having a predetermined orientation relative to another shaped abrasive particle 103 and/or relative to a grinding direction 385. Control of one or a combination of predetermined orientation characteristics relative to the grinding direction 385 may facilitate improved grinding performance of the abrasive article. The grinding direction 385 may be an intended direction of movement of the abrasive article relative to a workpiece in a material removal operation. In particular instances, the grinding direction 385 may be related to the dimensions of the backing 101. For example, in one embodiment, the grinding direction 385 may be substantially perpendicular to the lateral axis 181 of the backing and substantially parallel to the longitudinal axis 180 of the backing 101. The predetermined orientation characteristics of the shaped abrasive particle 102 may define an initial contact surface of the shaped abrasive particle 102 with a workpiece. For example, the shaped abrasive particle 102 can have a major surfaces 363 and 364, and side surfaces 365 and 366 extending between the major surfaces 363 and 364. The predetermined orientation characteristics of the shaped abrasive particle 102 can position the particle such that the major surface 363 is configured to make initial contact with a workpiece before the other surfaces of the shaped abrasive particle 102. Such an orientation may be considered a frontal orientation relative to the grinding direction 385. More particularly, the shaped abrasive particle 102 can have a bisecting axis 231 having a particular orientation relative to the grinding direction. For example, as illustrated, the vector of the grinding direction 385 and the bisecting axis 231 are substantially perpendicular to each other. It will be appreciated that just as any range of predetermined rotational orientations are contemplated for a shaped abrasive particle, any range of orientations of the shaped abrasive particles relative to the grinding direction 385 are contemplated and can be utilized.

The shaped abrasive particle 103 can have different predetermined orientation characteristics relative to the shaped abrasive particle 102 and the grinding direction 385. As illustrated, the shaped abrasive particle 103 can include major surfaces 391 and 392, which can be joined by side surfaces 371 and 372. Moreover, as illustrated, the shaped abrasive particle 103 can have a bisecting axis 373 forming a particular angle relative to the vector of the grinding direction 385. As illustrated, the bisecting axis 373 of the shaped abrasive particle 103 can have a substantially parallel orientation with the grinding direction 385 such that the angle between the bisecting axis 373 and the grinding direction 385 is essentially 0 degrees. Accordingly, the predetermined orientation characteristics of the shaped abrasive particle facilitate initial contact of the side surface 372 with a workpiece before any of the other surfaces of the shaped abrasive particle. Such an orientation of the shaped abrasive particle 103 may be considered a sideways orientation relative to the grinding direction 385.

It will be appreciated that the abrasive article can include one or more groups of shaped abrasive particles that can be arranged in a predetermined distribution relative to each other, and more particularly can have distinct predetermined orientation characteristics that define groups of shaped abrasive particles. The groups of shaped abrasive particles, as described herein, can have a predetermined orientation relative to a grinding direction. Moreover, the abrasive articles herein can have one or more groups of shaped abrasive particles, each of the groups having a different predetermined orientation relative to a grinding direction. Utilization of groups of shaped abrasive particles having different predetermined orientations relative to a grinding direction can facilitate improved performance of the abrasive article.

Figure 4:
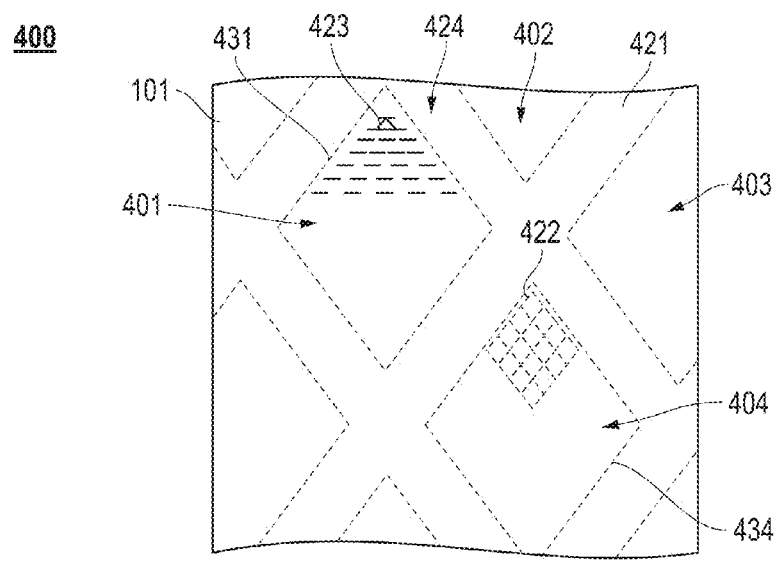
FIG. 4 includes a top view illustration of a portion of an abrasive article in accordance with an embodiment.

FIG. 4 includes a top view illustration of a portion of an abrasive article in accordance with an embodiment. In particular, the abrasive article 400 can include a first group 401 including a plurality of shaped abrasive particles. As illustrated, the shaped abrasive particles can be arranged relative to each other to define a predetermined distribution.

More particularly, the predetermined distribution can be in the form of a pattern 423 as viewed top-down, and more particularly defining a triangular shaped two-dimensional array. As further illustrated, the group 401 can be arranged on the abrasive article 400 defining a predetermined microunit 431 overlying the backing 101. In accordance with an embodiment, the microunit 431 can have a particular two-dimensional shape as viewed top-down. Some exemplary two-dimensional shapes can include polygons, ellipsoids, numerals, Greek alphabet characters, Latin alphabet characters, Russian alphabet characters, Arabic alphabet characters, Kanji characters, complex shapes, designs, any a combination thereof. In particular instances, the formation of a group having a particular microunit may facilitate improved performance of the abrasive article.

As further illustrated, the abrasive article 400 can include a group 404 including a plurality of shaped abrasive particles which can be arranged on the surface of the backing 101 to define a predetermined distribution. Notably, the predetermined distribution can include an arrangement of the plurality of the shaped abrasive particles that define a pattern, and more particularly, a generally quadrilateral pattern 424. As illustrated, the group 404 can define a microunit 434 on the surface of the abrasive article 400. In one embodiment, the microunit 434 of the group 404 can have a two-dimensional shape as viewed top down, including for example a polygonal shape, and more particularly, a generally quadrilateral (diamond) shape as viewed top down on the surface of the abrasive article 400. In the illustrated embodiment of FIG. 4, the group 401 can have a microunit 431 that is substantially the same as the microunit 434 of the group 404. However, it will be appreciated that in other embodiments, various different groups can be used on the surface of the abrasive article, and more particularly wherein each of the different groups has a different microunit.

As further illustrated, the abrasive article can include groups 401, 402, 403, and 404 which can be separated by channel regions 422 and 421 extending between the groups 401-404. In particular instances, the channel region can be substantially free of shaped abrasive particles. Moreover, the channel regions 421 and 422 may be configured to move liquid between the groups 401-404 and further improve swarf removal and grinding performance of the abrasive article. Furthermore, in a certain embodiment, the abrasive article 400 can include channel regions 421 and 422 extending between groups 401-404, wherein the channel regions 421 and 422 can be patterned on the surface of the abrasive article 400. In particular instances, the channel regions 421 and 422 can represent a regular and repeating array of features extending along a surface of the abrasive article.

Figure 5:
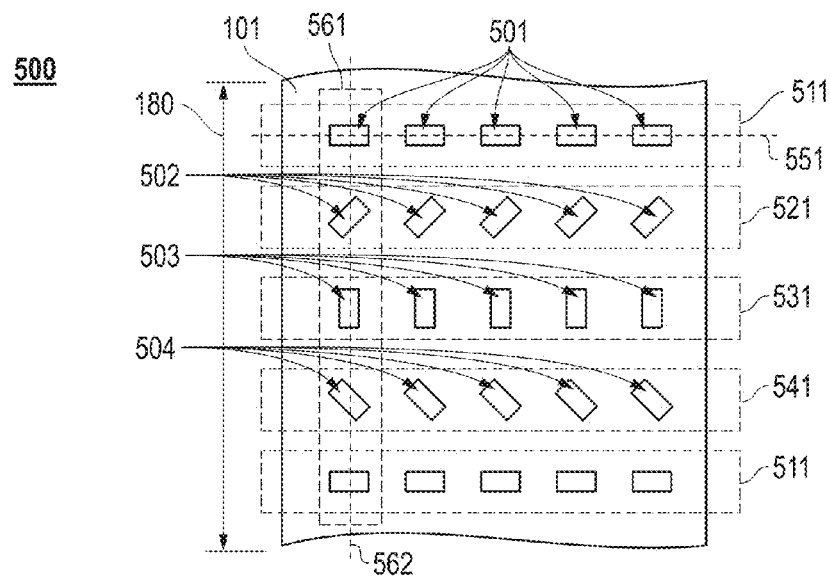
FIG. 5 includes a top view of a portion of an abrasive article in accordance with an embodiment.

FIG. 5 includes a top view of a portion of an abrasive article in accordance with an embodiment. Notably, the abrasive article 500 can include shaped abrasive particles 501 overlying, and more particularly, coupled to the backing 101. In at least one embodiment, the abrasive articles of the embodiments herein, can include a row 511 of shaped abrasive particles. The row 511 can include a group of shaped abrasive particles 501, wherein each of the shaped abrasive particles 501 within the row 511 can have a same predetermined lateral orientation with respect to each other. In particular, as illustrated, each of the shaped abrasive particles 501 of the row 511 can have a same predetermined lateral orientation with respect to the lateral axis 551. Moreover, each of the shaped abrasive particles 501 of the first row 511 may be part of a group and thus having at least one other predetermined orientation characteristic that is the same relative to each other. For example, each of the shaped abrasive particles 501 of the row 511 can be part of a group having a same predetermined vertical orientation, and may define a vertical company. In at least another embodiment, each of the shaped abrasive particles 501 of the row 511 can be part of a group having a same predetermined rotational orientation, and may define a rotational company. Moreover, each of the shaped abrasive particles 501 of the row 511 can be part of a group having a same predetermined tip height with respect to each other, and may define a tip height company. Moreover, as illustrated, the abrasive article 500 can include a plurality of groups in the orientation of the row 511, which may be spaced apart from each other along the longitudinal axis 180, and more particularly, separated from each other by other intervening rows, including for example, rows 521, 531, and 541.

As further illustrated in FIG. 5, the abrasive article 500 can include shaped abrasive particles 502 which may be arranged relative to each other to define a row 521. The row 521 of shaped abrasive particles 502 can include any of the features described in accordance with the row 511. Notably, the shaped abrasive particles 502 of the row 521 may have a same predetermined lateral orientation with respect to each other. Furthermore, the shaped abrasive particles 502 of the row 521 may have at least one predetermined orientation characteristic that is different than a predetermined orientation characteristic of any one the shaped abrasive particles 501 of the row 511. For example, as illustrated, each of the shaped abrasive particles 502 of the row 521 can have a same predetermined rotational orientation that is different than the predetermined rotational orientation of each of the shaped abrasive particles 501 of the row 511.

In accordance with another embodiment, the abrasive article 500 can include shaped abrasive particles 503 arranged relative to each other and defining a row 531. The row 531 can have any of the characteristics as described in accordance with other embodiments, particularly with respect to row 511 or row 521. Furthermore, as illustrated, each of the shaped abrasive particles 503 within the row 531 can have at least one predetermined orientation characteristic that is the same with respect to each other. Moreover, each of the shaped abrasive particles 503 within the row 531 can have at least one predetermined orientation characteristic that is different than a predetermined orientation characteristic relative to any one of the shaped abrasive particles 501 of row 511 or the shaped abrasive particles 502 of row 521. Notably, as illustrated, each of the shaped abrasive particles 503 of row 531 can have a same predetermined rotational orientation that is different with respect to the predetermined rotational orientation of the shaped abrasive particles 501 and row 511 and the predetermined rotational orientation of the shaped abrasive particles 502 and row 521.

As further illustrated, the abrasive article 500 can include shaped abrasive particles 504 arranged relative to each other and defining a row 541 on the surface of the abrasive article 500. As illustrated, each of the shaped abrasive particles 504 and the row 541 can have at least one of the same predetermined orientation characteristic. Furthermore, in accordance with an embodiment, each of the shaped abrasive particles 504 can have at least one of the same predetermined orientation characteristic, such as a predetermined rotational orientation that is different than the predetermined rotational orientation of any of the shaped abrasive particles 501 of row 511, the shaped abrasive particles 502 of the row 521, and the shaped abrasive particles 503 of the row 531.

As further illustrated, the abrasive article 500 can include a column 561 of shaped abrasive particles including at least one shaped abrasive particle from each of the rows 511, 521, 531, and 541. Notably, each of the shaped abrasive particles within the column 561 can share at least one predetermined orientation characteristic, and more particularly at least a predetermined longitudinal orientation with respect to each other. As such, each of the shaped abrasive particles within the column 561 can have a predetermined longitudinal orientation with respect to each other and a longitudinal plane 562. In certain instances, the arrangement of shaped abrasive particles in groups, which can include the arrangement of shaped abrasive particles in rows, columns, vertical companies, rotational companies, and tip height companies can facilitate improved performance of the abrasive article.

Figure 6:
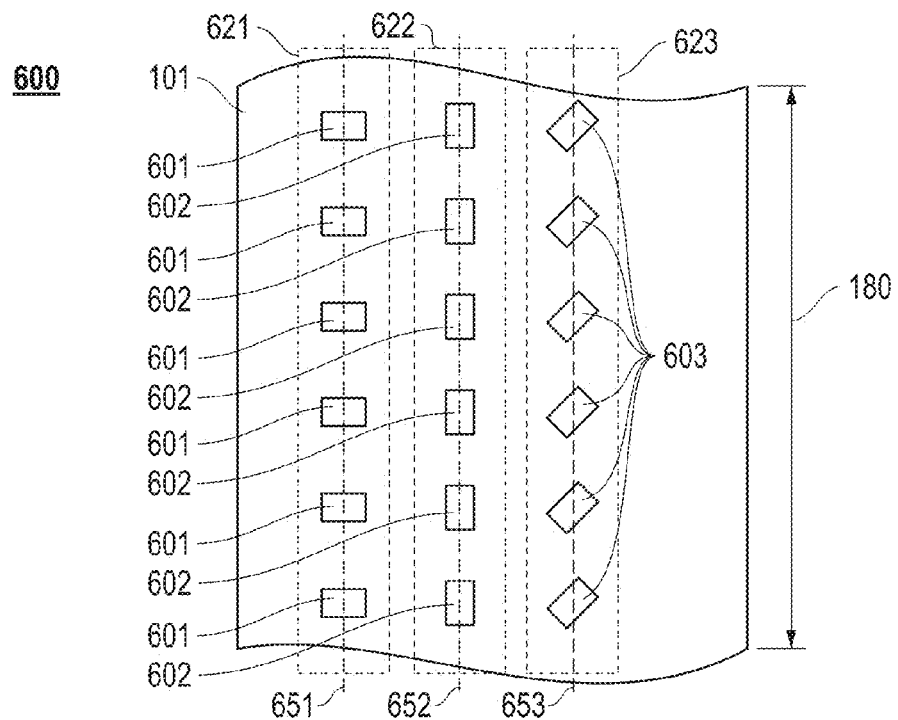
FIG. 6 includes a top view illustration of a portion of an abrasive article in accordance with an embodiment.

FIG. 6 includes a top view illustration of a portion of an abrasive article in accordance with an embodiment. Notably, the abrasive article 600 can include shaped abrasive particles 601 that can be arranged relative to each other to define a column 621 extending along a longitudinal plane 651 and having at least one of the same predetermined orientation characteristics relative to each other. For example, each of the shaped abrasive particles 601 of the company 621 can have a same predetermined longitudinal orientation with respect to each other and the longitudinal axis 651. It will be appreciated that the shaped abrasive particles 601 of the column 621 can share at least one other predetermined orientation characteristic, including for example a same predetermined rotational orientation with respect to each other.

As further illustrated, the abrasive article 600 can include shaped abrasive particles 602 arranged relative to each other on the backing 101 and defining a column 622 with respect to each other along a longitudinal plane 652. It will be appreciated that the shaped abrasive particles 602 of the column 622 can share at least one other predetermined orientation characteristic, including for example a same predetermined rotational orientation with respect to each other. Still, each of the shaped abrasive particles 602 of the column 622 can define a group having at least one predetermined orientation characteristic different than at least one predetermined orientation characteristic of at least one of the shaped abrasive particles 621 of the column 621. More particularly, each of the shaped abrasive particles 602 of the column 622 can define a group having a combination of predetermined orientation characteristics different than a combination of predetermined orientation characteristics of the shaped abrasive particles 601 of the column 621.

Furthermore, as illustrated, the abrasive article 600 can include shaped abrasive particles 603 having a same predetermined longitudinal orientation with respect to each other along the a longitudinal plane 653 on the backing 101 and defining a column 623. Still, each of the shaped abrasive particles 603 of the column 623 can define a group having at least one predetermined orientation characteristic different than at least one predetermined orientation characteristic of at least one of the shaped abrasive particles 621 of the column 621 and the shaped abrasive particles 602 of the column 622. More particularly, each of the shaped abrasive particles 603 of the column 623 can define a group having a combination of predetermined orientation characteristics different than a combination of predetermined orientation characteristics of the shaped abrasive particles 601 of the column 621 and the shaped abrasive particles 602 of the column 622.

Figure 7A:
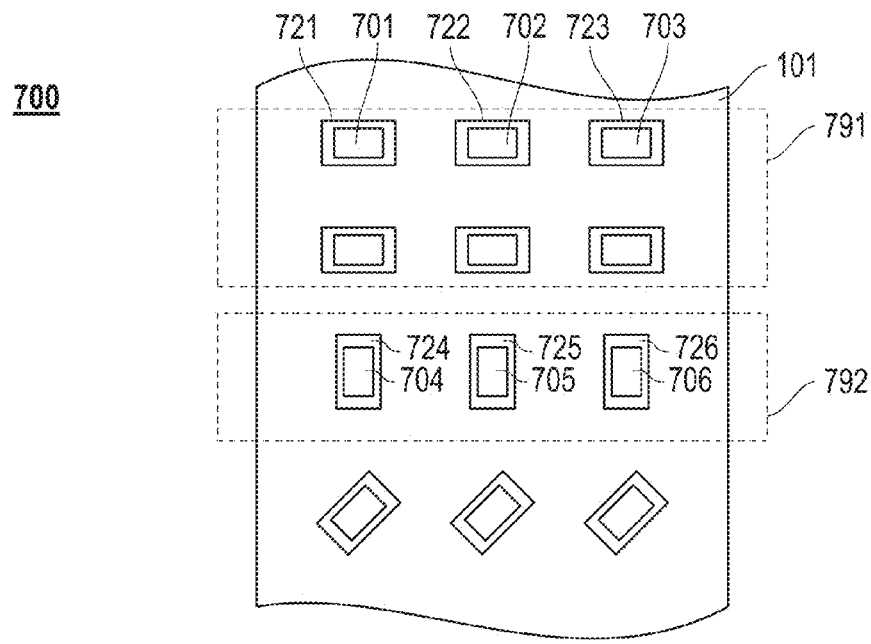
FIG. 7A includes a top view illustration of a portion of an abrasive article in accordance with an embodiment.

FIG. 7A includes a top down view of a portion of an abrasive article in accordance with an embodiment. In particular instances, the abrasive articles herein may further include orientation regions that facilitate placement of shaped abrasive particles in the predetermined orientations. The orientation regions can be coupled to the backing 101 of the abrasive article. Alternatively, the orientation regions can be part of an adhesive layer, including for example a make coat or a size coat. In still another embodiment, the orientation regions can be overlying the backing 101 or even more particularly integrated with the backing 101.

As illustrated in FIG. 7A, the abrasive article 700 can include shaped abrasive particles 701, 702, 703, (701-703) and each of the shaped abrasive particles 701-703 can be coupled with a respective orientation region 721, 722, and 723 (721-723). In accordance with an embodiment, the orientation region 721 can be configured to define at least one (or a combination of) predetermined orientation characteristic of the shaped abrasive particle 701. For example, the orientation region 721 can be configured to define a predetermined rotational orientation, a predetermined lateral orientation, a predetermined longitudinal orientation, a predetermined vertical orientation, a predetermined tip height, and a combination thereof with respect to the shaped abrasive particle 701. Furthermore, in a particular embodiment, the orientation regions 721, 722 and 723 can be associated with a plurality of shaped abrasive particles 701-703 and can define a group 791.

According to one embodiment, the orientation regions 721-723 can be associated with an alignment structure, and more particularly, part of an alignment structure (e.g., discrete contact regions) as described in more detail herein. The orientation regions 721-723 can be integrated within any of the components of the abrasive article, including for example, the backing 101 or adhesive layers, and thus may be considered contact regions as described in more detail herein. Alternatively, the orientation regions 721-723 can be associated with an alignment structure use in forming the abrasive article, which may be a separate component from the backing and integrated within the abrasive article, and which may not necessarily form a contact region associated with the abrasive article.

As further illustrated, the abrasive article 700 can further include shaped abrasive particles 704, 705, 706 (704-706), wherein each of the shaped abrasive particles 704-706 can be associated with an orientation region 724, 725, 726, respectively. The orientation regions 724-726 can be configured to control at least one predetermined orientation characteristic of the shaped abrasive particles 704-706. Moreover, the orientation regions 724-726 can be configured to define a group 792 of shaped abrasive particle 704-706. In accordance with an embodiment, the orientation regions 724-726 can be spaced apart from the orientation regions 721-723. More particularly the orientation regions 724-726 can be configured to define a group 792 having at least one predetermined orientation characteristic that is different than a predetermined orientation characteristic of the shaped abrasive particles 701-703 of the group 791.

Figure 7B:
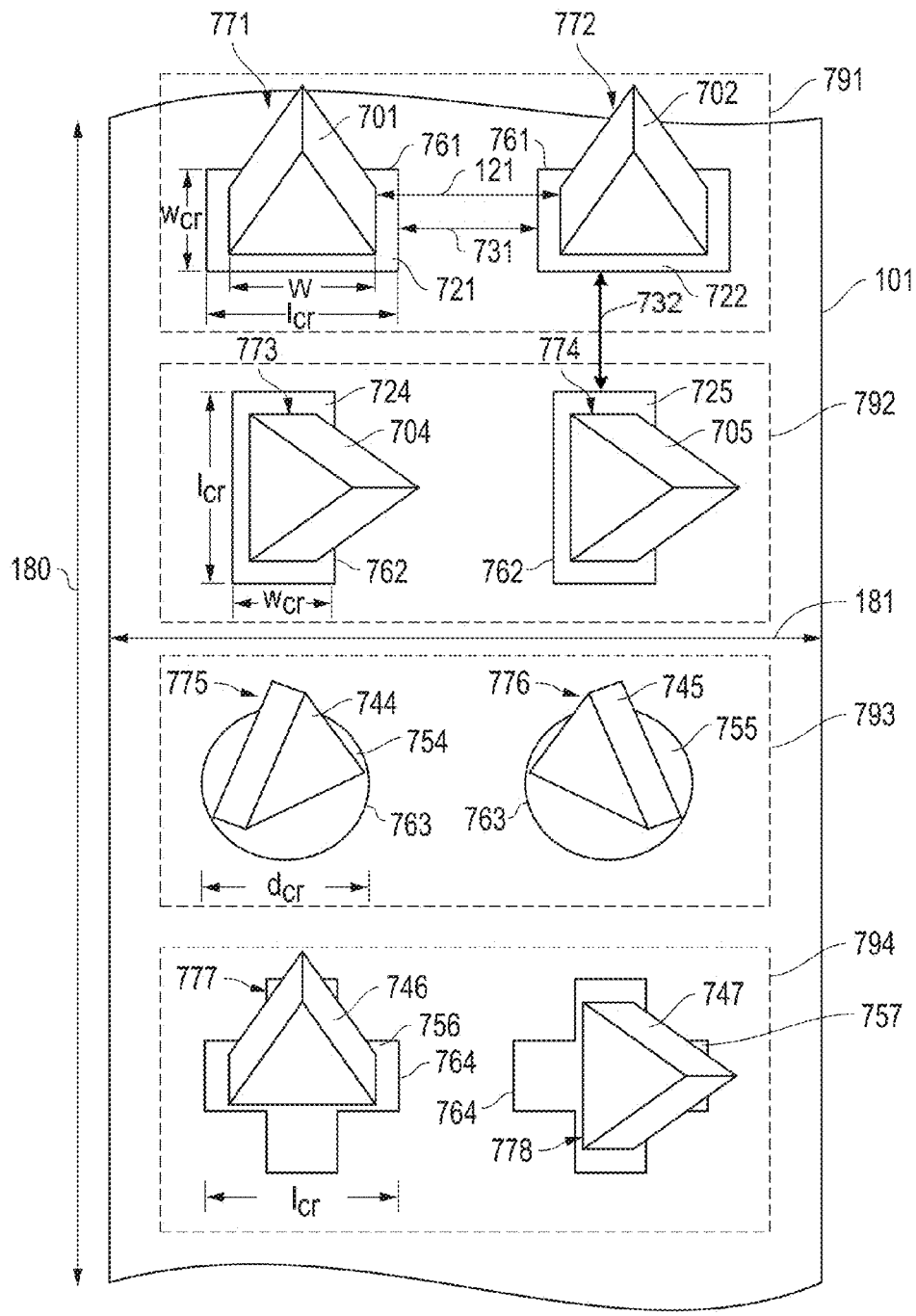
FIG. 7B includes a perspective view illustration of a portion of an abrasive article in accordance with an embodiment.

FIG. 7B includes an illustration of a portion of an abrasive article according to an embodiment. In particular, FIG. 7B includes an illustration of particular embodiments of alignment structures and contact regions that may be utilized and configured to facilitate at least one predetermined orientation characteristic of one or more shaped abrasive particles associated with the alignment structure and contact regions.

FIG. 7B includes a portion of an abrasive article including a backing 101 a first group 791 of shaped abrasive particles 701 and 702 overlying the backing 101, a second group 792 of shaped abrasive particles 704 and 705 overlying the backing 101, a third group 793 of shaped abrasive particles 744 and 745 overlying the backing 101, and a fourth group 794 of shaped abrasive particles 746 and 747 overlying the backing 101. It will be appreciated that while various and multiple different groups 791, 792, 793, and 794 are illustrated, the illustration is in no way limiting and the abrasive articles of the embodiments herein can include any number and arrangement of groups.

The abrasive article of FIG. 7B further includes an alignment structure 761 having a first contact region 721 and a second contact region 722. The alignment structure 761 can be used to facilitate placement of the shaped abrasive particles 701 and 702 in desired orientations on the backing and relative to each other. The alignment structure 761 of the embodiments herein can be a permanent part of the abrasive article. For example, the alignment structure 761 can include contact regions 721 and 722, which can overlie the backing 101, and in some instances, directly contact the backing 101. In particular instances, the alignment structure 761 may be integral with the abrasive article, and may overlie the backing, underlie an adhesive layer overlying the backing, or even be integral part of one or more adhesive layers overlying the backing.

According to one embodiment, the alignment structure 761 can be configured to deliver and in particular instances, temporarily or permanently hold the shaped abrasive particle 701 at a first position 771. In particular instances, such as illustrated in FIG. 7B, the alignment structure 761 can include a contact region 721, which can have a particular two-dimensional shape as viewed top down and defined by the width of the contact region ($w_{cr}$) and the length of the contact region ($l_{cr}$), wherein the length is the longest dimension of the contact region 721. According to at least one embodiment, the contact region can be formed to have a shape (e.g., a two-dimensional shape), which may facilitate controlled orientation of the shaped abrasive particle 701. More particularly, the contact region 721 can have a two-dimensional shape configured to control one or more (e.g., at least two of) a particular predetermined orientation characteristic, including for example, a predetermined rotational orientation, a predetermined lateral orientation, and a predetermined longitudinal orientation.

In particular instances, the contact regions 721 and 722 can be formed to have controlled two-dimensional shapes that may facilitate a predetermined rotational orientation of the corresponding shaped abrasive particles 701 and 702. For example, the contact region 721 can have a controlled and predetermined two-dimensional shape configured to determine a predetermined rotational orientation of the shaped abrasive particle 701. Moreover, the contact region 722 can have a controlled and predetermined two-dimensional shape configured to determine a predetermined rotational orientation of the shaped abrasive particle 702.

As illustrated, the alignment structure can include a plurality of discrete contact regions 721 and 722, wherein each of the contact regions 721 and 722 can be configured to deliver, and temporarily or permanently hold, one or more shaped abrasive particles. In some instances, the alignment structure can include a web, a fibrous material, a mesh, a solid structure having openings, a belt, a roller, a patterned material, a discontinuous layer of material, a patterned adhesive material, and a combination thereof.

The plurality of contact regions 721 and 722 can define at least one of the predetermined rotational orientation of a shaped abrasive particle, a predetermined rotational orientation difference between at least two shaped abrasive particles, the predetermined longitudinal orientation of a shaped abrasive particle, a longitudinal space between two shaped abrasive particles, the predetermined lateral orientation, a lateral space between two shaped abrasive particles, a predetermined vertical orientation, a predetermined vertical orientation difference between two shaped abrasive particles, a predetermined tip height, a predetermined tip height difference between two shaped abrasive particles. In particular instances, as illustrated in FIG. 7B, the plurality of discrete contact regions can include a first contact region 721 and a second contact region 722 distinct from the first contact region 721. While the contact regions 721 and 722 are illustrated as having the same general shape relative to each other, as will become evident in based on further embodiments described herein, the first contact region 721 and second contact region 722 can be formed to have different two-dimensional shapes. Furthermore, while not illustrated, it will be appreciated that alignment structures of the embodiments herein can include first and second contact regions configured to deliver and contain shaped abrasive particles in different predetermined rotational orientations with respect to each other.

In one particular embodiment, the contact regions 721 and 722 can have a two-dimensional shape selected from the group consisting of polygons, ellipsoids, numerals, crosses, multi-armed polygons, Greek alphabet characters, Latin alphabet characters, Russian alphabet characters, Arabic alphabet characters, rectangle, quadrilateral, pentagon, hexagon, heptagon, octagon, nonagon, decagon, and a combination thereof. Moreover, while the contact regions 721 and 722 are illustrated as having substantially the same two-dimensional shape, it will be appreciated, that in alternative embodiments, the contact regions 721 and 722 can have different two-dimensional shapes. Two-dimensional shapes are the shapes of the contact regions 721 and 722 as viewed in the plane of the length and width of the contact regions, which may be the same plane defined by the upper surface of the backing.

Moreover, it will be appreciated that the alignment structure 761 may be a temporary part of the abrasive article. For example, the alignment structure 761 can represent a template or other object that temporarily fixes the shaped abrasive particles at the contact regions, facilitating placement of the shaped abrasive particles in a desired position having one or more predetermined orientation characteristics. After placement of the shaped abrasive particles, the alignment structure may be removed leaving the shaped abrasive particle on the backing in the predetermined positions.

According to one particular embodiment, the alignment structure 761 can be a discontinuous layer of material including the plurality of contact regions 721 and 722 that may be made of an adhesive material. In more particular instances, the contact region 721 can be configured to adhere at least one shaped abrasive particle. In other embodiments, the contact region 721 can be formed to adhere more than one shaped abrasive particle. It will be appreciated that according to at least one embodiment, the adhesive material can include an organic material, and more particularly, at least one resin material.

Furthermore, the plurality of contact regions 721 and 722 can be arranged on the surface of the backing 101 to define a predetermined distribution of contact regions. The predetermined distribution of contact regions can have any characteristic of predetermined distributions described herein. In particular, the predetermined distribution of contact regions can define a controlled, non-shadow arrangement. The predetermined distribution of contact regions can define and substantially correspond to a same predetermined distribution of shaped abrasive particles on the backing, wherein each contact region can define a position of a shaped abrasive particle.

As illustrated, in certain instances, the contact regions 721 and 722 can be spaced apart from each other. In at least one embodiment, the contact regions 721 and 722 can be spaced apart from each other by a distance 731. The distance 731 between contact regions 721 and 722 is generally the smallest distance between adjacent contact regions 721 and 722 in a direction parallel to the lateral axis 181 or longitudinal axis 180.

In accordance with one embodiment, the discrete contact regions of the plurality of discrete contact regions can be spaced apart from each other by a gap distance extending in any direction between adjacent discrete contact regions and over a non-contact region, wherein essentially no adhesive material is provided on the backing 101. For example, the gap distance may be the distance 731 between the discrete contact regions 721 and 722 a direction parallel to the lateral axis 181. Alternatively, in another embodiment, the gap distance can be a distance 732 extending in a direction parallel to the longitudinal axis 180. The foregoing examples are non-limiting and the gap distance may extend in any variety of directions depending on the shortest distance between a first discrete contact region and a second contact region, while extending over a non-contact region. In one embodiment, the gap distance can be at least about 0.5(w), wherein (w) corresponds to a width of a body of a shaped abrasive particle. In other instances, the gap distance can be at least about 0.7(w), at least about 0.9(w), at least about 1(w), at least about 1.1(w), at least about 1.3(w). Still, in a non-limiting embodiment, the gap distance can be not greater than about 100(w), not greater than about 50(w). The formation of discrete contact regions of certain dimensions may improve processing over other methods using a continuous coating of material. For example, in certain instances, use of a discontinuous coating comprising discrete contact regions can reduce processing time and reduce blistering associated with abrasive articles using a continuous coating of material. Moreover, and unexpectedly, the shaped abrasive may experience improved anchoring using a discontinuous coating as opposed to a continuous coating.

For another embodiment, the gap distance can be at least about 0.1 mm, such as at least about 0.5 mm, at least about 1 mm, at least about 2 mm, or even at least about 2.5 mm. Yet, in another non-limiting embodiment, the gap distance can be not greater than about 50 mm, such as not greater than about 40 mm, or not greater than about 20 mm.

In certain instances, the discrete contact regions 721 and 722 can have a particular width ($w_{cr}$) relative to a dimension of a body of a shaped abrasive particle, which can facilitate the features of the embodiments herein. For example, the discrete containment region 721 can have a width ($w_{cr}$) defining a minimum dimension of the discrete containment region that can be at least about 0.5(h), wherein (h) is a height of a body of a shaped abrasive particle as described in embodiments herein. In other instance, the width of the discrete contact region 721 can be at least about 0.7(h), such as at least about 0.9(h), at least about 1(h), at least about 1.1(h), at least about 1.3(h). Still, in a non-limiting embodiment, the width of the discrete contact region 721 can be not greater than about 100(h), such as not greater than about 50(h). It will be appreciated that the width of the discrete contact region 721 can be within a range between any of the minimum and maximum values noted above. Furthermore, it will be appreciated that the width of the discrete contact region 721 can be attributed to any other discrete contact regions of the embodiments herein, and further understood that a width can correlate to a diameter in the context of a discrete contact region having a circular shape (e.g., discrete contact region 763).

For another embodiment, the width of the discrete contact region 721 can be not greater than about 5 mm, such as not greater than about 4 mm, not greater than about 3 mm, not greater than about 2 mm, not greater than about 1 mm, or even not greater than about 0.8 mm. Still, in another non-limiting embodiment, the width of the discrete contact region 721 can be at least about 0.01 mm, such as at least about 0.05 mm, or even at least about 0.1 mm. It will be appreciated that the width of the discrete contact region 721 can be within a range between any of the minimum and maximum values noted above. Furthermore, it will be appreciated that the width of the discrete contact region 721 can be attributed to any other discrete contact regions of the embodiments herein, and further understood that a width can correlate to a diameter in the context of a discrete contact region having a circular shape (e.g., discrete contact region 763).

Control of the size and shape of the discrete contact regions may be achieved by controlling a rheology of an adhesive material used to form each of the discrete contact regions of the plurality of discrete contact regions. However, it will be appreciated that other such process controls may be utilized.

In an alternative embodiment, the plurality of discrete contact regions 721 and 722 can be openings in a structure, such as a substrate. For example, each of the contact regions 721 and 722 can be openings in a template that is used to temporarily place the shaped abrasive particles in particular positions on the backing 101. The plurality of openings can extend partially or entirely through the thickness of the alignment structure. Alternatively, the contact regions 7821 and 722 can be openings in a structure, such as a substrate or layer that is permanently part of the backing and final abrasive article. The openings can have particular cross-sectional shapes that may be complementary to a cross-sectional shape of the shaped abrasive particles to facilitate placement of the shaped abrasive particles in predetermined positions and with one or more predetermined orientation characteristics.

Moreover, according to an embodiment, the alignment structure can include a plurality of discrete contact regions separated by non-contact regions, wherein the non-contact regions are regions distinct from the discrete contact regions and may be substantially free of the shaped abrasive particles. In one embodiment, the non-contact regions can define regions configured to be essentially free of adhesive material and separating contract regions 721 and 722. In one particular embodiment, the non-contact region can define regions configured to be essentially free of shaped abrasive particles.

Various methods may be utilized for form an alignment structure and the discrete contact regions, including but not limited to process such as coating, spraying, depositing, printing, etching, masking, removing, molding, casting, stamping, heating, curing, tacking, pinning, fixing, pressing, rolling, stitching, adhering, irradiating, and a combination thereof. In particular instances, wherein the alignment structure is in the form of a discontinuous layer of adhesive material, which can include a plurality of discrete contact regions including an adhesive material spaced apart from each other by non-contact regions, the forming process can include a selective deposition of the adhesive material.

As illustrated and noted above, FIG. 7B further includes a second group 792 of shaped abrasive particles 704 and 705 overlying the backing 101. The second group 792 can be associated with an alignment structure 762, which can include a first contact region 724 and a second contact region 725. The alignment structure 762 can be used to facilitate placement of the shaped abrasive particles 704 and 705 in desired orientations on the backing 101 and relative to each other. As noted herein, the alignment structure 762 can have any of the characteristics of alignment structures described herein. It will be appreciated that the alignment structure 762 can be a permanent or temporary part of the final abrasive article. The alignment structure 762 may be integral with the abrasive article, and may overlie the backing 101, underlie an adhesive layer overlying the backing 101, or even be integral part of one or more adhesive layers overlying the backing 101.

According to one embodiment, the alignment structure 762 can be configured to deliver and in particular instances, temporarily or permanently hold the shaped abrasive particle 704 at a first position 773. In particular instances, such as illustrated in FIG. 7B, the alignment structure 762 can include a contact region 724, which can have a particular two-dimensional shape as viewed top down and defined by the width of the contact region ($w_{cr}$) and the length of the contact region ($l_{cr}$), wherein the length is the longest dimension of the contact region 724.

According to at least one embodiment, the contact region 724 can be formed to have a shape (e.g., a two-dimensional shape), which may facilitate controlled orientation of the shaped abrasive particle 704. More particularly, the contact region 724 can have a two-dimensional shape configured to control one or more (e.g., at least two of) a particular predetermined orientation characteristic, including for example, a predetermined rotational orientation, a predetermined lateral orientation, and a predetermined longitudinal orientation. In at least one embodiment, the contact region 724 can be formed to have a two-dimensional shape, wherein the dimensions of the contact region 724 (e.g., length and/or width) substantially correspond to and are substantially the same as dimensions of the shaped abrasive particle 704, thereby facilitating positioning of the shaped abrasive particle at the position 772 and facilitating one or a combination of predetermined orientation characteristics of the shaped abrasive particle 704. Furthermore, according to an embodiment, the alignment structure 762 can include a plurality of contact regions having controlled two-dimensional shapes configured to facilitate and control one or more predetermined orientation characteristics of associated shaped abrasive particles.

As further illustrated, and according to an embodiment, the alignment structure 762 can be configured to deliver and in particular instances, temporarily or permanently hold the shaped abrasive particle 705 at a second position 774. In particular instances, such as illustrated in FIG. 7B, the alignment structure 762 can include a contact region 725, which can have a particular two-dimensional shape as viewed top down and defined by the width of the contact region ($w_{cr}$) and the length of the contact region ($l_{cr}$), wherein the length is the longest dimension of the contact region 725. Notably, the contact regions 724 and 725 of the alignment structure can have a different orientation relative to the contact regions 721 and 722 of the alignment structure 761 to facilitate different predetermine orientation characteristics between the shaped abrasive particles 701 and 702 of the group 791 and the shaped abrasive particles 704 and 705 of the group 792.

As illustrated and noted above, FIG. 7B further includes a third group 793 of shaped abrasive particles 744 and 745 overlying the backing 101. The third group 793 can be associated with an alignment structure 763, which can include a first contact region 754 and a second contact region 755. The alignment structure 763 can be used to facilitate placement of the shaped abrasive particles 744 and 745 in desired orientations on the backing 101 and relative to each other. As noted herein, the alignment structure 763 can have any of the characteristics of alignment structures described herein. It will be appreciated that the alignment structure 763 can be a permanent or temporary part of the final abrasive article. The alignment structure 763 may be integral with the abrasive article, and may overlie the backing 101, underlie an adhesive layer overlying the backing 101, or even be integral part of one or more adhesive layers overlying the backing 101.

According to one embodiment, the alignment structure 763 can be configured to deliver and in particular instances, temporarily or permanently hold the shaped abrasive particle 744 at a first position 775. Likewise, as illustrated, the alignment structure 763 can be configured to deliver and in particular instances, temporarily or permanently hold the shaped abrasive particle 745 at a second position 776.

In particular instances, such as illustrated in FIG. 7B, the alignment structure 763 can include a contact region 754, which can have a particular two-dimensional shape as viewed top down. As illustrated, the contact region 754 can have a circular two-dimensional shape, which can be defined in part by a diameter ($d_{cr}$).

According to at least one embodiment, the contact region 754 can be formed to have a shape (e.g., a two-dimensional shape), which may facilitate controlled orientation of the shaped abrasive particle 744. More particularly, the contact region 754 can have a two-dimensional shape configured to control one or more (e.g., at least two of) a particular predetermined orientation characteristic, including for example, a predetermined rotational orientation, a predetermined lateral orientation, and a predetermined longitudinal orientation. In at least one alternative embodiment as illustrated, the contact region 754 can have a circular shape, which may facilitate some freedom of a predetermined rotational orientation. For example, in comparison of the shaped abrasive particles 744 and 745, each of which are associated with the contact regions 754 and 755, respectively, and further wherein each of the contact regions 754 and 755 have circular two-dimensional shapes, the shaped abrasive particles 744 and 745 have different predetermined rotational orientations with respect to each other. The circular two-dimensional shape of the contact regions 754 and 755 may facilitate a preferential side orientation of the shaped abrasive particles 744 and 745, while also allowing for a degree of freedom in at least one predetermined orientation characteristic (i.e., a predetermined rotational orientation) with respect to each other.

It will be appreciated, that in at least one embodiment, a dimensions of the contact region 754 (e.g., diameter) may substantially correspond to and may be substantially the same as a dimension of the shaped abrasive particle 744 (e.g., a width of a side surface), which may facilitate positioning of the shaped abrasive particle 744 at the position 775 and facilitating one or a combination of predetermined orientation characteristics of the shaped abrasive particle 744. Furthermore, according to an embodiment, the alignment structure 763 can include a plurality of contact regions having controlled two-dimensional shapes configured to facilitate and control one or more predetermined orientation characteristics of associated shaped abrasive particles. It will be appreciated, that while the foregoing alignment structure 763 includes contact regions 754 and 755 having substantially similar shapes, the alignment structure 763 can include a plurality of contact regions having a plurality of different two-dimensional shapes.

As illustrated and noted above, FIG. 7B further includes a fourth group 794 of shaped abrasive particles 746 and 747 overlying the backing 101. The fourth group 794 can be associated with an alignment structure 764, which can include a first contact region 756 and a second contact region 757. The alignment structure 764 can be used to facilitate placement of the shaped abrasive particles 746 and 747 in desired orientations on the backing 101 and relative to each other. As noted herein, the alignment structure 764 can have any of the characteristics of alignment structures described herein. It will be appreciated that the alignment structure 764 can be a permanent or temporary part of the final abrasive article. The alignment structure 764 may be integral with the abrasive article, and may overlie the backing 101, underlie an adhesive layer overlying the backing 101, or even be integral part of one or more adhesive layers overlying the backing 101.

According to one embodiment, the alignment structure 764 can be configured to deliver and in particular instances, temporarily or permanently hold the shaped abrasive particle 746 at a first position 777. Likewise, as illustrated, the alignment structure 764 can be configured to deliver and in particular instances, temporarily or permanently hold the shaped abrasive particle 747 at a second position 778.

In particular instances, such as illustrated in FIG. 7B, the alignment structure 763 can include a contact region 756, which can have a particular two-dimensional shape as viewed top down. As illustrated, the contact region 756 can have a cross-like two-dimensional shape, which can be defined in part by a length ($l_{cr}$).

According to at least one embodiment, the contact region 756 can be formed to have a shape (e.g., a two-dimensional shape), which may facilitate controlled orientation of the shaped abrasive particle 746. More particularly, the contact region 756 can have a two-dimensional shape configured to control one or more (e.g., at least two of) a particular predetermined orientation characteristic, including for example, a predetermined rotational orientation, a predetermined lateral orientation, and a predetermined longitudinal orientation. In at least one alternative embodiment as illustrated, the contact region 756 can have a cross-shaped two-dimensional shape, which may facilitate some freedom of a predetermined rotational orientation of the shaped abrasive particle 746.

For example, in comparison of the shaped abrasive particles 746 and 747, each of which are associated with the contact regions 756 and 757, respectively, and further wherein each of the contact regions 756 and 757 have cross-shaped two-dimensional shapes, the shaped abrasive particles 746 and 747 can have different predetermined rotational orientations with respect to each other. The cross-shaped two-dimensional shapes of the contact regions 756 and 757 may facilitate a preferential side orientation of the shaped abrasive particles 746 and 747, while also allowing for a degree of freedom in at least one predetermined orientation characteristic (i.e., a predetermined rotational orientation) with respect to each other. As illustrated, the shaped abrasive particles 746 and 747 are oriented substantially perpendicular to each other. The cross-shaped two-dimensional shape of the contact regions 756 and 757 facilitates generally two preferred predetermined rotational orientations of shaped abrasive particles, each of which are associated with the direction of the arms of the cross-shaped contact regions 756 and 757, and each of the two orientations are illustrated by the shaped abrasive particles 746 and 747.

It will be appreciated, that in at least one embodiment, a dimensions of the contact region 756 (e.g., length) may substantially correspond to and may be substantially the same as a dimension of the shaped abrasive particle 746 (e.g., a length of a side surface), which may facilitate positioning of the shaped abrasive particle 746 at the position 777 and facilitating one or a combination of predetermined orientation characteristics of the shaped abrasive particle 746. Furthermore, according to an embodiment, the alignment structure 764 can include a plurality of contact regions having controlled two-dimensional shapes configured to facilitate and control one or more predetermined orientation characteristics of associated shaped abrasive particles. It will be appreciated, that while the foregoing alignment structure 764 includes contact regions 756 and 757 having substantially similar shapes, the alignment structure 764 can include a plurality of contact regions having a plurality of different two-dimensional shapes.

Figure 7C:
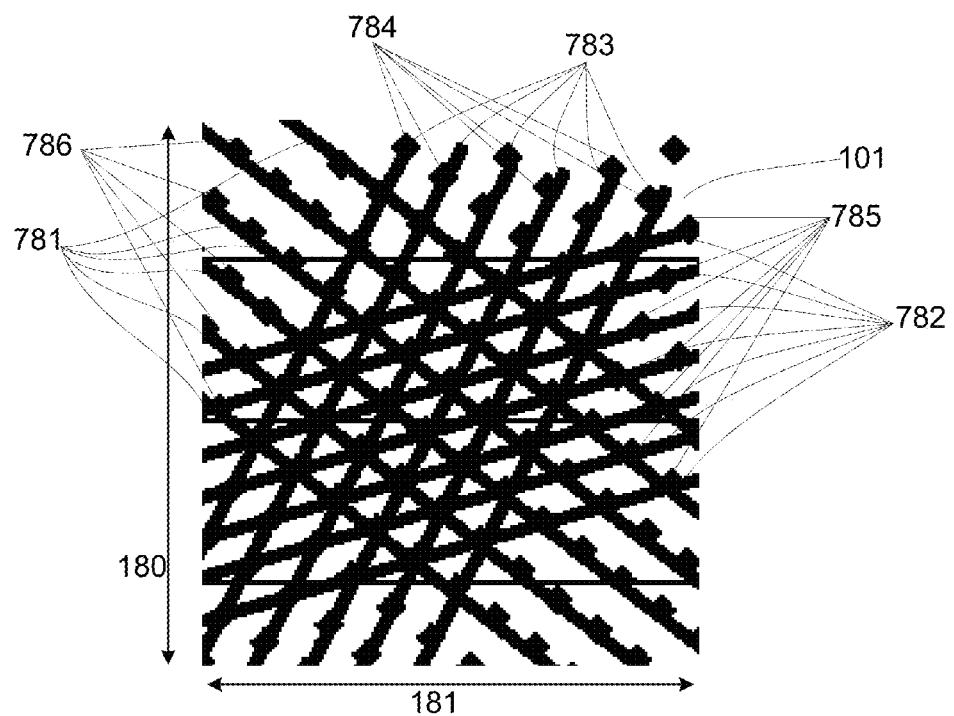
FIG. 7C includes a top view illustration of a non-shadowing arrangement to be formed on a portion of an abrasive article is provided in accordance with an embodiment.

Turning briefly to FIG. 7C a top view illustration of a non-shadowing arrangement to be formed on a portion of an abrasive article is provided in accordance with an embodiment. As illustrated, the portion of the abrasive article can include a backing 101, a first group of discrete contact regions 781 extending over the backing 101, a second group of discrete contact regions 782 extending over the backing 101, and a third group of discrete contact regions 783 extending over the backing 101. Each of the group of discrete contact regions 781, 782, and 783 can have a plurality of discrete contact regions extending linearly over a surface of the backing. Moreover, each of the discrete contact regions within a group can extend in substantially the same direction, such that each of the discrete contact regions within a group can be substantially parallel to each other. Yet, the discrete contact regions from different groups may intersect each other. For example, each of the discrete contact regions of the first group of discrete contact regions 781 can intersect at least one other discrete contact region from at least one of the second group of discrete contact regions 782 and the third group of discrete contact regions 783.

According to an embodiment, each of the discrete contact regions, and in particular, each of the discrete contact regions within the groups of discrete contact regions 781, 782, and 783 can extend for at least a portion of the width of the backing 101. In certain instances, each of the groups of discrete contact regions 781, 782, and 783 can extend for at least a majority of the width of the backing 101, which can be defined as the distance along the backing 101 in the direction of the lateral axis 181.

In another embodiment, each of the discrete contact regions, and in particular, each of the groups of discrete contact regions 781, 782, and 783 can extend for at least a portion of the length of the backing 101. In certain instances, each of the groups of discrete contact regions 781, 782, and 783 can extend for at least a majority of the length of the backing 101, which can be defined as the distance along the backing 101 in the direction of the longitudinal axis 180. Still, in another non-limiting embodiment, only one of the group of discrete contact regions, such as the group of discrete contact regions 783 can extend for a majority of the length of the backing 101, while each of the discrete contact regions of the groups of discrete contact regions 781 and 782 extend for a distance of less than the total length of the backing 101.

FIG. 7C further includes an illustration of shaped abrasive particles placed on each of the groups of discrete contact regions 781, 782, and 783. That is, the abrasive article can have a first group of shaped abrasive particles 784 associated with the first group of discrete contact regions 781, and a second group of shaped abrasive particles 785 can be associated with the second group of discrete containment regions 782, and a third group of shaped abrasive particles 792 can be associated with the third group of discrete containment regions 789.

Figure 7D:
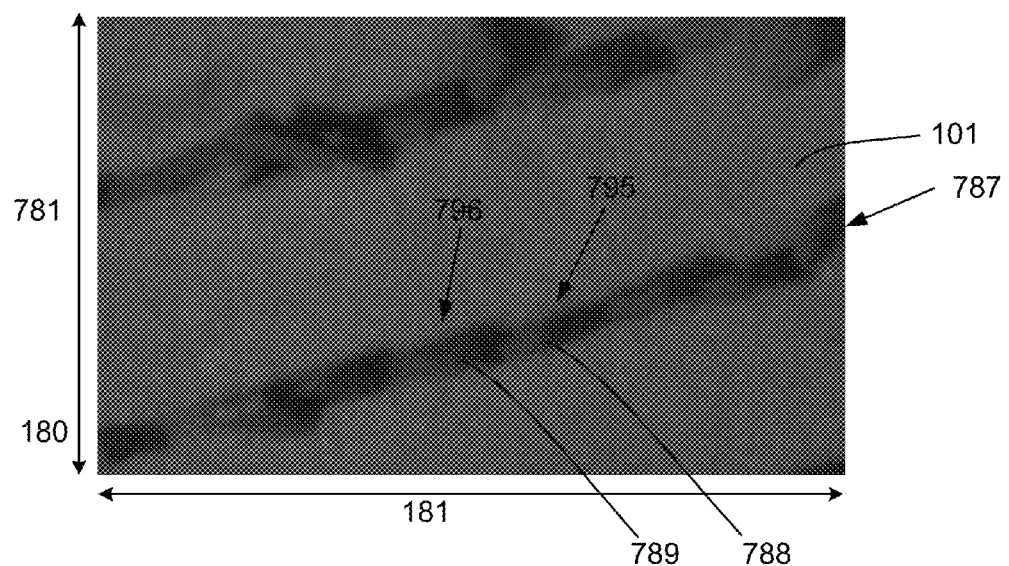
FIG. 7D includes an image of a portion of an abrasive article having a non-shadowing arrangement of shaped abrasive particles in accordance with an embodiment.

FIG. 7D includes an image of a portion of a group of shaped abrasive particles associated with a discrete contact region. Notably, the first group of shaped abrasive particles 787 can include a first shaped abrasive particle 788 coupled to the backing 101 in a first position 795 and a second shaped abrasive particle 789 coupled to the backing 101 in a second position 796. According to certain embodiments, the first shaped abrasive particle 788 and second shaped abrasive particle 789 can be arranged in a controlled, non-shadowing arrangement. In the controlled, non-shadowing arrangement, the first shaped abrasive particle 788 and second shaped abrasive particle 789 can have at least two of a predetermined rotational orientation, a predetermined lateral orientation, and a predetermined longitudinal orientation, and a combination thereof. More particularly, at least a portion of the first shaped abrasive particle 788 can be touching a portion of the second shaped abrasive particle 789. Unlike some other embodiments herein, in certain instances, the shaped abrasive particles within a group can be abutting each other. For example, in at least one embodiment, a corner of the first shaped abrasive particle 788 can be abutting a corner of the second shaped abrasive particle 789. Notably, the degree of overlap between adjacent particles can be less than the width of the particles, and more particularly, less than half of the width of the particles.

In the illustrated embodiment of FIG. 7D, at least a portion, such as a minority or majority, of each of the shaped abrasive particles of the first group of shaped abrasive particles 787 including the first shaped abrasive particle 788 and the second shaped abrasive particle 789 can be arranged in a line with respect to each other. Moreover, at least a portion of the shaped abrasive particles in the group of shaped abrasive particles 787 can be touching at least one other, immediately adjacent, shaped abrasive particle. Without wishing to be tied to a particular theory, it is thought that some contact between the abrasive particles, may be suitable to buttress the group of shaped abrasive particles and improve grain retention and grinding performance. Moreover, one or more shaped abrasive particles in a group of shaped abrasive particles may be in direct contact with immediately adjacent grains to facilitate higher grain weights and improved grinding performance in certain applications.

Methods and Systems for Forming Abrasive Articles

The foregoing has described abrasive articles of the embodiments having predetermined distributions of shaped abrasive particles. The following describes various methods used to form such abrasive articles of the embodiments herein. It will be appreciated that any of the methods and systems described herein can be used in combination to facilitate the formation of an abrasive article according to an embodiment.

According to one embodiment, a method of forming an abrasive article includes placing a shaped abrasive particle on the backing in a first position defined by one or more predetermined orientation characteristics. In particular, the method of placing the shaped abrasive particle can include a templating process. A templating process may make use of an alignment structure, which may be configured to hold (temporarily or permanently) one or more shaped abrasive particles in a predetermined orientation and deliver the one or more shaped abrasive particles onto the abrasive article in a predetermined position defined having one or more predetermined orientation characteristics.

According to one embodiment, the alignment structure can be various structures, including but not limited to, a web, a fibrous material, a mesh, a solid structure having openings, a belt, a roller, a patterned material, a discontinuous layer of material, a patterned adhesive material, and a combination thereof. In one particular embodiment, the alignment structure can include a discrete contact region configured to hold a shaped abrasive particle. In certain other instances, the alignment structure can include a plurality of discrete contact regions spaced apart from each other and configured to hold a plurality of shaped abrasive particles. For certain embodiments herein, a discrete contact region can be configured to temporarily hold a shaped abrasive particle and place the first shaped abrasive particle at a predetermined position on the abrasive article. Alternatively, in another embodiment, the discrete contact region can be configured to permanently hold a first shaped abrasive particle and place the first shaped abrasive particle at the first position. Notably, for embodiments utilizing a permanent hold between the discrete contact region and the shaped abrasive particle, the alignment structure may be integrated within the finished abrasive article.

Figure 9:
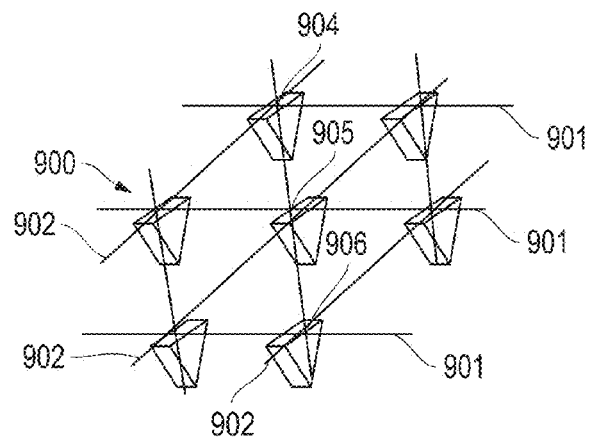
FIG. 9 includes an illustration of a portion of an alignment structure according to an embodiment.
Figure 10:
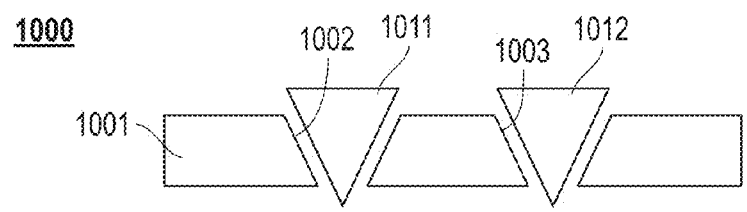
FIG. 10 includes an illustration of a portion of an alignment structure according to an embodiment.
Figure 11:
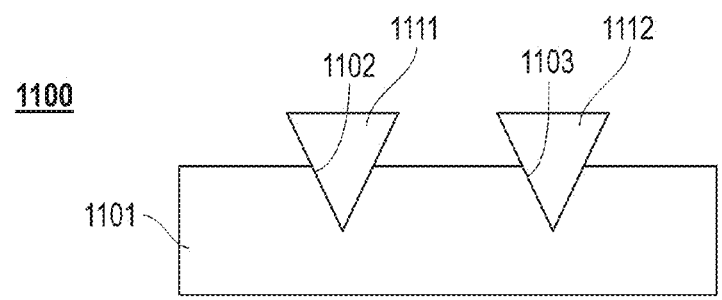
FIG. 11 includes an illustration of a portion of an alignment structure according to an embodiment.

Some exemplary alignments structures according to embodiments herein are illustrated in FIGS. 9-11. FIG. 9 includes an illustration of a portion of an alignment structure according to an embodiment. In particular, the alignment structure 900 can be in the form of web or mesh including fibers 901 and 902 overlapping each other. In particular, the alignment structure 900 can include discrete contact regions 904, 905, and 906, which may be defined by a plurality of intersections of objects of the alignment structure. In the particular illustrated embodiment, the discrete contact regions 904-906 can be defined by an intersection of the fibers 901 and 902, and more particularly, a joint between the two fibers 901 and 902, configured to hold the shaped abrasive particles 911, 912, and 913. According to certain embodiments, the alignment structure can further include discrete contact regions 904-906 that can include an adhesive material to facilitate placement and holding of the shaped abrasive particles 911-913.

As will be appreciated, the construction and arrangement of the fibers 901 and 902 can facilitate control of the discrete contact regions 904-906 and further can facilitate control of one or more predetermined orientation characteristics of the shaped abrasive particles on the abrasive article. For example, the discrete contact regions 904-906 can be configured to define at least one of a predetermined rotational orientation of a shaped abrasive particle, a predetermined rotational orientation difference between at least two shaped abrasive particles, a predetermined longitudinal orientation of a shaped abrasive particle, a longitudinal space between two shaped abrasive particles, a predetermined lateral orientation, a lateral space between two shaped abrasive particles, a predetermined vertical orientation of a shaped abrasive particle, a predetermined vertical orientation difference between two shaped abrasive particles, a predetermined tip height orientation of a shaped abrasive particle, a predetermined tip height difference between two shaped abrasive particles, and a combination thereof.

FIG. 10 includes an illustration of a portion of an alignment structure according to an embodiment. In particular, the alignment structure 1000 can be in the form of a belt 1001 having discrete contact regions 1002 and 1003 configured to engage and hold the shaped abrasive particles 1011 and 1012. According to an embodiment, the alignment structure 1000 can include discrete contact regions 1002 and 1003 in the form of openings in the alignment structure. Each of the openings can a shape configured to hold one or more shaped abrasive particles. Notably, each of the openings can have a shape configured to hold one or more shaped abrasive particles in a predetermined position to facilitate placement of the one or more shaped abrasive particles on the backing in a predetermined position with one or more predetermined orientation characteristics. In at least one embodiment, the openings defining the discrete contact regions 1002 and 1003 can have a cross-sectional shape complementary to a cross-sectional shape of the shaped abrasive particles. Moreover, in certain instances, the openings defining the discrete contact regions can extend through an entire thickness of the alignment structure (i.e., belt 1001).

In yet another embodiment, the alignment structure can include discrete contact regions defined by openings, wherein the openings extend partially through the entire thickness of the alignment structure. For example, FIG. 11 includes an illustration of a portion of an alignment structure according to an embodiment. Notably, the alignment structure 1100 can be in the form of a thicker structure wherein the openings defining the discrete contact regions 1102 and 1103 configured to hold the shaped abrasive particles 1111 and 1112 do not extend through the entire thickness of the substrate 1101.

Figure 12:
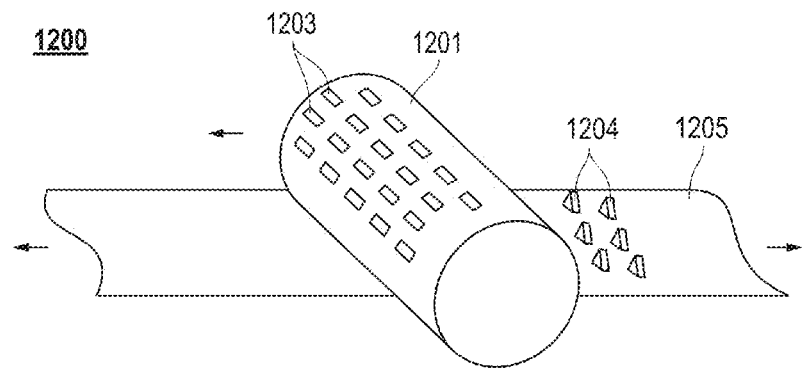
FIG. 12 includes an illustration of a portion of an alignment structure according to an embodiment.

FIG. 12 includes an illustration of a portion of an alignment structure according to an embodiment. Notably, the alignment structure 1200 can be in the form of a roller 1201 having openings 1203 in the exterior surface and defining the discrete contact regions. The discrete contact regions 1203 can have particular dimensions configured to facilitate holding of the shaped abrasive particles 1204 in the roller 1201 until a portion of the shaped abrasive particles are contacted to the abrasive article 1201. Upon contact with the abrasive article 1201, the shaped abrasive particles 1204 can be released from the roller 1201 and delivered to the abrasive article 1201 in a particular position defined by one or more predetermined orientation characteristics. Accordingly, the shape and orientation of the openings 1203 on the roller 1201, the position of the roller 1201 relative to the abrasive article 1201, the rate of translation of the roller 1201 relative to the abrasive article 1201 may be controlled to facilitate positioning of the shaped abrasive particles 1204 in a predetermined distribution.

Various processing steps may be utilized to facilitate the placement of the shaped abrasive particles on the alignment structure. Suitable processes can include, but are not limited to, vibration, adhesion, electromagnetic attraction, patterning, printing, pressure differential, roll coat, gravity drop, and a combination thereof. Moreover, particular devices may be used to facilitate orientation of the shaped abrasive particles on the alignment structure, including for example, cams, acoustics, and a combination thereof.

In yet another embodiment, the alignment structure can be in the form of a layer of adhesive material. Notably, the alignment structure can be in the form of a discontinuous layer of adhesive portions, wherein the adhesive portions define discrete contact regions configured to hold (temporarily or permanently) one or more shaped abrasive particles. According to one embodiment, the discrete contact regions can include an adhesive, and more particularly, the discrete contact regions are defined by a layer of adhesive, and still more particularly, each of the discrete contact regions are defined by a discrete adhesive region. In certain instances, the adhesive can include a resin, and more particularly, can include a material for use as a make coat as described in embodiments herein. Moreover, the discrete contact regions can define a predetermined distribution relative to each other, and can further define positions of the shaped abrasive particles on the abrasive article. Furthermore, the discrete contact regions comprising the adhesive can be arranged in a predetermined distribution, which is substantially the same as a predetermined distribution of shaped abrasive particles overlying the backing. In one particular instance, the discrete contact regions comprising the adhesive can be arranged in a predetermined distribution, can be configured to hold a shaped abrasive particle, and further can define at least one of a predetermined orientation characteristic for each shaped abrasive particle.

Figure 13:
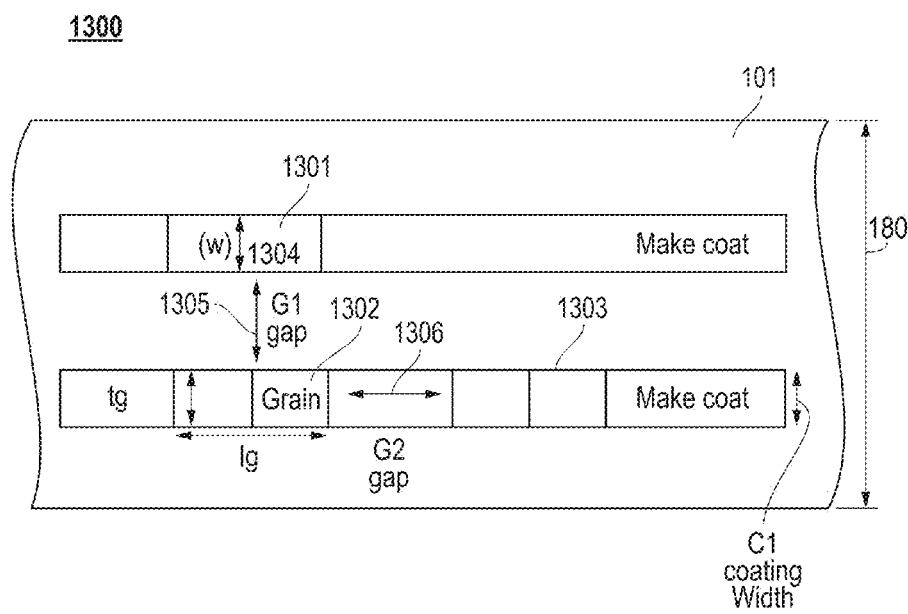
FIG. 13 includes an illustration of a portion of an alignment structure including discrete contact regions comprising an adhesive in accordance with an embodiment.
Figure 14A:
FIGS. 14A-14H include top down views of portions of tools for forming abrasive articles having various patterned alignment structures including discrete contact regions of an adhesive material according to embodiments herein.
Figure 14E:
Figure 14B:
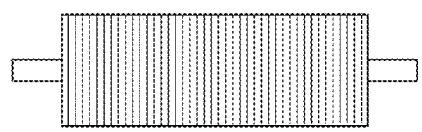
Figure 14F:
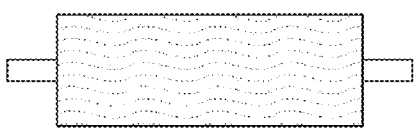
Figure 14C:
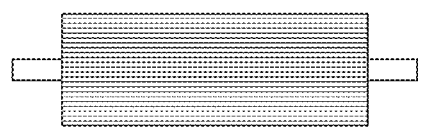
Figure 14G:
Figure 14D:
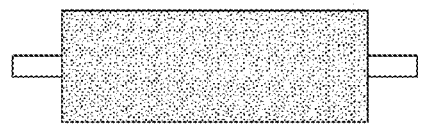
Figure 14H:
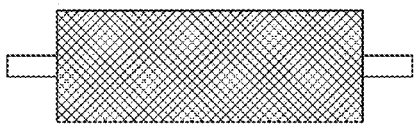

FIG. 13 includes an illustration of a portion of an alignment structure including discrete contact regions comprising an adhesive in accordance with an embodiment. As illustrated, the alignment structure 1300 can include a first discrete contact region 1301 comprising a discrete region of adhesive and configured to couple a shaped abrasive particle. The alignment structure 1300 can also include a second discrete contact region 1302 and a third discrete contact region 1303. According to one embodiment, at least the first discrete contact region 1301 can have a width (w) 1304 related to at least one dimension of the shaped abrasive particle, which may facilitate positioning of the shaped abrasive particle in a particular orientation relative to the backing. For example, certain suitable orientations relative to the backing can include a side orientation, a flat orientation, and inverted orientation. According to a particular embodiment, the first discrete contact region 1301 can have a width (w) 1304 related to a height (h) of the shaped abrasive particle to facilitate a side orientation of the shaped abrasive particle. It will be appreciated that reference herein to a height can be reference to an average height or median height of a suitable sample size of a batch of shaped abrasive particles. For example, the width 1304 of the first discrete contact region 1301 can be not greater than the height of the shaped abrasive particle. In other instances, the width 1304 of the first discrete contact region 1301 can be not greater than about 0.99(h), such as not greater than about 0.95(h), not greater than about 0.9(h), not greater than about 0.85(h), not greater than about 0.8(h), not greater than about 0.75(h), or even not greater than about 0.5(h). Still, in one non-limiting embodiment, the width 1304 of the first discrete contact region 1301 can be at least about 0.1(h), at least about 0.3(h), or even at least about 0.5(h). It will be appreciated that the width 1304 of the first discrete contact region 1301 can be within a range between any of the minimum and maximum values noted above.

In accordance with a particular embodiment, the first discrete contact region 1301 can be spaced apart from the second discrete contact region 1302 via a longitudinal gap 1305, which is a measure of the shortest distance between immediately adjacent discrete contact regions 1301 and 1302 in a direction parallel to the longitudinal axis 180 of the backing 101. In particular, control of the longitudinal gap 1305 may facilitate control of the predetermined distribution of the shaped abrasive particles on the surface of the abrasive article, which may facilitate improved performance. According to one embodiment, the longitudinal gap 1305 can be related to a dimension of one or a sampling of shaped abrasive particle. For example, the longitudinal gap 1305 can be at least equal to a width (w) of a shaped abrasive particle, wherein the width is a measure of the longest side of the particle as described herein. It will be appreciated that reference herein to a width (w) of the shaped abrasive particle can be reference to an average width or median width of a suitable sample size of a batch of shaped abrasive particles. In a particular instance, the longitudinal gap 1305 can be greater than the width, such as at least about 1.1(w), at least about 1.2 (w), at least about 1.5(w), at least about 2(w), at least about 2.5(w), at least about 3(w) or even at least about 4(w). Still, in one non-limiting embodiment, the longitudinal gap 1305 can be not greater than about 10(w), not greater than about 9(w), not greater than about 8(w), or even not greater than about 5(w). It will be appreciated that the longitudinal gap 1305 can be within a range between any of the minimum and maximum values noted above.

In accordance with a particular embodiment, the second discrete contact region 1302 can be spaced apart from the third discrete contact region 1303 via a lateral gap 1306, which is a measure of the shortest distance between immediately adjacent discrete contact regions 1302 and 1303 in a direction parallel to the lateral axis 181 of the backing 101. In particular, control of the lateral gap 1306 may facilitate control of the predetermined distribution of the shaped abrasive particles on the surface of the abrasive article, which may facilitate improved performance. According to one embodiment, the lateral gap 1306 can be related to a dimension of one or a sampling of shaped abrasive particle. For example, the lateral gap 1306 can be at least equal to a width (w) of a shaped abrasive particle, wherein the width is a measure of the longest side of the particle as described herein. It will be appreciated that reference herein to a width (w) of the shaped abrasive particle can be reference to an average width or median width of a suitable sample size of a batch of shaped abrasive particles. In a particular instance, the lateral gap 1306 can be less than the width of the shaped abrasive particle. Still, in other instances, the lateral gap 1306 can be greater than the width of the shaped abrasive particle. According to one aspect, the lateral gap 1306 can be zero. In yet another aspect, the lateral gap 1306 can be at least about 0.1(w), at least about 0.5 (w), at least about 0.8(w), at least about 1(w), at least about 2 (w), at least about 3(w) or even at least about 4(w). Still, in one non-limiting embodiment, the lateral gap 1306 may be not greater than about 100(w), not greater than about 50(w), not greater than about 20(w), or even not greater than about 10(w). It will be appreciated that the lateral gap 1306 can be within a range between any of the minimum and maximum values noted above.

The first discrete contact region 1301 can be formed on an upper major surface of a backing using various methods, including for example, printing, patterning, gravure rolling, etching, removing, coating, depositing, and a combination thereof. FIGS. 14A-14H include top down views of portions of tools for forming abrasive articles having various patterned alignment structures including discrete contact regions of an adhesive material according to embodiments herein. In particular instances, the tools can include a templating structure that can be contacted to the backing and transfer the patterned alignment structure to the backing. In one particular embodiment, the tool can be a gravure roller having a patterned alignment structure comprising discrete contact regions of adhesive material that can be rolled over a backing to transfer the patterned alignment structure to the backing. After which, shaped abrasive particles can be placed on the backing in the regions corresponding to the discrete contact regions.

In at least one particular aspect, an abrasive article of an embodiment can including forming a patterned structure comprising an adhesive on at least a portion of the backing. Notably, in one instance, the patterned structure can be in the form of a patterned make coat. The patterned make coat can be a discontinuous layer including at least one adhesive region overlying the backing, a second adhesive region overlying the backing separate from the first adhesive region, and at least one exposed region between the first and second adhesive regions. The at least one exposed region can be essentially free of adhesive material and represent a gap in the make coat. In one embodiment, the patterned make coat can be in the form of an array of adhesive regions coordinated relative to each other in a predetermined distribution. The formation of the patterned make coat with a predetermined distribution of adhesive regions on the backing can facilitate placement of the shaped abrasive grains in a predetermined distribution, and particularly, the predetermined distribution of the adhesive regions of the patterned make coat can correspond to the positions of the shaped abrasive particles, wherein each of the shaped abrasive particles can be adhered to the backing at the adhesive regions, and thus correspond to the predetermined distribution of shaped abrasive particles on the backing. Moreover, in at least one embodiment, essentially no shaped abrasive particles of the plurality of shaped abrasive particles are overlying the exposed regions. Furthermore, it will be appreciated that a single adhesive region can be shaped and sized to accommodate a single shaped abrasive particle. However, in an alternative embodiment, an adhesive region can be shaped and sized to accommodate a plurality of shaped abrasive particles.

Various processes may be utilized in the formation of a patterned structure, including for example, a patterned make coat. In one embodiment, the process can include selectively depositing the make coat. In yet another embodiment, the process can include selectively removing at least a portion of the make coat. Some exemplary processes can include coating, spraying, rolling, printing, masking, irradiating, etching, and a combination thereof. According to a particular embodiment, forming the patterned make coat can include providing a patterned make coat on a first structure and transferring the patterned make coat to at least a portion of the backing. For example, a gravure roller may be provided with a patterned make coat layer, and the roller can be translated over at least a portion of the backing and transferring the patterned make coat from the roller surface to the surface of the backing.

The foregoing has described particular abrasive articles and structures (e.g., alignment structures) suitable for use in forming the abrasive articles. The following embodiments describe particular methods, which may be used in conjunction with the embodiments herein or separately, that facilitate the formation of abrasive articles according to embodiments.

In accordance with one embodiment, the process of delivering the shaped abrasive particles to the abrasive article can include expelling the first shaped abrasive particle from an opening within the alignment structure. Some suitable exemplary methods for expelling can include applying a force on the shaped abrasive particle and removing it from the alignment structure. For example, in certain instances, the shaped abrasive particle can be contained in the alignment structure and expelled from the alignment structure using gravity, electrostatic attraction, surface tension, pressure differential, mechanical force, magnetic force, agitation, vibration, and a combination thereof. In at least one embodiment, the shaped abrasive particles can be contained in the alignment structure until a surface of the shaped abrasive particles are contacted to a surface of the backing, which may include an adhesive material, and the shaped abrasive particles are removed from the alignment structure and delivered to a predetermined position on the backing.

Figure 15:
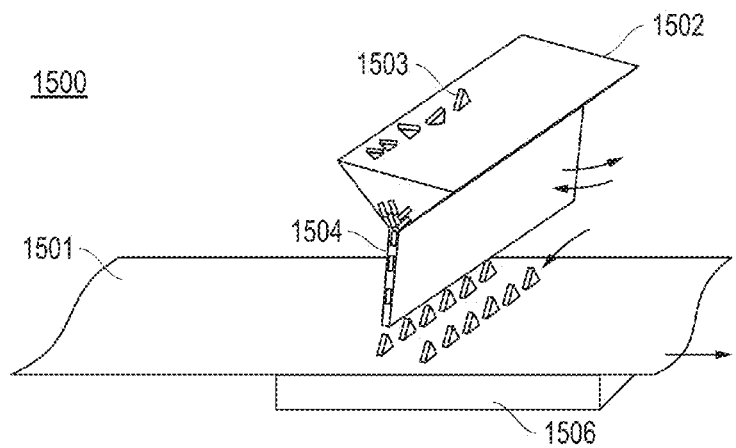
FIG. 15 includes an illustration of a system for forming an abrasive article according to an embodiment.

According to another aspect, the shaped abrasive particles can be delivered to the surface of the abrasive article in a controlled manner by sliding the shaped abrasive particles along a pathway. For example, in one embodiment, the shaped abrasive particles can be delivered to a predetermined position on the backing by sliding the abrasive particles down a pathway and through an opening via gravity. FIG. 15 includes an illustration of a system according to an embodiment. Notably, the system 1500 can include a hopper 1502 configured to contain a content of shaped abrasive particles 1503 and deliver the shaped abrasive particles 1503 to a surface of a backing 1501 that can be translated under the hopper 1502. As illustrated, the shaped abrasive particles 1503 can be delivered down a pathway 1504 attached to the hopper 1502 and delivered to a surface of the backing 1501 in a controlled manner to form a coated abrasive article including shaped abrasive particles arranged in a predetermined distribution relative to each other. In particular instances, the pathway 1504 can be sized and shaped to deliver a particular number of shaped abrasive particles at a particular rate to facilitate the formation of the predetermined distribution of shaped abrasive particles. Furthermore, the hopper 1502 and the pathway 1504 may be movable relative to the backing 1501 to facilitate the formation of select predetermined distributions of shaped abrasive particles.

Moreover, the backing 1501 may further be translated over a vibrating table 1506 that can agitate or vibrate the backing 1501 and the shaped abrasive particles contained on the backing 1501 to facilitate improved orientation of the shaped abrasive particles.

Figure 16:
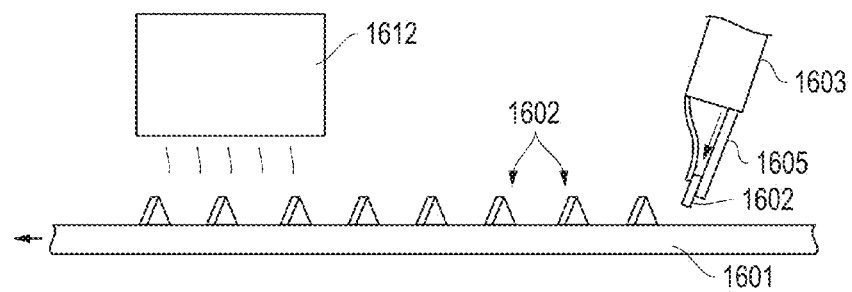
FIG. 16 includes an illustration of a system for forming an abrasive article according to an embodiment.

In yet another embodiment, the shaped abrasive particles can be delivered to a predetermined position by expelling individual shaped abrasive particles on to the backing via a throwing process. In the throwing process, shaped abrasive particles may be accelerate and expelled from a container at a rate sufficient to hold the abrasive particles at a predetermined position on the backing. For example, FIG. 16 includes an illustration of a system using a throwing process, wherein shaped abrasive particles 1602 are expelled from a throwing unit 1603 that can accelerate the shaped abrasive particles via a force (e.g., pressure differential) and deliver the shaped abrasive particles 1602 from the throwing unit 1603 down a pathway 1605, which may be attached to the throwing unit 1603 and onto a backing 1601 in a predetermined position. The backing 1601 may be translated under the throwing unit 1603, such that after initial placement, the shaped abrasive particles 1602 can undergo a curing process that may cure an adhesive material on the surface of the backing 1601 and hold the shaped abrasive particles 1602 in their predetermined positions.

Figure 17A:
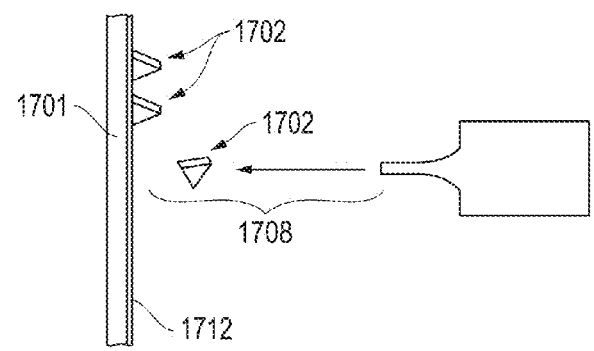
FIGS. 17A-17C include illustrations of systems for forming an abrasive article according to an embodiment.

FIG. 17A includes an illustration of an alternative throwing process in accordance with an embodiment. Notably, the throwing process can include expelling a shaped abrasive particle 1702 from a throwing unit 1703 over a gap 1708 to facilitate placement of the shaped abrasive particle 1702 on the backing in a predetermined position. It will be appreciated that the force of expelling, the orientation of the shaped abrasive particle 1702 upon being expelled, the orientation of the throwing unit 1703 relative the backing 1701, and the gap 1708 may be controlled and adjusted to adjust the predetermined position of the shaped abrasive particle 1702 and the predetermined distribution of shaped abrasive particles 1702 on the backing 1701 relative to each other. It will be appreciated that the abrasive article 1701 may include an adhesive material 1712 on a portion of the surface to facilitate adherence between the shaped abrasive particles 1702 and the abrasive article 1701.

In particular instances, the shaped abrasive particles 1702 can be formed to have a coating. The coating can be overlying at least portion of the exterior surface of the shaped abrasive particles 1702. In one particular embodiment, the coating can include an organic material, and more particularly, a polymer, and still more particularly an adhesive material. The coating comprising an adhesive material may facilitate attachment of the shaped abrasive particles 1702 to the backing 1701.

Figure 17B:
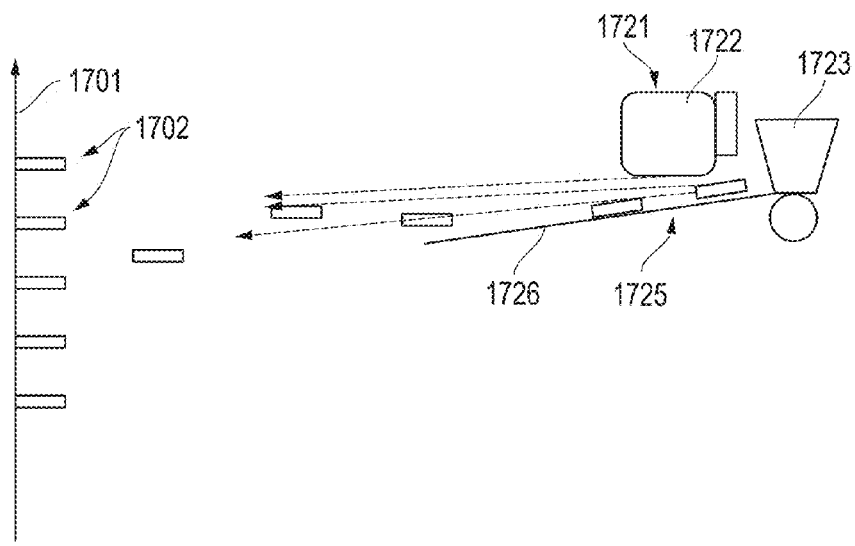

FIG. 17B includes an illustration of an alternative throwing process in accordance with an embodiment. In particular, the embodiment of FIG. 17B details a particular throwing unit 1721 configured to direct the shaped abrasive particles 1702 at the abrasive article 1701. According to an embodiment, the throwing unit 1721 can include a hopper 1723 configured to contain a plurality of shaped abrasive particles 1702. Furthermore, the hopper 1723 can be configured to deliver one or more shaped abrasive particles 1702 in a controlled manner to an acceleration zone 1725, wherein the shaped abrasive particles 1702 are accelerated and directed toward the abrasive article 1701. In one particular embodiment, the throwing unit 1721 can include a system 1722 utilizing a pressurized fluid, such as a controlled gas stream or air knife unit, to facilitate the acceleration of the shaped abrasive particles 1702 in the acceleration zone 1725. As further illustrated, the throwing unit 1721 may utilize a slide 1726 configured to generally direct the shaped abrasive particles 1702 toward the abrasive article 1701. In one embodiment, the throwing unit 1731 and/or the slide 1726 can be moveable between a plurality of positions and configured to facilitate delivery of individual shaped abrasive particles to particular positions on the abrasive article, thus facilitating the formation of the predetermined distribution of shaped abrasive particles.

Figure 17C:
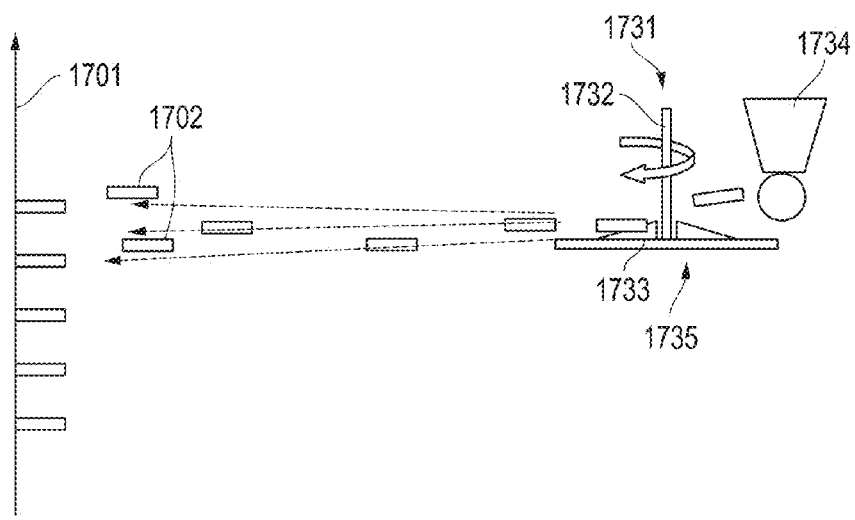

FIG. 17A includes an illustration of an alternative throwing process in accordance with an embodiment. In the illustrated embodiment of FIG. 17C details an alternative throwing unit 1731 configured to direct the shaped abrasive particles 1702 at the abrasive article 1701. According to an embodiment, the throwing unit 1731 can include a hopper 1734 configured to contain a plurality of shaped abrasive particles 1702 and deliver one or more shaped abrasive particles 1702 in a controlled manner to an acceleration zone 1735, wherein the shaped abrasive particles 1702 are accelerated and directed toward the abrasive article 1701. In one particular embodiment, the throwing unit 1731 can include a spindle 1732 that may be rotated around an axis and configured to rotate a stage 1733 at a particular rate of revolutions. The shaped abrasive particles 1702 can be delivered from the hopper 1734 to the stage 1733 and accelerated at a particular from the stage 1733 toward the abrasive article 1701. As will be appreciated, the rate of rotation of the spindle 1732 may be controlled to control the predetermined distribution of shaped abrasive particles 1702 on the abrasive article 1701. Furthermore, the throwing unit 1731 can be moveable between a plurality of positions and configured to facilitate delivery of individual shaped abrasive particles to particular positions on the abrasive article, thus facilitating the formation of the predetermined distribution of shaped abrasive particles.

Figure 18:
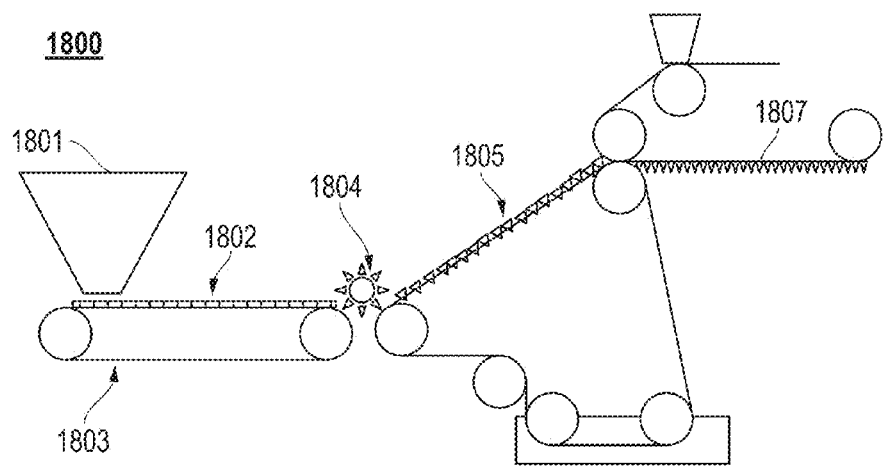
FIG. 18 includes an illustration of a system for forming an abrasive article according to an embodiment.

According to another embodiment, the process of delivering the shaped abrasive particles in a predetermined position on the abrasive article and forming an abrasive article having a plurality of shaped abrasive particles in a predetermined distribution relative to each other can include the application of magnetic force. FIG. 18 includes an illustration of a system according to an embodiment. The system 1800 can include a hopper 1801 configured to contain a plurality of shaped abrasive particles 1802 and deliver the shaped abrasive particles 1802 to a first translating belt 1803.

As illustrated, the shaped abrasive particles 1802 can be translated along the belt 1803 to an alignment structure 1805 configured to contain each of the shaped abrasive particles at a discrete contact region. According to one embodiment, the shaped abrasive particles 1802 can be transferred from the belt 1803 to the alignment structure 1805 via a transfer roller 1804. In particular instances, the transfer roller 1804 may utilize a magnet to facilitate controlled removal of the shaped abrasive particles 1802 from the belt 1803 to the alignment structure 1805. The provision of a coating comprising a magnetic material may facilitate the use of the transfer roller 1804 with magnetic capabilities.

The shaped abrasive particles 1802 and can be delivered from the alignment structure 1805 to a predetermined position on the backing 1807. As illustrated, the backing 1807 may be translated on a separate belt and from the alignment structure 1805 and contact the alignment structure to facilitate the transfer of the shaped abrasive particles 1802 from the alignment structure 1805 to the backing 1807.

Figure 19:
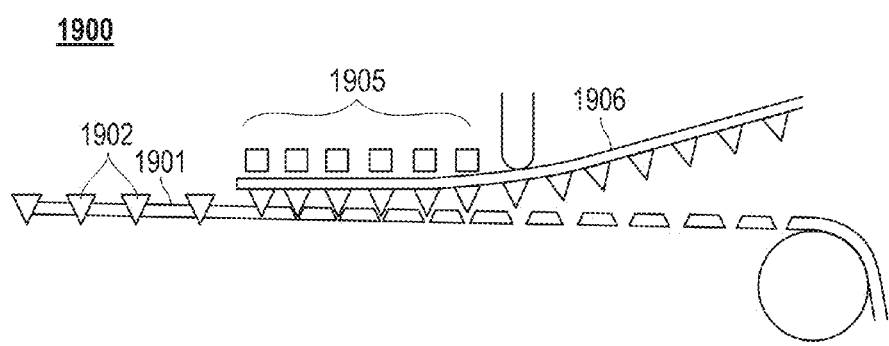
FIG. 19 includes an illustration of a system for forming an abrasive article according to an embodiment.

In still another embodiment, the process of delivering the shaped abrasive particles in a predetermined position on the abrasive article and forming an abrasive article having a plurality of shaped abrasive particles in a predetermined distribution relative to each other can include the use of an array of magnets. FIG. 19 includes an illustration of a system for forming an abrasive article according to an embodiment. In particular, the system 1900 can include shaped abrasive particles 1902 contained within an alignment structure 1901. As illustrated, the system 1900 can include an array of magnets 1905, which can include a plurality of magnets arranged in a predetermined distribution relative to the backing 1906. According to an embodiment, the array of magnets 1905 can be arranged in a predetermined distribution that can be substantially the same as the predetermined distribution of shaped abrasive particles on the backing.

Moreover, each of the magnets of the array of magnets 1905 can be moveable between a first position and a second position, which can facilitate control of the shape of the array of magnets 1905 and further facilitate control of the predetermined distribution of the magnets and the predetermined distribution of shaped abrasive particles 1902 on the backing. According to one embodiment, the array of magnets 1905 can be changed to facilitate control of one or more predetermined orientation characteristics of the shaped abrasive particles 1902 on the abrasive article.

Furthermore, each of the magnets of the array of magnets 1905 may be operable between a first state and a second state, wherein a first state can be associated with a first magnetic strength (e.g., an on state) and the second state can be associated with a second magnetic strength (e.g., an off state). Control of the state of each of the magnets can facilitate selective delivery of shaped abrasive particles to particular regions of the backing 1906 and further facilitate control of the predetermined distribution. According to one embodiment, the state of the magnets of the array of magnets 1905 can be changed to facilitate control of one or more predetermined orientation characteristics of the shaped abrasive particles 1902 on the abrasive article.

Figure 20A:
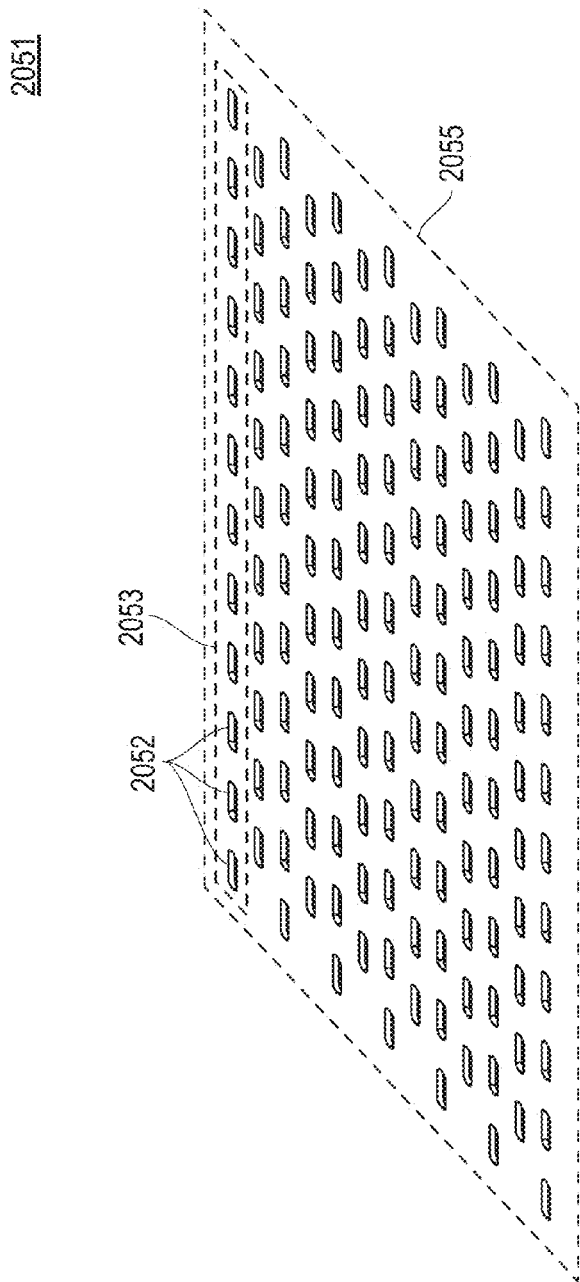
FIG. 20A includes an image of a tool used to form an abrasive article according to an embodiment.

FIG. 20A includes an image of a tool used to form an abrasive article in accordance with an embodiment. Notably, the tool 2051 can include a substrate, which may be an alignment structure having openings 2052 defining discrete contact regions configured to contain shaped abrasive particles and assist in the transfer and placement of shaped abrasive particles on a finally-formed abrasive article. As illustrated, the openings 2052 can be arranged in a predetermined distribution relative to each other on alignment structure. In particular, the openings 2052 can be arranged in one or more groups 2053 having a predetermined distribution relative to each other, which can facilitate the placement of the shaped abrasive particles on the abrasive article in a predetermined distribution defined by one or more predetermined orientation characteristics. In particular, the tool 2051 can include a group 2053 defined by a row of openings 2052. Alternatively, the tool 2051 may have a group 2055 defined by all of the openings 2052 illustrated, since each of the openings have substantially the same predetermined rotational orientation relative to the substrate.

Figure 20B:
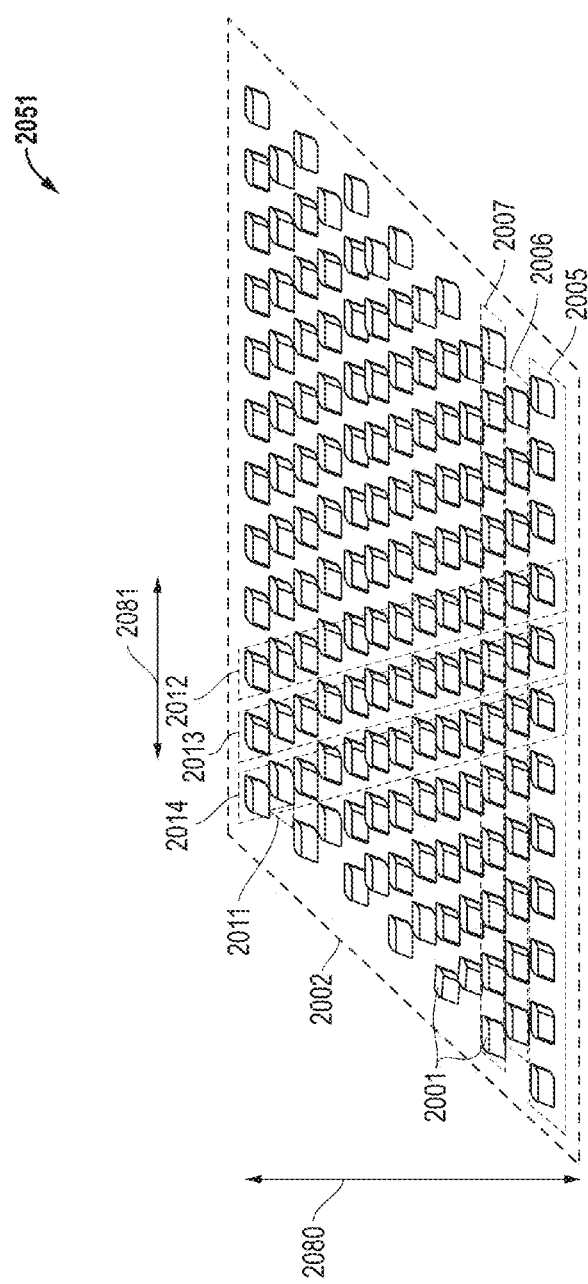
FIG. 20B includes an image of a tool used to form an abrasive article according to an embodiment.

FIG. 20B includes an image of a tool used to form an abrasive article according to an embodiment. Notably, as illustrated in FIG. 20B, shaped abrasive particles 2001 are contained in the tool 2051 of FIG. 20A, and more particularly, the tool 2051 can be an alignment structure, wherein each of the openings 2052 contains a single shaped abrasive particle 2001. In particular, the shaped abrasive particles 2001 can have a triangular two-dimensional shaped, as viewed top-down. Moreover, the shaped abrasive particles 2001 can be placed into the openings 2052 such that a tip of the shaped abrasive particle extends into and through the openings 2052 to the opposite side of the tool 2051. The openings 2052 can be sized and shaped such that they substantially complement at least a portion (if not the entire) contour of the shaped abrasive particles 2001 and hold them in a position defined by one or more predetermined orientation characteristics in the tool 2051, which will facilitate transfer of the shaped abrasive particles 2001 from the tool 2051 to a backing while maintaining the predetermined orientation characteristics. As illustrated, the shaped abrasive particles 2001 can be contained within the openings 2052 such that at least a portion of the surfaces of the shaped abrasive particles 2001 extends above the surface of the tool 2051, which may facilitate transfer of the shaped abrasive particles 2001 from the openings 2052 to a backing.

As illustrated, the shaped abrasive particles 2001 can define a group 2002. The group 2002 can have a predetermined distribution of shaped abrasive particles 2001, wherein each of the shaped abrasive particles has substantially the same predetermined rotational orientation. Moreover, each of the shaped abrasive particles 2001 has substantially the same predetermined vertical orientation and predetermined tip height orientation. Furthermore, the group 2002 includes multiple rows (e.g., 2005, 2006, and 2007) oriented in a plane parallel to a lateral axis 2081 of the tool 2051. Moreover, within the group 2002, smaller groups (e.g., 2012, 2013, and 2014) of the shaped abrasive particles 2001 may exist, wherein the shaped abrasive particles 2001 share a same difference in a combination of a predetermined lateral orientation and predetermined longitudinal orientation relative to each other. Notably, the shaped abrasive particle 2001 of the groups 2012, 2013, and 2014 can be oriented in raked columns, wherein the group extends at an angle to the longitudinal axis 2080 of the tool 2051, however, the shaped abrasive particles 2001 can have substantially a same difference in the predetermined longitudinal orientation and predetermined lateral orientation relative to each other. As also illustrated, the predetermined distribution of shaped abrasive particles 2001 can defines a pattern, which may be considered a triangular pattern 2011. Moreover, the group 2002 can be arranged such that the boundary of the group defines a two-dimensional microunit of a quadrilateral (see dotted line).

FIG. 20C includes an image of a portion of an abrasive article according to an embodiment. In particular, the abrasive article 2060 includes a backing 2061 and a plurality of shaped abrasive particles 2001, which were transferred from the openings 2052 of the tool 2051 to the backing 2061. As illustrated, the predetermined distribution of the openings 2052 of the tool can correspond to the predetermined distribution of shaped abrasive particles 2001 of the group 2062 contained on the backing 2061. The predetermined distribution of shaped abrasive particles 2001 can be defined by one or more predetermined orientation characteristics. Moreover, as evidence from FIG. 20C, the shaped abrasive particles 2001 can be arranged in groups that substantially correspond to the groups of the shaped abrasive particles of FIG. 20B, when the shaped abrasive particles 2001 were contained in the tool 2051.

For certain abrasive articles herein, at least about 75% of the plurality of shaped abrasive particles on the abrasive article can have a predetermined orientation relative to the backing, including for example a side orientation as described in embodiments herein. Still, the percentage may be greater, such as at least about 77%, at least about 80%, at least about 81%, or even at least about 82%. And for one non-limiting embodiment, an abrasive article may be formed using the shaped abrasive particles herein, wherein not greater than about 99% of the total content of shaped abrasive particles have a predetermined side orientation. It will be appreciated that reference herein to percentages of shaped abrasive particles in a predetermined orientation is based upon a statistically relevant number of shaped abrasive particles and a random sampling of the total content of shaped abrasive particles.

To determine the percentage of particles in a predetermined orientation, a 2D microfocus x-ray image of the abrasive article is obtained using a CT scan machine run in the conditions of Table 1 below. The X-ray 2D imaging was conducted using Quality Assurance software. A specimen mounting fixture utilizes a plastic frame with a 4"×4" window and an Ø0.5" solid metallic rod, the top part of which is half flattened with two screws to fix the frame. Prior to imaging, a specimen was clipped over one side of the frame where the screw heads were faced with the incidence direction of the X-rays. Then five regions within the 4"×4" window area are selected for imaging at 120 kV/80 µA. Each 2D projection was recorded with the X-ray off-set/gain corrections and at a magnification

TABLE 1

| Voltage (kV) | Current (µA) | Magnification | Field of view per image (mm × mm) | Exposure time |
|---|---|---|---|---|
| 120 | 80 | 15X | 16.2 × 13.0 | 500 ms/2.0 fps |

Figure 32:
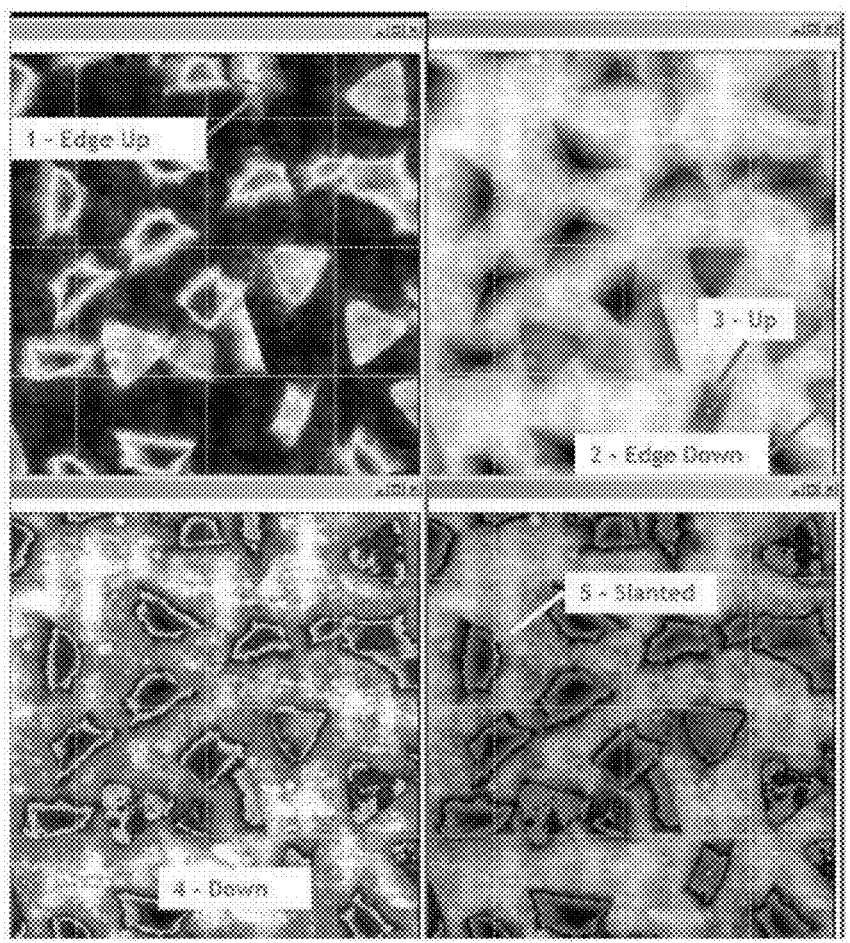
FIG. 32 includes images representative of portions of a coated abrasive according to an embodiment.

The image is then imported and analyzed using the ImageJ program, wherein different orientations are assigned values according to Table 2 below. FIG. 32 includes images representative of portions of a coated abrasive according to an embodiment and used to analyze the orientation of shaped abrasive particles on the backing.

TABLE 2

| Cell marker type | Comments |
|---|---|
| 1 | Grains on the perimeter of the image, partially exposed - standing in a side orientation (e.g., particles standing on their side surface) |
| 2 | Grains on the perimeter of the image, partially exposed - down orientation (i.e., particles in a flat orientation or inverted orientation) |
| 3 | Grains on the image, completely exposed - standing in a side orientation |
| 4 | Grains on the image, completely exposed - down |
| 5 | Grains on the image, completely exposed - standing slanted (between standing vertical and down at a 45 degree angle) |

Three calculations are then performed as provided below in Table 3. After conducting the calculations the percentage of shaped abrasive particles in a side orientation per square centimeter can be derived. Notably, a particle having a side orientation is a particle having a vertical orientation, as defined by the angle between a major surface of the shaped abrasive particle and the surface of the backing, wherein the angle is 45 degrees or greater. Accordingly, a shaped abrasive particle having an angle of 45 degrees or greater is considered standing or having a side orientation, a shaped abrasive particle having an angle of 45 degrees is considered standing slanted, and a shaped abrasive particle having an angle of less than 45 degrees is considered having a down orientation.

TABLE 3

| 5) Parameter | Protocol* |
|---|---|
| % grains up | ((0.5 × 1) + 3 + 5)/ (1 + 2 + 3 + 4 + 5) |
| Total # of grains per cm$^2$ | (1 + 2 + 3 + 4 + 5) |
| # of grains up per cm$^2$ | (% grains up × Total # of grains per cm$^2$ |

*These are all normalized with respect to the representative area of the image.
+ - A scale factor of 0.5 was applied to account for the fact that they are not completely present in the image.

Furthermore, the abrasive articles made with the shaped abrasive particles can utilize various contents of the shaped abrasive particles. For example, the abrasive articles can be coated abrasive articles including a single layer of the shaped abrasive particles in an open-coat configuration or a closed coat configuration. However, it has been discovered, quite unexpectedly, that the shaped abrasive particles demonstrate superior results in an open coat configuration. For example, the plurality of shaped abrasive particles can define an open coat abrasive product having a coating density of shaped abrasive particles of not greater than about 70 particles/cm$^2$. In other instances, the density of shaped abrasive particle per square centimeter of the abrasive article may be not greater than about 65 particles/cm$^2$, such as not greater than about 60 particles/cm$^2$, not greater than about 55 particles/cm$^2$, or even not greater than about 50 particles/cm$^2$. Still, in one non-limiting embodiment, the density of the open coat coated abrasive using the shaped abrasive particle herein can be at least about 5 particles/cm$^2$, or even at least about 10 particles/cm$^2$. It will be appreciated that the density of shaped abrasive particles per square centimeter of abrasive article can be within a range between any of the above minimum and maximum values.

In certain instances, the abrasive article can have an open coat density of a coating not greater than about 50% of abrasive particle covering the exterior abrasive surface of the article. In other embodiments, the percentage coating of the abrasive particles relative to the total area of the abrasive surface can be not greater than about 40%, not greater than about 30%, not greater than about 25%, or even not greater than about 20%. Still, in one non-limiting embodiment, the percentage coating of the abrasive particles relative to the total area of the abrasive surface can be at least about 5%, such as at least about 10%, at least about 15%, at least about 20%, at least about 25%, at least about 30%, at least about 35%, or even at least about 40%. It will be appreciated that the percent coverage of shaped abrasive particles for the total area of abrasive surface can be within a range between any of the above minimum and maximum values.

Some abrasive articles may have a particular content of abrasive particles for a length (e.g., ream) of the backing. For example, in one embodiment, the abrasive article may utilize a normalized weight of shaped abrasive particles of at least about 10 lbs/ream (148 grams/m$^2$), at least about 15 lbs/ream, at least about 20 lbs/ream, such as at least about 25 lbs/ream, or even at least about 30 lbs/ream. Still, in one non-limiting embodiment, the abrasive articles can include a normalized weight of shaped abrasive particles of not greater than about 60 lbs/ream (890 grams/m$^2$), such as not greater than about 50 lbs/ream, or even not greater than about 45 lbs/ream. It will be appreciated that the abrasive articles of the embodiments herein can utilize a normalized weight of shaped abrasive particle within a range between any of the above minimum and maximum values.

In certain instances, the abrasive articles can be used on particular workpieces. A suitable exemplary workpiece can include an inorganic material, an organic material, a natural material, and a combination thereof. According to a particular embodiment, the workpiece can include a metal or metal alloy, such as an iron-based material, a nickel-based material, and the like. In one embodiment, the workpiece can be steel, and more particularly, can consist essentially of stainless steel (e.g., 304 stainless steel).

Example 1

A grinding test is conducted to evaluate the effect of orientation of a shaped abrasive grain relative to a grinding direction. In the test, a first set of shaped abrasive particles (Sample A) are oriented in frontal orientation relative to the grinding direction. Turning briefly to FIG. 3B, the shaped abrasive particle 102 has a frontal orientation grinding direction 385, such that the major surface 363 defines a plane substantially perpendicular to the grinding direction, and more particularly, the bisecting axis 231 of the shaped abrasive particle 102 is substantially perpendicular to the grinding direction 385. Sample A was mounted on a holder in a frontal orientation relative to a workpiece of austenitic stainless steel. The wheel speed and work speed were maintained at 22 m/s and 16 mm/s respectively. The depth of cut can be selected between 0 and 30 micron. Each test consisted of 15 passes across the 8 inch long workpiece. For each test, 10 repeat samples were run and the results were analyzed and averaged. The change in the cross-sectional area of the groove from beginning to the end of the scratch length was measured to determine the grit wear.

A second set of samples (Sample B) are also tested according to the grinding test described above for Sample A. Notably, however, the shaped abrasive particles of Sample B have a sideways orientation on the backing relative to the grinding direction. Turning briefly to FIG. 3B, the shaped abrasive particle 103 is illustrated as having a sideways orientation relative to the grinding direction 385. As illustrated, the shaped abrasive particle 103 can include major surfaces 391 and 392, which can be joined by side surfaces 371 and 372, and the shaped abrasive particle 103 can have a bisecting axis 373 forming a particular angle relative to the vector of the grinding direction 385. As illustrated, the bisecting axis 373 of the shaped abrasive particle 103 can have a substantially parallel orientation with the grinding direction 385, such that the angle between the bisecting axis 373 and the grinding direction 385 is essentially 0 degrees. Accordingly, the sideways orientation of the shaped abrasive particle 103 may facilitate initial contact of the side surface 372 with a workpiece before any of the other surfaces of the shaped abrasive particle 103.

Figure 21:
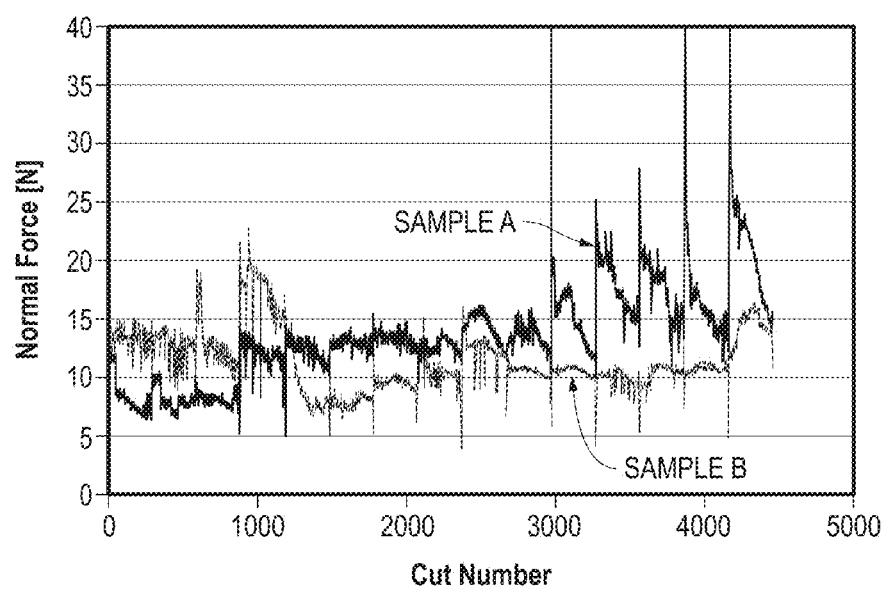
FIG. 21 includes a plot of normal force (N) versus cut number for Sample A and Sample B according to the grinding test of Example 1.

FIG. 21 includes a plot of normal force (N) versus cut number for Sample A and Sample B according to the grinding test of Example 1. FIG. 21 illustrates the normal force necessary to conduct grinding of the workpiece with the shaped abrasive particles of the representative samples A and B for multiple passes or cuts. As illustrated, the normal force of Sample A is initially lower than the normal force of Sample B. However, as the testing continues, the normal force of Sample A exceeds the normal force of Sample B. Accordingly, in some instances an abrasive article may utilize a combination of different orientations (e.g., frontal orientation and sideways orientation) of the shaped abrasive particles relative to an intended grinding direction to facilitate improved grinding performance. In particular, as illustrated in FIG. 21, a combination of orientations of shaped abrasive particles relative to a grinding direction may facilitate lower normal forces throughout the life of the abrasive article, improved grinding efficiency, and greater useable life of the abrasive article. Thus, Example 1 demonstrates, among other things, that utilization of different groups of shaped abrasive particles having different predetermined orientation characteristics relative to each other and the grinding direction can facilitate improved performance over patterns having conventional patterned grains.

Example 2

Figure 22:
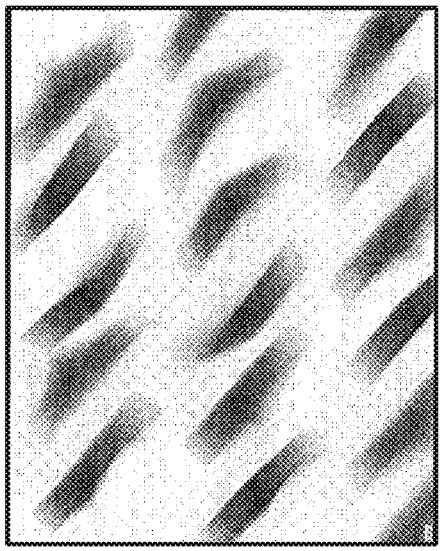
FIG. 22 includes an image of a portion of an exemplary sample according to an embodiment.
Figure 23:
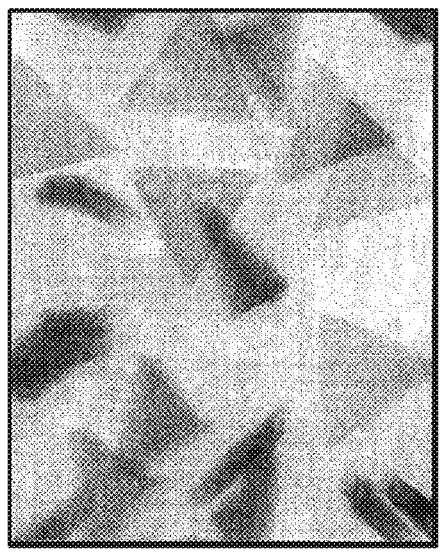
FIG. 23 includes an image of a portion of a conventional sample.

Five samples are analyzed to compare the orientation of shaped abrasive particles. Three samples (Samples S1, S2 and S3) are made according to an embodiment. FIG. 22 includes an image of a portion of Sample S1 using a 2D microfocus X-ray via a CT scan machine according to the conditions described herein. Two other samples (Samples CS1 and CS2) are representative of conventional abrasive products including shaped abrasive particles. Samples CS1 and CS2 are commercially available from 3M as Cubitron II. Sample CS2 is commercially available from 3M as Cubitron II. FIG. 23 includes an image of a portion of Sample CS2 using 2D microfocus X-ray via a CT scan machine according to the conditions described herein. Each of the samples is evaluated according to the conditions described herein for evaluating the orientation of shaped abrasive particles via X-ray analysis.

Figure 24:
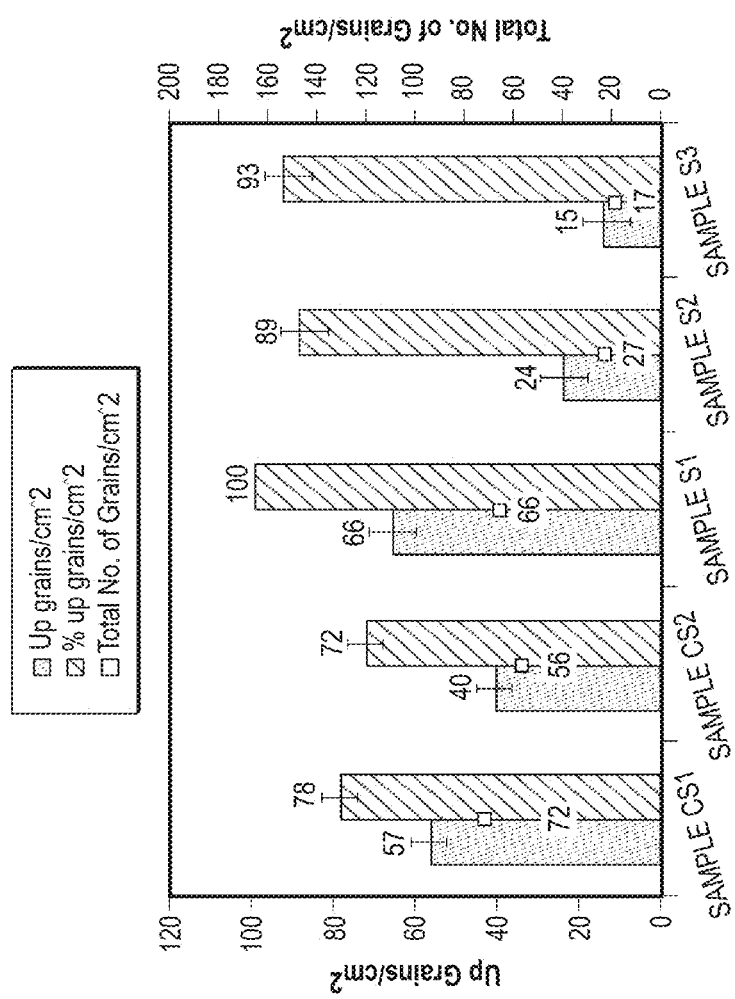
FIG. 24 includes a plot of up grains/cm$^2$ and total number of grains/cm$^2$ for two conventional samples and three sample representative of embodiments.

FIG. 24 includes a plot of up grains/cm$^2$ and total number of grains/cm$^2$ for each of the samples (Sample 1 and Sample C1). As illustrated, Samples CS1 and CS2 demonstrate a significantly fewer number of shaped abrasive particles oriented in a side orientation (i.e., upright orientation) as compared to Samples S1, S2, and S3. In particular, Sample S1 demonstrated all shaped abrasive particles (i.e., 100%) measured were oriented in a side orientation, while only 72 percent of the total number of shaped abrasive particles of CS2 had a side orientation. As evidenced, state-of-the-art conventional abrasive articles (C1) using shaped abrasive particles have not achieved the precision of orientation of the presently described abrasive articles.

Example 3

Figure 28:
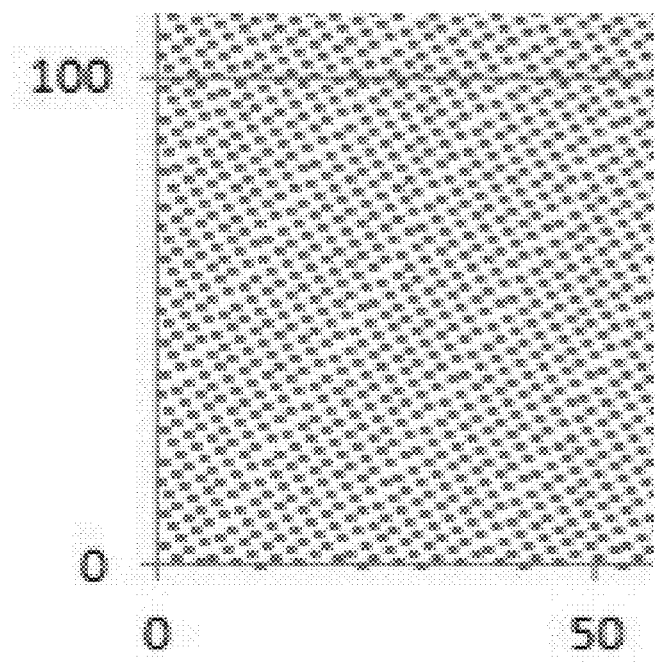
FIG. 28 includes an illustration of a plot of locations of shaped abrasive particles on a backing to form non-shadowing arrangements according to an embodiment.

Two samples were made and tested to analyze the effect of various distributions on grinding efficiency. A first sample (Sample S4) was made according to an embodiment having a non-shadowing distribution as demonstrated by the pattern illustrated in FIG. 28. The arrangement of the shaped abrasive particles had a non-shadowing arrangement relative to a grinding direction extending substantially parallel to the Y-axis of the plot and substantially parallel to a longitudinal axis of the backing. Sample S4 used shaped abrasive particles having a triangular two-dimensional shape, approximately 20 lbs/ream of shaped abrasive particles, and at least 70% of the shaped abrasive particles were oriented in a side orientation.

Figure 29:
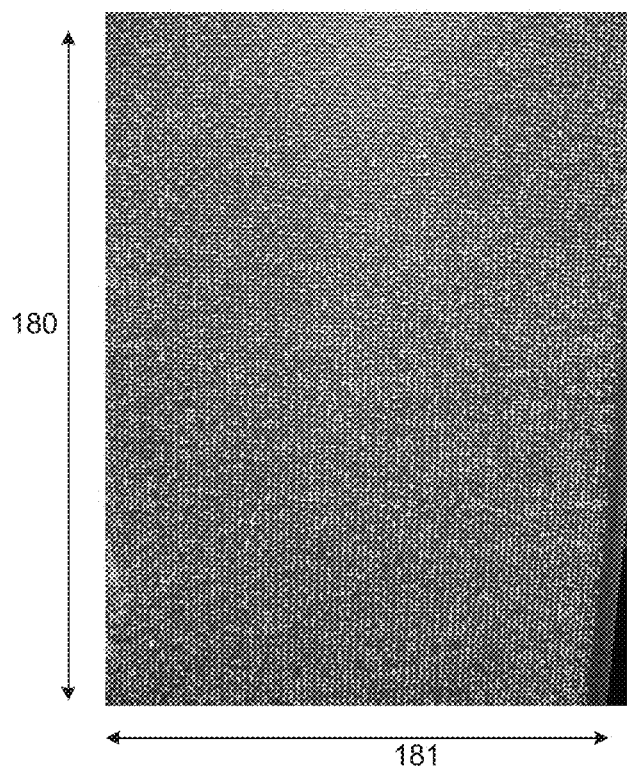
FIG. 29 includes an image of a conventional sample having a shadowing arrangement of shaped abrasive particles on the backing.

A second, conventional sample (Sample CS3) was made having a conventional pattern of shaped abrasive particles, which was an example of one type of shadowing distribution as demonstrated in FIG. 29, which is an image of a portion of Sample CS3 demonstrating a square pattern wherein the sides of the square repeating unit are aligned with longitudinal and lateral axis of the backing The same size, shape, and amount of shaped abrasive particles used in Sample S4 were used in Sample CS3, with the only substantial difference being the arrangement of shaped abrasive particles in the backing. As illustrated, the arrangement of shaped abrasive particles is a shadowing arrangement relative to the lateral axis and longitudinal axis of the backing. The grinding direction was substantially parallel to the longitudinal axis of the backing.

The samples were tested under the conditions provided in Table 4 below.

TABLE 4

| Material | 4140 Carbon Steel |
|---|---|
| Dimension | 1" square |
| Force | 40 psi |
| Product Speed | 5000 sfm |
| Machine: | 122 Ds High Force Grinder (Constant Force Belt Testor #4580) |

The workpieces used for testing were analyzed using a Nanovea 3D Optical Profilometer (white light chromatic aberration technique) to determine the surface characteristics of the workpiece after the grinding operation. For each workpiece tested, one area was profiled on each sample using an area scan of 5.0 mm×5.0 mm. A step size of 10 µm was used for both the X and Y axes for all samples. Unfiltered area parameters (Sx) were calculated for the full scanned area. Twenty line profiles were extracted from the area scan and average parameters were calculated (Px). All profile parameters reported in the sample data are explained in specific detail in an additional slide for reference. The analysis enabled calculation of 6 surface characterizations as provided in Table 4 below. Note that Sa is the arithmetic mean deviation of the surface according to the EUR 15178 EN Report (i.e., "The Development of Methods for the Characterisation of Roughness in Three Dimensions," Stout, K. J., et al. Published on behalf of the Commission of the European Communities). Sq is the root-mean-square deviation of the surface according to EUR 15178 EN Report. St is the total height of the surface and is a measure of the height difference between the highest peak and deepest valley. Sp is the maximum height of the summits and is a measure of the height difference between the highest peak and the mean plane. Sv is the maximum depth of the valleys and is a measure of the distance between the mean plane and the deepest valley. Sz is the ten point height of the surface and is the mean of distance between the five highest peaks and the 5 deepest valleys according to the EUR 15178 EN Report.

TABLE 5

| Sample S4 | | Sample CS3 | |
|---|---|---|---|
| Sa | 17.8 µm | Sa | 218 µm |
| Sq | 22.6 µm | Sq | 250 µm |
| Sz | 176 µm | Sz | 1004 µm |
| Sp | 71.9 µm | Sp | 623 µm |
| Sv | 105 µm | Sv | 400 µm |
| St | 177 µm | St | 1023 µm |

Figure 30:
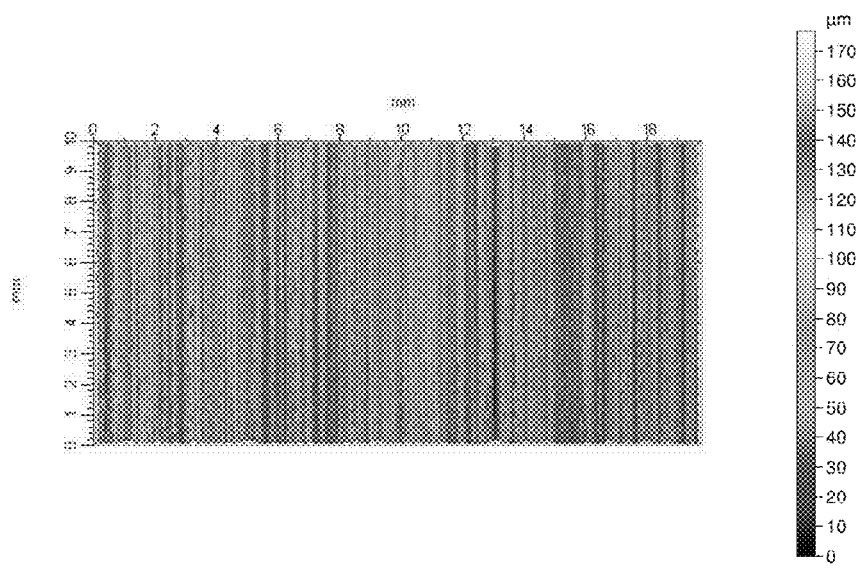
FIG. 30 includes an image of a portion of a surface of a workpiece ground using a sample representing an embodiment.
Figure 31:
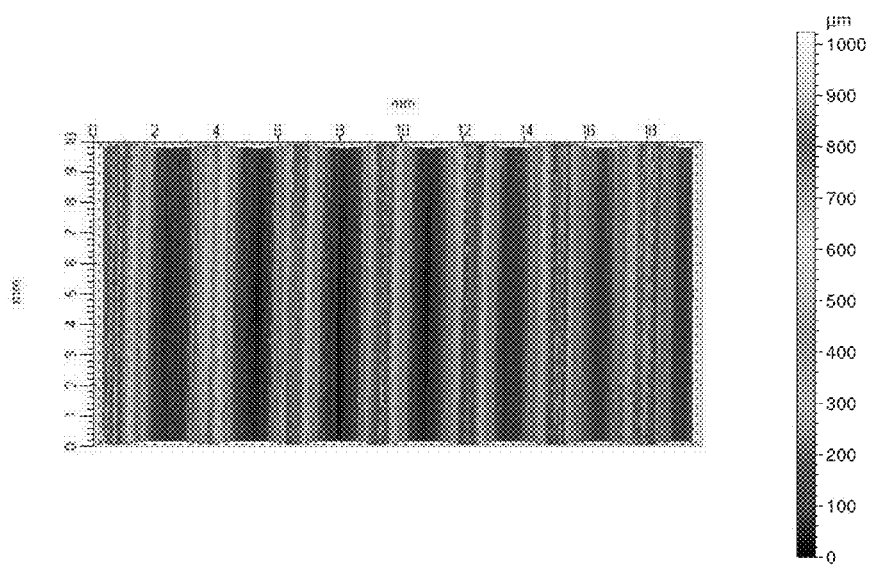
FIG. 31 includes an image of a portion of a surface of a workpiece ground using a sample representing a conventional embodiment.

FIG. 30 includes an image of a portion of the surface of the workpiece after conducting the grinding operation with the abrasive of Sample S4. FIG. 31 includes an image of a portion of the surface of the workpiece after conducting the grinding operation with the abrasive of Sample CS3. As clearly demonstrated in a comparison of the images and the data of Table 5, the non-shadowing arrangement of shaped abrasive particles associated with Sample S4 resulted in significantly better grinding performance and overall surface finish of the workpiece as compared to the results obtained in the grinding operation using Sample CS3, which utilized a shadowed pattern of shaped abrasive particles.

For each of the samples (i.e., S4 and CS3), three test runs were completed and the amount of material removed for each of the test runs was calculated and averaged. The average material removed for Sample S4 was 16% greater as compared to Sample CS3, thus demonstrating improved material removal capabilities as compared to Sample CS3.

The present application represents a departure from the state of the art. While the industry has recognized that shaped abrasive particles may be formed through processes such as molding and screen printing, the processes of the embodiments herein are distinct from such processes. Notably, the embodiments herein include a combination of process features facilitating the formation of batches of shaped abrasive particle having particular features. Moreover, the abrasive articles of the embodiments herein can have a particular combination of features distinct from other abrasive articles including, but not limited to, a predetermined distribution of shaped abrasive particles, utilization of a combination of predetermined orientation characteristics, groups, rows, columns, companies, micro-units, channel regions, aspects of the shaped abrasive particles, including but not limited to, aspect ratio, composition, additives, two-dimensional shape, three-dimensional shape, difference in height, difference in height profile, flashing percentage, height, dishing, and a combination thereof. And in fact, the abrasive articles of embodiments herein may facilitate improved grinding performance. While the industry has generally recognized that certain abrasive articles may be formed having an order to certain abrasive units, such abrasive units have traditionally been limited to abrasive composites that can be easily molded via a binder system, or using traditional abrasive or superabrasive grits. The industry has not contemplated or developed systems for forming abrasive articles from shaped abrasive particles having predetermined orientation characteristics as described herein. Manipulation of shaped abrasive particles in order to effectively control predetermined orientation characteristics is a non-trivial matter, having exponentially improved control of particles in three-space, which is not disclosed or suggested in the art. Reference herein to the term "the same" will be understood to mean substantially the same. Moreover, it will be appreciated that while embodiments herein have referenced backings having a generally rectangular shape, the arrangement of shaped abrasive particles in a non-shadowing arrangement can be equally applicable to other shapes of backings (e.g., round or ellipsoidal-shaped backings).

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description. The description of embodiments in combination with the figures is provided to assist in understanding the teachings disclosed herein and should not be interpreted as a limitation on the scope or applicability of the teachings. Other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. An abrasive article comprising:

a first group including a plurality of shaped abrasive particles coupled to a backing, wherein each shaped abrasive particle of the first group of shaped abrasive particles shares at least one of a predetermined rotational orientation, a predetermined lateral orientation, and a predetermined longitudinal orientation, wherein each shaped abrasive particle of the first group of shaped abrasive particles includes a body having a first major surface, a second major surface, and a side surface extending between the first major surface and the second major surface, wherein the body is essentially free of a binder, wherein the body includes a length and a width defined by dimensions of the first or second major surfaces and the side surface defines a height of the body, wherein the height is less than the length and the width, and wherein each of the shaped abrasive particles of the first group is arranged in a side orientation with a side surface of the body closest to the backing and further is arranged in a frontal orientation relative to an axis of the backing, and wherein the first major surface or second major surface is substantially perpendicular to the axis of the backing, and wherein the first group comprises all of the shaped abrasive particles coupled to the backing that are arranged in the frontal orientation relative to the axis of the backing;

a second group comprising a plurality of shaped abrasive particles distinct from the first group and coupled to the backing, wherein each shaped abrasive particle of the second group of shaped abrasive particles shares at least one of a predetermined rotational orientation, a predetermined lateral orientation, and a predetermined longitudinal orientation, wherein each shaped abrasive particle of the second group of shaped abrasive particles includes a body having a first major surface, a second major surface, and a side surface extending between the first major surface and the second major surface, wherein the body is essentially free of a binder, wherein the body includes a length and a width defined by dimensions of the first or second major surfaces and the side surface defines a height of the body, wherein the height is less than the length and the width, and wherein each of the shaped abrasive particles of the second group is arranged in a side orientation with a side surface of the body closest to the backing and further is arranged in a sideways orientation relative to an axis of the backing, and wherein the first major surface or second major surface is substantially parallel to the axis of the backing, wherein the second group comprises all of the shaped abrasive particles coupled to the backing that are arranged in the sideways orientation relative to the axis of the backing;

wherein the first group defines a first region on the backing, the second group defines a second region on the backing, and wherein the first region and the second region are entirely separated from each other; and wherein the plurality of shaped abrasive particles of the first group are arranged in a controlled, non-shadowing arrangement relative to each other, wherein the controlled, non-shadowing arrangement comprises a first shaped abrasive particle located at a first, predetermined position on the backing, a second shaped abrasive particle immediately adjacent to the first shaped abrasive particle and located at a second, predetermined position on the backing, and wherein the first and second, predetermined positions are staggered from each other relative to at least two axes defining a plane of the backing.

2. The abrasive article of claim 1, wherein each shaped abrasive particle of the first group of shaped abrasive particles comprises at least one feature different from a feature of at least one shaped abrasive particle of the second group, wherein the feature is selected from the group of features consisting of average particle size, two-dimensional particle shape, orientation relative to a grinding direction, average lateral space, average longitudinal space, side orientation, inverted orientation, flat orientation, composition, and predetermined distribution.

3. The abrasive article of claim 1, wherein the plurality of shaped abrasive particles of the first group are arranged in a first controlled, non-shadowing arrangement relative to each other, wherein the plurality of shaped abrasive particles of the second group are arranged in a second controlled, non-shadowing arrangement relative to each other, and wherein the first controlled, non-shadowing arrangement is different than the second controlled, non-shadowing arrangement.

4. The abrasive article of claim 3, wherein the first controlled, non-shadowing arrangement comprises a first pattern of shaped abrasive particles repeating a plurality of times within the first controlled, non-shadowing arrangement, wherein the second controlled, non-shadowing arrangement comprises a second pattern of shaped abrasive particles repeating a plurality of times within the second controlled, non-shadowing arrangement, and wherein the first pattern is different from the second pattern.

5. The abrasive article of claim 1, wherein a portion of the first shaped abrasive particle is abutting a portion of the second shaped abrasive particle.

6. The abrasive article of claim 1, wherein the first major surface of at least one shaped abrasive particle of the first group has a two-dimensional shape selected from a group consisting of: a polygon, a triangle, a rectangle, a quadrilateral, a pentagon, a hexagon, a heptagon, an octagon, a decagon, an ellipsoid, a numeral, a Greek alphabet letter, a Latin alphabet letter, a Russian alphabet character, a Kanji character, a complex shape including a combination of polygonal and ellipsoid features defining linear and curved segments, or a combination thereof.

7. The abrasive article of claim 1, wherein the controlled, non-shadowing arrangement is a phyllotactic pattern.

8. The abrasive article of claim 1, wherein the backing has a circular geometry.

9. The abrasive article of claim 1, wherein at least an uppermost portion of each of the first shaped abrasive particle and the second shaped abrasive particle are visible in the plane of the backing when viewed from a grinding direction, and a degree of overlap of the first shaped abrasive particle and the second shaped abrasive particle during an initial phase of a material removal operation is not greater than about 25%.

10. The abrasive article of claim 1, wherein the first group is separated from the second group by a channel region.

11. The abrasive article of claim 10, wherein the channel region is free of shaped abrasive particles.

12. The abrasive article of claim 10, wherein the channel region extends along the backing and defines a patterned region that is free of shaped abrasive particles and separates the first group and the second group.

13. The abrasive article of claim 10, wherein the channel region comprises a width that is greater than a distance between any two immediately adjacent shaped abrasive particles within the first group.

14. The abrasive article of claim 1, wherein a majority of the shaped abrasive particles of the first group are arranged in the controlled, non-shadowing arrangement relative to each other.

15. The abrasive article of claim 14, wherein all of the shaped abrasive particles of the first group are arranged in the controlled, non-shadowing arrangement relative to each other.

16. The abrasive article of claim 1, wherein the plurality of shaped abrasive particles of the second group are arranged in a second controlled, non-shadowing arrangement relative to each other, wherein the second controlled, non-shadowing arrangement comprises a first shaped abrasive particle located at a first, predetermined position on the backing, a second shaped abrasive particle immediately adjacent to the first shaped abrasive particle and located at a second, predetermined position on the backing, and wherein the first and second, predetermined positions are staggered from each other relative to at least two axes defining a plane of the backing.

17. The abrasive article of claim 16, wherein a majority of the shaped abrasive particles of the second group are arranged in the second controlled, non-shadowing arrangement relative to each other.

18. The abrasive article of claim 17, wherein all of the shaped abrasive particles of the second group are arranged in the second controlled, non-shadowing arrangement relative to each other.

19. The abrasive article of claim 1, further comprising:
a third group comprising a plurality of shaped abrasive particles distinct from the first and second groups and coupled to the backing, wherein each shaped abrasive particle of the third group of shaped abrasive particles shares at least one of a predetermined rotational orientation, a predetermined lateral orientation, and a predetermined longitudinal orientation, wherein each shaped abrasive particle of the third group of shaped abrasive particles includes a body having a first major surface, a second major surface, and a side surface extending between the first major surface and the second major surface, wherein the body is essentially free of a binder, wherein the body includes a length and a width defined by dimensions of the first or second major surfaces and the side surface defines a height of the body, wherein the height is less than the length and the width, and wherein each of the shaped abrasive particles of the third group is arranged in a side orientation with a side surface of the body closest to the backing and further is arranged in a third rotational orientation relative to an axis of the backing that is different from a rotational orientation of the shaped abrasive particles within the first and second groups, and wherein the third group comprises all of the shaped abrasive particles coupled to the backing that are arranged in the third rotational orientation relative to the axis of the backing; and wherein the plurality of shaped abrasive particles of the third group are arranged in a controlled, non-shadowing arrangement relative to each other, wherein the controlled, non-shadowing arrangement comprises a first shaped abrasive particle located at a first, predetermined position on the backing, a second shaped abrasive particle immediately adjacent to the first shaped abrasive particle and located at a second, predetermined position on the backing, and wherein the first and second, predetermined positions are staggered from each other relative to at least two axes defining a plane of the backing.

20. The abrasive article of claim 1, wherein the first region is continuous and the second region is continuous, and wherein the first region is non-overlapping with the second region.

* * * * *